United States Patent
Itoh

(10) Patent No.: US 7,069,322 B2
(45) Date of Patent: Jun. 27, 2006

(54) WEB BROWSER APPARATUS AND WEB BROWSING METHOD

(75) Inventor: Fumiaki Itoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 730 days.

(21) Appl. No.: 09/991,351

(22) Filed: Nov. 20, 2001

(65) Prior Publication Data

US 2002/0112000 A1  Aug. 15, 2002

(30) Foreign Application Priority Data

Nov. 22, 2000  (JP) .............................. 2000-356723

(51) Int. Cl.
 *G06F 15/173* (2006.01)
(52) U.S. Cl. ...................... 709/225; 709/226; 709/227; 709/228; 709/229
(58) Field of Classification Search ................ 709/202, 709/203, 219, 225–229, 218, 239, 252, 389; 370/389, 395.21, 394, 395.42
See application file for complete search history.

(56) References Cited

U.S. PATENT DOCUMENTS

| | | | | |
|---|---|---|---|---|
| 5,804,803 A | * | 9/1998 | Cragun et al. ............... 235/375 |
| 5,933,498 A | * | 8/1999 | Schneck et al. .............. 705/54 |
| 5,938,727 A | * | 8/1999 | Ikeda .......................... 709/218 |
| 5,940,595 A | * | 8/1999 | Reber et al. ................. 709/227 |
| 6,076,733 A | * | 6/2000 | Wilz et al. ............. 235/462.01 |
| 6,108,656 A | * | 8/2000 | Durst et al. .................... 707/10 |
| 6,345,764 B1 | * | 2/2002 | Knowles ................ 235/462.01 |
| 6,412,699 B1 | * | 7/2002 | Russell et al. ......... 235/472.01 |
| 6,510,997 B1 | * | 1/2003 | Wilz et al. ............. 235/472.01 |
| 6,542,933 B1 | * | 4/2003 | Durst et al. ................. 709/229 |
| 6,568,595 B1 | * | 5/2003 | Russell et al. ......... 235/462.01 |
| 6,707,581 B1 | * | 3/2004 | Browning ................... 358/473 |

\* cited by examiner

*Primary Examiner*—Ario Etienne
*Assistant Examiner*—Ciara Martin
(74) *Attorney, Agent, or Firm*—Cowan, Liebowitz & Latman, P.C.

(57) ABSTRACT

The present invention relates to a web browser apparatus and a web browsing method that allows a user to perform web browsing by simple operations of filling in a paper medium and inserting the paper medium in the apparatus. According to the present invention, an action identification code for deciding the next action is extracted from an input image and analyzed. The next action is decided based on an analysis result of the action identification code and the input image. Page data is obtained from a web server in accordance with the decided action. If a user instructs by filling in a physical medium on which the obtained page data is printed, an action identification code to be used for deciding an action corresponding to the instruction is prepared based on the page data obtained from the web server. An output image is prepared based on the prepared action identification code and the obtained page data and controlled to be printed on a physical medium (such as a paper medium).

36 Claims, 36 Drawing Sheets

| (1) | (23) | h | t | t | p | : | / | / | a |
| s | a | m | p | l | e | . | c | o | . |
| j | p | / | | | | | | | |

FIG. 8

| | | | | | | | | | |
|---|---|---|---|---|---|---|---|---|---|
| (1) | (34) | h | t | t | p | : | / | / | a |
| s | a | m | p | l | e | . | c | o | . |
| j | p | / | h | a | n | e | d | a | . |
| h | t | m | l | (4) | (14) | (10) | / | c | g |
| i | / | s | a | m | p | l | e | (7) | (18) |
| (0) | (40) | (1) | d | i | r | e | c | t | i |
| o | n | = | d | e | p | (7) | (18) | (1) | (15) |
| (40) | d | i | r | e | c | t | i | o | n |
| = | a | r | v | (8) | (18) | (15) | (50) | a | i |
| r | l | i | n | e | = | A | B | C | a |
| i | r | (8) | (18) | (33) | (50) | a | i | r | l |

OMISSION

| | | | | | | | | | |
|---|---|---|---|---|---|---|---|---|---|
| n | i | g | h | t | = | o | n | (5) | (4) |
| (0) | (70) | (6) | (4) | (15) | (70) | (3) | (15) | (10) | (90) |
| n | a | r | i | t | a | . | h | t | m |
| l | (3) | (14) | (10) | (98) | k | a | n | k | u |
| . | h | t | m | l | | | | | |

FIG. 15

```
1   <!DOCTYPE HTML PUBLIC "-//W3C//DTD HTML 4.0 Transitional//EN">
2   <HTML><HEAD><TITLE> Sample </TITLE></HEAD>
3   <BODY>
4   <H2> HANEDA AIRPORT TIMETABLE </H2>
5   <FORM action="/cgi/sample" mothod="get">
6
7   <INPUT type="radio" name="direction" value="dep" checked>DEPARTURE
8   <INPUT type="radio" name="direction" value="arv">ARRIVAL<BR>
9
10  AIRLINE
11  <INPUT type="checkbox" name="airline" value="ABCair">ABCair
12  <INPUT type="checkbox" name="airline" value="airDEF" checked>airDEF
13  <INPUT type="checkbox" name="airline" value="GHIair">GHIair<BR>
14
15  TIME
16  <INPUT type="checkbox" name="morning">MORNING
17  <INPUT type="checkbox" name=afternoon">AFTERNOON
18  <INPUT type="checkbox" name="night">NIGHT<BR>
19
20  <INPUT type="submit" name="ok" value="ok" label="OK">
21  <INPUT type="reset" name="cancel" value="cancel" label="Cancel">
22  </FORM>
23
24  <H2> OTHER AIRPORTS </H2>
25  <UL>
26  <LI><A href="narita.html">NEW TOKYO INTERNATIONAL AIRPORT (NARITA)</A>
27  <LI><A href="kanku.html">KANSAI INTERNATIONAL AIRPORT (KANKU)</A>
28  </UL>
29  </BODY></HTML>
```

FIG. 16

```
GET /haneda.html HTTP/1.1
```

FIG. 17

```
HTTP/1.0 200 OK
Content-type: text/html
Content-lenght: 924

<!DOCTYPE HTML PUBLIC "-//W3C//DTD HTML 4.0 Transitional//EN">
<HTML><HEAD><TITLE> Sample </TITLE></HEAD>
<BODY>
<H2> HANEDA AIRPORT TIMETABLE </H2>
<FORM action="/cgi/sample" mothod="get">

<INPUT type="radio" name="direction" value="dep" checked>DEPARTURE
<INPUT type="radio" name="direction" value="arv">ARRIVAL<BR>

AIRLINE
<INPUT type="checkbox" name="airline" value="ABCair">ABCair
<INPUT type="checkbox" name="airline" value="airDEF" checked>airDEF
<INPUT type="checkbox" name="airline" value="GHIair">GHIair<BR>

TIME
<INPUT type="checkbox" name="morning">MORNING
<INPUT type="checkbox" name=afternoon">AFTERNOON
<INPUT type="checkbox" name="night">NIGHT<BR>

<INPUT type="submit" name="ok" value="ok" label="OK">
<INPUT type="reset" name="cancel" value="cancel" label="Cancel">
</FORM>

<H2> OTHER AIRPORTS </H2>
<UL>
<LI><A href="narita.html">NEW TOKYO INTERNATIONAL AIRPORT (NARITA)</A>
<LI><A href="kanku.html">KANSAI INTERNATIONAL AIRPORT (KANKU)</A>
</UL>
</BODY></HTML>
```

FIG. 35

| | | | | | | | | | |
|---|---|---|---|---|---|---|---|---|---|
| (1) | (20) | (20) | (50) | (7) | (1) | (34) | h | t | t |
| p | : | / | / | a | s | a | m | p | l |
| e | . | c | o | . | j | p | / | h | a |
| n | e | d | a | . | h | t | m | l | (4) |
| (14) | (10) | / | c | g | i | / | s | a | m |
| p | l | e | (7) | (18) | (0) | (40) | (1) | d | i |
| r | e | c | t | i | o | n | = | d | e |
| p | (7) | (18) | (1) | (15) | (40) | d | i | r | e |
| c | t | i | o | n | = | a | r | v | (8) |
| (18) | (15) | (50) | a | i | r | l | i | n | e |
| = | A | B | C | a | i | r | (8) | (18) | (33) |

OMISSION

| | | | | | | | | | |
|---|---|---|---|---|---|---|---|---|---|
| n | (8) | (12) | (45) | (60) | n | i | g | h | t |
| = | o | n | (5) | (4) | (0) | (70) | (6) | (4) | (15) |
| (70) | (3) | (15) | (10) | (90) | n | a | r | i | t |
| a | . | h | t | m | l | (3) | (14) | (10) | (98) |
| k | a | n | k | u | . | h | t | m | l |

| (0) | (1) | (23) | h | t | t | p | : | / | / |
|---|---|---|---|---|---|---|---|---|---|
| a | s | a | m | p | l | e | . | c | o |
| . | j | p | / | | | | | | |

WEB BROWSER APPARATUS AND WEB BROWSING METHOD

BACKGROUND OF THE INVENTION

1. Field of the Invention

The present invention relates to a web browser apparatus and a web browsing method and, more specifically, to a web browser apparatus and a web browsing method for performing an output of information and an input for causing transition to the next information on the client side in the WWW (World Wide Web) that is a system for performing interactive information communication using the Internet, a program and a storage medium.

In particular, the present invention relates to a web browser apparatus and a web browsing method for performing browsing using a physical medium such as paper in the WWW that is a system for performing interactive information communication using the Internet.

2. Related Background Art

Conventionally, a web browser apparatus for outputting information on the client side in the World Wide Web (hereinafter referred to as Web) has been realized by a computer for executing web browser application software.

FIG. 10 is a view showing a configuration of a general web system. In the figure, reference numeral 1001 denotes a browser computer that is a computer mounted with web browser application software. Reference numeral 1002 denotes a web server computer for passing information in response to a request from the browser computer 1001. Reference numeral 1003 denotes the Internet to be a communication path between the browser computer 1001 and the web server computer 1002.

FIG. 10 is for describing a basic configuration of a web system. In fact, a multiplicity of browser computers and web server computers are connected to the Internet and each browser computer can obtain information from an arbitrary web server computer.

FIG. 11 illustrates an example of a user interface of a general web browser. The web browser obtains data (which is referred to as page) written in the HTML (Hypertext Markup Language) from a web server and displays the page. In addition, the web browser receives an input by a user such as an input in a form and a selection of hyperlink and transitions to the next page in accordance with these inputs (that is, obtains and displays another piece of page data).

A form of an area denoted by reference numeral 1101 in FIG. 11 consists of two radio buttons, six check boxes, one submit button and one reset button.

The radio buttons are control objects that can select only one of the buttons forming a group. In this example, circular areas displayed in front of "Departure" and "Arrival" are radio buttons. In this example, the first radio button is selected. When a user clicks the second radio button, it is selected, and the black dot in the first radio button disappears and the black dot is displayed in the second radio button.

The check boxes are control objects, each of which can switch selection/non-selection independently. Each time a user clicks one of the check boxes, a selection/non-selection state is switched. When in the selection state, a check mark is displayed.

The submit button is a control object that is operated by clicking of a user. In this example, the button marked "OK" is the submit button. When the submit button is clicked, the web browser sends data of a form to which the button belongs to a web server. Then, the web browser displays anew a page returned by the web server in response to the transmission.

The reset button is also a control object that is operated by clicking of a user. In this example, the button marked "Cancel" is the reset button. When the reset button is clicked, the web browser returns data of a form to which the button belongs to an initial state. That is, the web browser returns the data to a state before the selection states of the radio button and the check boxes are changed by operation of the user.

In an area denoted by reference numeral 1102 in FIG. 11, two origin anchors to be link origins of the byperlink are displayed. They are "New Tokyo International Airport (Narita)" and "Kansai International Airport (Kanku)". These origin anchors are underlined and displayed so as to be distinguished from other texts. Here, when a user clicks any of the origin anchors, the web browser tracks the link of the origin anchor and displays anew a page indicated by a destination anchor that is a link destination.

Further, the example of FIG. 11 is in fact only a part of the control objects to be displayed by the general web browser. Besides, the general web browser displays various other control objects, changes an indication of data or interprets a program language such as a script to operate. In addition, a control object for operating the browser itself is often prepared and displayed. For example, a control object, which displays a registered home page or causes a function of returning to a page displayed immediately before the current page is displayed, is often prepared. Here, for simplicity, the control objects are described by an example in which items required for describing basic contents of the present invention are referred to.

FIG. 15 illustrates an example of HTML data that is displayed in the example of display in FIG. 11. The numbers shown in the left outside of the frame are line numbers given for description, which are not included in actual data.

The fifth to the twenty-second lines are form elements that are shown by FORM tags. The above-mentioned two radio buttons, six check boxes, one submit button and one reset button are defined in these elements.

The radio buttons are defined in the seventh and the eight lines. The radio buttons are defined by INPUT tags whose value of a type attribute is radio. In this case, the radio buttons having a same name attribute form one group and only one radio button is selected in the one group. In the tag, values designated by a name attribute and a value attribute are used when form data is sent. This is the same for other control objects in the form. Further, the radio button in which the checked attribute is written is displayed as a selection state from the beginning.

The check boxes are defined in the eleventh to the thirteenth lines and the sixteenth to the eighteenth lines. The check boxes are defined by INPUT tags whose value of the type attribute is checkbox. Further, the radio button in which the checked attribute is written is displayed as the selection state from the beginning.

The submit button is defined in the twentieth line. The submit button is defined by an INPUT tag whose value of the type attribute is submit. Further, the submit button displays a value of a label attribute on the button.

The reset button is defined in the twenty-first line. The reset button is defined by an INPUT tag whose value of the type attribute is rest. Further, the reset button displays a value of the label attribute on the button.

Origin anchors are defined in the twenty-sixth and the twenty-seventh lines. The origin anchors become origin anchors of elements of A tags and, in this example, are displayed with underlines. Values of a href attribute of the tags are URLs identifying the origin anchors.

FIG. 12 illustrates an example of a configuration of a function module of a conventional web browser. In the figure, reference numeral 1201 denotes a URL storing portion for storing a URL indicating a page to be obtained and displayed anew. Reference numeral 1202 denotes a request preparing portion for preparing HTTP request data for obtaining a page to be indicated by the URL stored in the URL storing portion 1201 and an address of a server that is a transmission destination of the request data.

Reference numeral 1203 denotes a request storing portion for storing the request data and the server address prepared in the request preparing portion 1202. Reference numeral 1204 denotes an HTTP communication portion for sending the request data stored in the request storing portion 1203 to a server indicated by the server address stored in the same portion and receiving HTTP response data from the server.

Reference numeral 1205 denotes a response storing portion for storing the HTTP response data received by the HTTP communication portion 1204. Reference numeral 1206 denotes an HTML data analysis portion for taking out and analyzing HTML data if the response data stored in the response storing portion 1205 includes the HTML data.

Reference numeral 1207 denotes an analysis result storing portion for storing an analysis result analyzed by the HTML data analysis portion 1206. Reference numeral 1208 denotes a display data preparing portion for preparing display data defining a display layout of each element from the analysis result of the HTML data stored in the analysis result storing portion 1207.

Reference numeral 1209 denotes a display data storing portion for storing the display data prepared by the display data preparing portion 1208. Reference numeral 1210 denotes a display portion for performing display on a display in accordance with the display data stored in the display data storing portion 1209.

Reference numeral 1211 denotes an operation input portion for inputting an operation by a keyboard or a mouse. Reference numeral 1212 denotes an input interpretation portion for comparing the input by the operation input portion with the display data stored in the display data storing portion 1209 to determine processing with respect to the input.

Reference numeral 1213 denotes a display data updating portion for updating the display data stored in the display data storing portion 1209 in accordance with the input when it is interpreted by the input interpretation portion 1212 that the processing with respect to the input is updating processing of the display data.

Reference numeral 1214 denotes a new URL decision portion for referring to the display data stored in the display data storing portion 1209 to decide a new URL indicating a new page to shift to in accordance with the input and performing processing for storing the new URL in the URL storing portion 1201 anew when it is determined by the input interpretation portion 1212 that the processing with respect to the input is processing for shifting to a new page.

FIG. 9 is a view showing a specific configuration of a browser computer. In the figure, reference numeral 901 denotes a computer main body, which realizes processing to be described later. Reference numeral 902 denotes a display, which realize the display portion 1210. Reference numeral 903 denotes a keyboard and 904 denotes a mouse, which realize the operation input portion 1211.

Processing procedures in the case in which the conventional web browser is realized by software will be hereinafter described based on flow charts shown in FIGS. 13 and 14.

FIG. 13 is a flow chart showing processing procedures of page obtaining and displaying processing for obtaining and displaying a page indicated by a URL stored in a URL storing portion when URL data is stored in the URL storing portion. Here, new URL data is stored in the URL storing portion in the following two cases. 1) A specified URL data set in advance is stored when a browser apparatus is activated. 2) URL data indicating a new page is stored as a processing result of the new URL decision portion 1214. Only these two cases will be described concerning the conventional web browser. However, the processing for shifting to the next page is performed in the case in which a user directly inputs URL data by a keyboard or the like, the case in which a user instructs to display a page that was displayed in the past again, the case in which a user selects a registered page, the case in which there is a description for automatically shifting to another page in a displayed page, or the like. For simplicity of description, the processing for shifting to the next page is limited to the above-mentioned two cases.

When URL data is stored in the URL storing portion 1201, the following each portion is extracted from the URL data first in step 1301. 1) a schemer portion indicating means for obtaining a page, 2) a host portion indicating a host name of a web server storing a page, 3) a port portion indicating a port of a web server storing a page, 4) a path portion indicating a position of a page in the web server and 5) a query portion indicating inquiry data in the case in which a form input or the like is performed. For example, if a URL is http://asample.co.jp/haneda.html, the schemer portion is http, the host portion is asample.co.jp, the port portion is 80 (since it is omitted in this URL, a default value is used), the path portion is haneda.html and the query portion is empty.

When each portion is extracted, the processing shifts to step 1302. Further, although an actual browser often processes schemers other than http, it is assumed here that the browser handles only http for simplicity of description here. In step 1302, HTTP request data is prepared using a value of each portion extracted in step 1301. Then, the processing shifts to step 1303.

FIG. 16 illustrates HTTP request data with respect to the above-mentioned example. Although data identifying a web browser, data indicating a receivable data type and the like are actually added to an HTTP request, only minimum required data is shown here for simplicity of description.

In step 1303, the HTTP request data prepared in step 1302 is sent. More specifically, a TCP/IP connection is established with respect to a port indicated by a value of the above-mentioned port portion of a server indicated by a value of the above-mentioned server portion and the above-mentioned HTTP request data is sent. Then, the processing shifts to step 1304.

In step 1304, an HTTP response is received from the server to which the HTTP request was sent in step 1303. The response is sent through the TCP/IP connection established in step 1303. This HTTP response data is stored in the response storing portion 1205. Then, the processing shifts to step 1305.

FIG. 17 illustrates an example of the HTTP response data. The header of this response data indicates that an MIME type of a body portion (data of an empty line and below) is text/html and the length of the data is 924 byte. Although data such as identification data of a web server and time data for preparing data are often further included in the header portion actually, such data is omitted here for simplicity of description. In addition, although an actual web browser can often handle data other than data whose MIME type is text/html, since it is a main purpose of the present invention to handle HTML data in a web browser, a data type to be handled is limited to text/html for simplicity of description.

In step 1305, HTML data that is a body of the HTTP response received in step 1304 is analyzed to obtain tag elements in the HTML and a hierarchical relation among the tag elements. Then, the processing shifts to step 1306.

In step 1306, a layout of texts and control objects indicated by the tag elements is arranged using a result analyzed in step 1305 to prepare display data. An example of the layout is as described in FIG. 11. The prepared display data is displayed on the display portion 1210. Then, the page obtaining and displaying processing is finished.

FIG. 14 is a flow chart showing processing procedures of invent processing when an operation of a user is applied using the operation input portion 1211. It is assumed here that only the case in which a control object on the display portion 1210 is clicked by a mouse as an operation event of the user for simplicity of description.

In step 1401, a control object clicked by the user is obtained. This is realized through an operating system of a computer. Then, the processing shifts to step 1402. In step 1402, it is determined whether or not the control object clicked by the user is a submit button. If it is a submit button, the processing shifts to step 1405. If it is not a submit button, the processing shifts to step 1403.

In step 1403, it is determined whether or not the control object clicked by the user is an anchor. If it is an anchor, the processing shifts to step 1406. If it is not an anchor, the processing shifts to step 1404. In step 1404, a selection state of the control object clicked by the user is changed. If the control object is a check box, a state of selection/non-selection is switched. If it is a radio button, the radio button is made to be in a selection state and other radio buttons forming a same group is made to be in a non-selection state. Then, the event processing is finished.

In step 1405, a query is prepared with reference to a selection state of each control object in a form element in which a submit button is included. Then, the processing shifts to step 1406. The query is a character string in which a value of a name attribute and a value of a value attribute of a tag corresponding to a selected control object are listed. The value of the name attribute and the value of the value attribute of the tag are connected by "=", and groups of connected values are connected by "&". Further, if a tag does not have a value attribute, "on" is used in stead of a value attribute. For example, a query in the case in which a selection state is as shown in FIG. 18 when the HTML data of FIG. 15 is displayed is as follows::
"direction=dep&airline=ABCair&airline=airDEF& afternoon=on&night=on".

In step 1406, a URL of a page that should be obtained and displayed anew is prepared and stored in the URL storing portion 1201. Then, the processing shifts to step 1407. If a control object is a submit button, a URL to be prepared is a URL in which the query prepared in step 1405 added with "?" is given to a value of an action attribute in a FORM tag of a form including the submit button. If this value is a relative path, it is interpreted as a relative value from a URL of a currently displayed page and is converted to an absolute path. In the case of the above-mentioned example, the URL to be prepared is "http://asample.co.jp/cgi/sample?direction=dep&airline=ABCair&airline=airDEF &afternoon=on&night=on".

If a control object is an anchor, a value of a href attribute of an A tag indicating an anchor is a URL. If this value is a relative path, the processing is the same as described above. For example, a URL to be prepared when an upper anchor is selected out of two anchors in FIG. 18 is as follows: "http://asample.co.jp/narita.html".

Further, if a value other than "get" (e.g., "post") is designated in a method attribute of the FORM tag, processing for not including a query in a URL and inserting an HTTP request in a body, or the like, is required. However, only the case in which the method attribute is "get" is discussed here for simplicity of description.

In step 1407, updating processing of a page is performed. The aforementioned page obtaining and displaying processing is performed for the update of a page. Then, the event processing is finished.

The conventional example of a web browser that is realized as software on a computer has been described.

There is also a web browser apparatus other than that utilizing a graphical user interface of a computer as in the above-mentioned conventional example. For example, there is a web browser apparatus called a voice browser that composes contents of HTML data as voices to output them with voices, inputs a form and selection of an anchor with voices and recognizes voices to update a page.

In addition, there have been proposed several apparatuses that access a web using a facsimile device. Since these apparatuses cannot input a form or select an anchor with respect to an arbitrary page as a browser appapratus by a graphical user interface does, they are not a perfect web browser apparatus. However, such apparatuses will be described because they relate to the present invention.

As such apparatuses, there are an acting apparatus for obtaining homepage information of the Internet in an acting method for obtaining homepage information of the Internet and an apparatus disclosed in Japanese Patent Laid-open No. 11-112769 and a facsimile server apparatus in a facsimile server, a data obtaining method and a format sheet disclosed in Japanese Patent Laid-open No. 11-191823. In these apparatuses, a sheet on which a URL is written is sent to a facsimile server using a facsimile device, the facsimile server receives URL data by character recognition and obtains HTML data indicated by the URL and returns a layout result to the facsimile device.

In addition, an information collecting system in a method of collecting information and a system for collecting information by a facsimile disclosed in Japanese Patent Laid-open No. 11-234452 has a configuration close to the above. However, it is different in that it inputs a number associated to a URL in advance by a tone button of a facsimile device and sends it as a tone signal and a facsimile server converts the received number into the URL rather than sending a sheet on which the URL is written.

In addition, a WWW retrieving apparatus in a WWW retrieving apparatus utilizing a facsimile terminal and an image database apparatus that have a script interpretation executing function disclosed in Japanese Patent Laid-open No. 10-240638 has a unique script embedded in HTML data, whereby it can execute form input by a tone button.

As in the above-mentioned conventional example, in the web browser apparatus utilizing a graphical user interface, it is necessary to directly operate a browser apparatus such as a PC in order to perform so-called browsing for inspecting a web page and updating a page by form input and anchor selection. Thus, if an environment does not allow to use the browser apparatus, the browsing cannot be performed. For example, if a browser apparatus using a desktop PC is utilized, it takes time until the PC can be used if the PC is not activated.

In addition, since it is difficult to carry a browser apparatus with a large screen during travelling, a browser apparatus with a small screen is often carried. However, a page to be displayed becomes small and operation becomes complicated in this case. Further, since it takes time to be master operation of a graphical user interface, it is difficult for a beginner to use the browser apparatus.

In the conventional voice browser apparatus, although it is unnecessary to master operation of a graphical user interface, an mount of information to be obtained is reduced compared with inspection of displayed data. In addition, it is a burden to input a form and select an anchor by voices.

In addition, although a browser apparatus by a graphical user interface and mastering operation of the interface is unnecessary in an apparatus for accessing a web by character recognition or tone input by using a facsimile device, since a form cannot be inputted and an anchor cannot be selected, a perfect browsing cannot be performed. In addition, if a number is designated by tone input, only a page whose number is set in advance can be processed and browsing of an arbitrary page cannot be performed. Further, since it is necessary to perform tone input, operation of the apparatus tends to be complicated. On the other hand, if a URL is recognized by characters, browsing such as form input and anchor selection cannot be performed, and it is a burden to manually write a URL every time.

SUMMARY OF THE INVENTION

The present invention has been devised in view of these problems, and it is an object of the present invention to provide a web browser apparatus and a web browsing method that realize perfect web browsing including form input and anchor selection with simple operation of filling in a paper medium and causing the apparatus to read the paper medium.

For example, the present invention is configured to extract an action identification code for determining the next action from an inputted image and analyze it, determine the next action based on an analysis result of the action identification code and the inputted image and obtain page data from a web server in accordance with the determined action. Moreover, the present invention is configured to, if an instruction is made by a user by filling in a physical medium on which the obtained page data is printed, prepare an action identification code to be used for determining an action corresponding to the instruction based on the page data obtained from the web server, prepare an image to be outputted based on the prepared action identification code and the obtained page data and control such that the image is printed on a physical medium (paper medium, etc.).

It is another object of the present invention to provide a web browser apparatus and a web browsing method for outputting a physical medium that can be determined by a user whether it is usable or not by simply looking at it and does not cause a sense of incongruity in terms of a design, and an image outputting apparatus that is another form of the apparatus.

Moreover, it is another object of the present invention to provide a web browser apparatus and a web browsing method using a physical medium that can charge a fee according to whether a physical medium is outputted for the purpose of distribution or not, an image outputting apparatus and the like.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 illustrates another example of the action identification data in the embodiment of the present invention;

FIG. 15 illustrates an example of HTML data to be handled in the present invention;

FIG. 16 illustrates an example of HTTP request data that is sent in the embodiment of the present invention;

FIG. 17 illustrates an example of HTTP response data that is received in the embodiment of the present invention;

FIG. 35 illustrates an example of incorporated data in the embodiment of the present invention;

DETAILED DESCRIPTION OF THE PREFERRED EMBODIMENTS

Embodiments of the present invention will be hereinafter described with reference to the accompanying drawings.

FIRST EMBODIMENT MODE

First, a first embodiment will be described which reads paper including an action identification code to obtain an image, determines the next action from contents written on the paper and the action identification code, obtains a new web page and adds the action identification code to the new web page to output the web page on paper.

Figure 1:
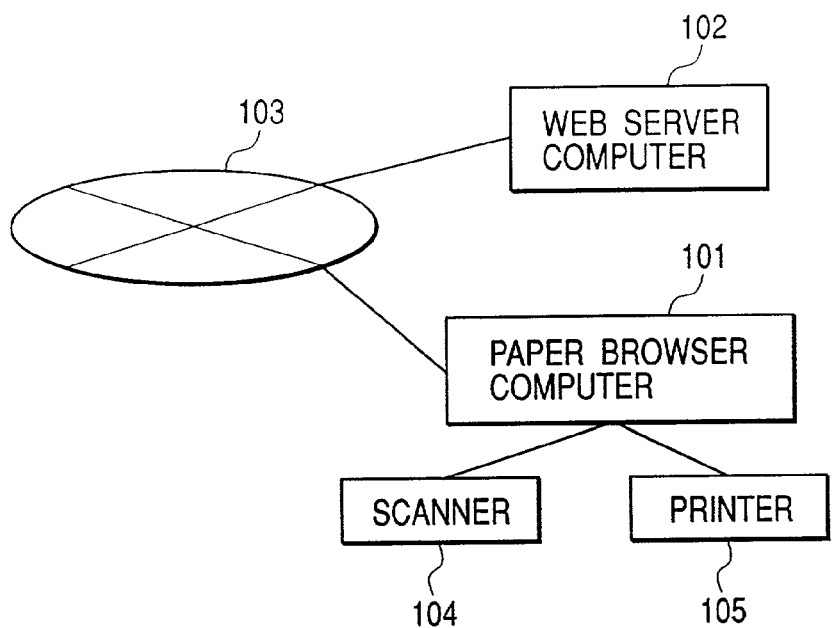
FIG. 1 illustrates a configuration of a web system using an embodiment of the present invention.

FIG. 1 illustrates a configuration of an embodiment of a web system using a web browser apparatus of the present invention. In the figure, reference numeral 101 denotes a paper browser computer mounted with paper browser application software that is a form of a web browser using a physical medium (paper medium) making up the core of the present invention. Reference numeral 102 denotes a web server computer for passing information in response to a request from the paper browser computer. Reference numeral 103 denotes the Internet to be a communication path between the paper browser computer 101 and the web server computer 102.

Reference numeral 104 denotes a scanner for reading an image from paper and passing the read image data to the paper browser computer 101. Reference numeral 105 denotes a printer for printing the image data passed from the paper browser computer 101 on paper. Further, FIG. 1 is for describing a basic configuration of a web system. A multiplicity of paper browser computers and web server computers may be actually connected to the Internet and each paper browser computer can obtain information from an arbitrary web server computer.

Figure 3:
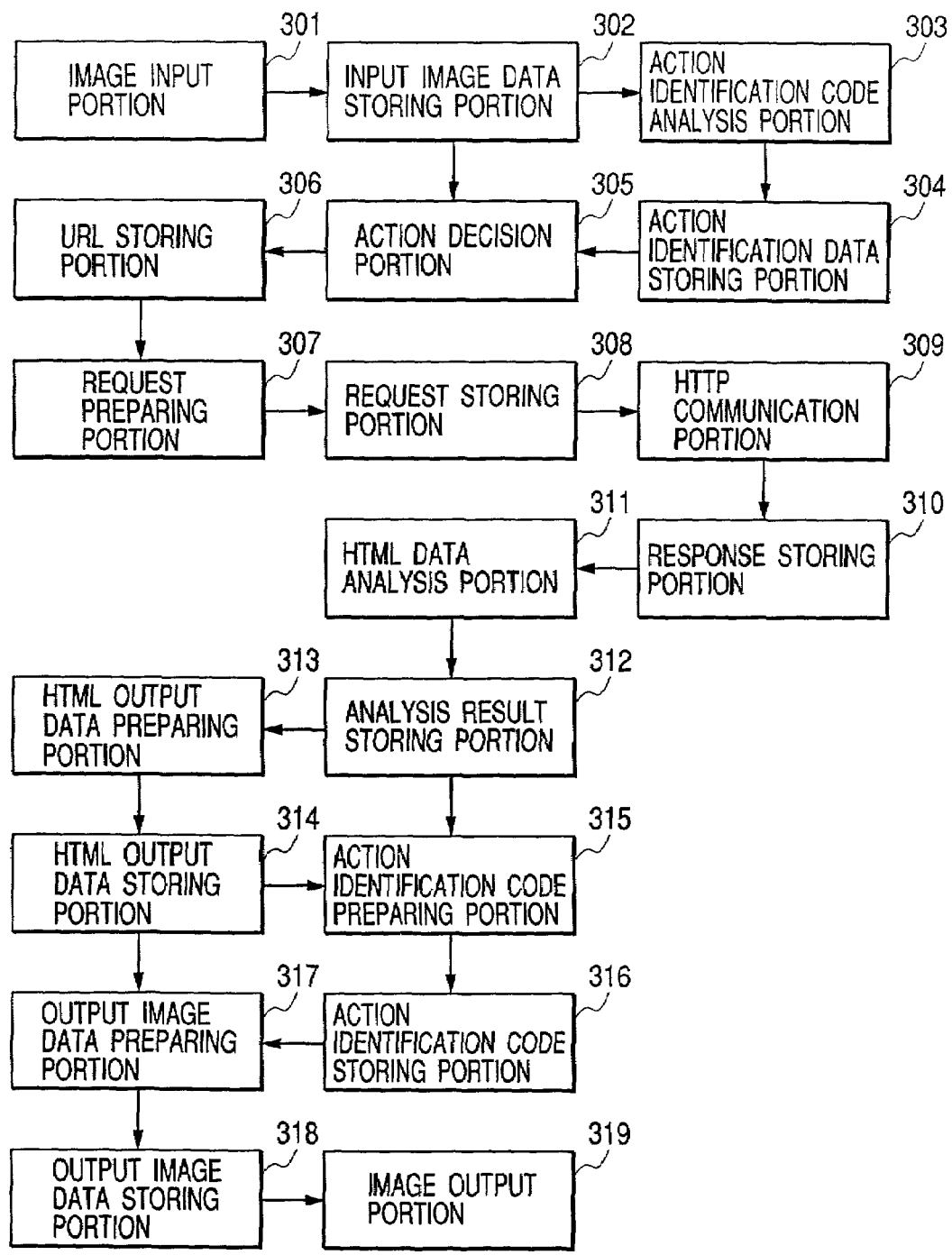
FIG. 3 illustrates a configuration of function blocks in an embodiment of the present invention.

FIG. 3 illustrates an example of a configuration of a function module in the paper browser apparatus of this embodiment. In the figure, reference numeral 301 denotes an image input portion for reading image data from paper and inputting it. Reference numeral 302 denotes an input image data storing portion for storing input image data inputted in the image input portion 301. Reference numeral 303 denotes an action identification code analysis portion for extracting an action identification code, which is found by encoding action identification data to be used in identifying action data instructing the next action, from the input image data stored in the input image data storing portion 302 and analyzing the action identification code to take out action identification data.

Reference numeral 304 denotes an action identification data storing portion for storing the action identification data analyzed in the action identification code analysis portion 303. Reference numeral 305 denotes an action decision portion for deciding the next action of the browser from the action identification code stored in the action identification data storing portion 304 and the input image data stored in the input image data storing portion 302 and setting a URL for realizing the action.

Reference numeral 306 denotes a URL storing portion for storing the URL decided in the action decision portion 305. Reference numeral 307 denotes a request preparing portion for preparing HTTP request data for obtaining a page indicated by the URL stored in the URL storing portion 306 and an address of a server that is a transmission destination of the request data. Reference numeral 308 denotes a request storing portion for storing the request data and the server address that are prepared in the request preparing portion 307.

Reference numeral 309 denotes an HTTP communication portion for sending the request data stored in the request storing portion 308 to a server indicated by the server address stored in the same portion and receiving HTTP response data from the server. Reference numeral 310 denotes a response storing portion for storing the HTTP response data received by the HTTP communication portion 309. Reference numeral 311 denotes an HTML data analysis portion for taking out and analyzing HTML data if the response data stored in the response storing portion 310 includes the HTML data.

Reference numeral 312 denotes an analysis result storing portion for storing an analysis result that was analyzed by the HTML data analysis portion 311. Reference numeral 313 denotes an HTML output data preparing portion for preparing HTML output data in which a display layout of each element (including a text, an object, a control area filled in by a user, and the like) is set from the analysis result of the HTML data stored in the analysis result storing portion 312. Reference numeral 314 denotes an HTML output data storing portion for storing the HTML output data prepared by the HTML output data preparing portion 313.

Reference numeral 315 denotes an action identification code preparing portion for preparing an action identification code to be used for identifying objects (hyperlink, a radio button check box, a submit button and the like) included in the HTML data stored in the HTML output data storing portion 314 when the HTML output data is printed on paper. The action identification code is prepared by encoding classification information of an action, positional information of a control area to be filled in on printed paper by a user and action identification data indicating URL information and the like. Details of the action identification data will be described later.

Reference numeral 316 denotes an action identification code storing portion for storing the action identification code prepared in the action identification code preparing portion 315. Reference numeral 317 denotes an output image data preparing portion for combining the HTML output data stored in the HTML output data storing portion 314 and the action identification code stored in the action identification code storing portion 316 to prepare output image data. Reference numeral 318 denotes an output image data storing portion for storing the output image data prepared by the output image data preparing portion 317. Reference numeral 319 denotes an image output portion for outputting the output image data stored in the output image data storing portion 318.

In this embodiment, the function of the image input portion 301 is realized by a scanner 204 and the function of the image output portion 319 is realized by a printer 205. All the other functions are realized as a computer program operating on a paper browser computer 201.

Figure 4:
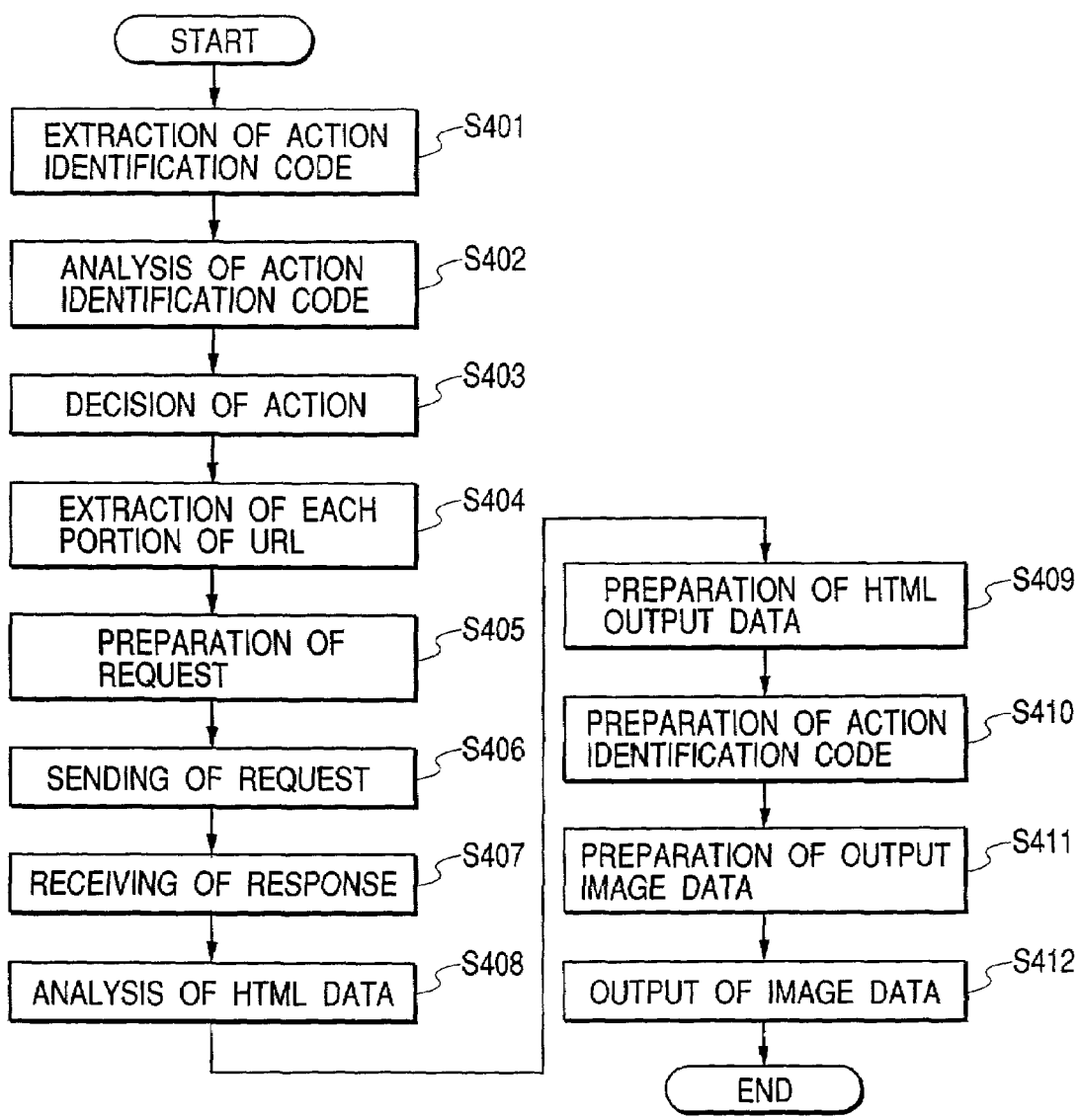
FIG. 4 is a flow chart showing processing procedures in the embodiment of the present invention.

FIG. 4 is a flow chart showing processing procedures of software to be processed by the paper browser computer of this embodiment. This processing is executed when an image including an action identification code is read by the image inputting portion 301 and the input image is stored in the input image storing portion 302. For example, the processing is executed by a method in which the processing is realized as an independent application program and the application program is activated when an image is read by a scanner. When an input image is stored in an input image storing portion 401, an action identification code is extracted from the input image in step 401. Then, the processing shifts to step 402.

In step 402, the action identification code extracted in step 401 is analyzed to obtain action identification data. Then, the processing shifts to step 403. In step 403, a filling-in situation of a user is determined to decide an action based on the action identification data obtained in step 402. The action is set as URL data that is required next. Then, the processing shifts to step 404.

In step 404, each portion of the URL data to be required next is extracted based on the action decided in step 403. Each portion of the URL data consists of 1) a schemer portion indicating means for obtaining a page, 2) a host portion indicating a host name of a web server storing a page, 3) a port portion indicating a port of a web server storing a page, 4) a path portion indicating a position of a page in the web server and 5) a query portion indicating inquiry data in the case in which a form input or the like is performed. For example, if a URL to be prepared is http://asample.co.jp/haneda.html, the schemer portion is http, the host portion is asample.co.jp, the port portion is 80 (since it is omitted in this URL, a default value is used), the path portion is haneda.html and the query portion is empty. When each portion is extracted, the processing shifts to step 405. Further, although a schemer other than http may be processed, only http is handled here for simplicity of description.

In step 405, HTTP request data is prepared using a value of each portion extracted in step 404. Then, the processing shifts to step 406. FIG. 16 illustrates HTTP request data with respect to the above-mentioned example. Although data identifying a web browser, data indicating a receivable data type and the like should be added to an HTTP request actually, only minimum required data is indicated here for simplicity of description.

In step 406, the HTTP request data prepared in step 405 is sent. More specifically, a TCP/IP connection is established with respect to a port indicated by a value of the above-mentioned port portion of a server indicated by a value of the above-mentioned server portion and the above-mentioned HTTP request data is sent. Then, the processing shifts to step 407.

In step 407, an HTTP response is received from the server to which the HTTP request was sent in step 406. The response is sent through the TCP/IP connection established in step 406. This HTTP response data is stored in the response storing portion 310. Then, the processing shifts to step 408. FIG. 17 illustrates an example of the HTTP response data. The header of this response data indicates that an MIME type of a body portion (data of an empty line and below) is text/html and the length of the data is 924 byte. Although data such as identification data of a web server and time data for preparing data are often further included in the header portion actually, such data is omitted here for simplicity of description. In addition, although an actual web browser may handle data other than data whose MIME type is text/html, since it is a main purpose of the present invention to handle HTML data, a data type to be handled is limited to text/html for simplicity of description.

In step 408, HTML data that is a body of the HTTP response received in step 407 is analyzed to obtain tag elements in the HTML and a hierarchical relation among the tag elements. Then, the processing shifts to step 409. In step 409, a layout of texts and control objects indicated by the tag elements is arranged to prepare HTML output data using the result analyzed in step 408. Then, the processing shifts to step 410.

In step 410, action identification data of a page to be outputted anew is prepared from the analysis result obtained in step 408 and paint position data of a control object in the HTML output data prepared in step 409, if necessary, and paint data of an action identification code that is found by encoding the action identification data is prepared. Then, the processing shifts to step 411.

In step 411, the HTML output data prepared in step 409 and the action identification code prepared in step 410 are combined to prepare output image data. Then, the processing shifts to step 412. In step 412, the output image data prepared in step 411 is printed and outputted in the image output portion 319. Then, the entire processing is finished. Then, when the user fills in the printed paper and causes the scanner to read it anew, the processing from the step 401 is started again.

Specific processing procedures in the processing for extracting an action identification code of step 401, the processing for analyzing an action identification code of step 402, the processing for deciding an action of step 403, the processing for preparing HTML output data of step 409 and the processing for generating an action identification code of step 410 also vary according to a mode for embodying an action identification code.

A mode for embodying an action identification code in this embodiment and the above-mentioned each processing procedure will be hereinafter described.

Figures 5, 6:
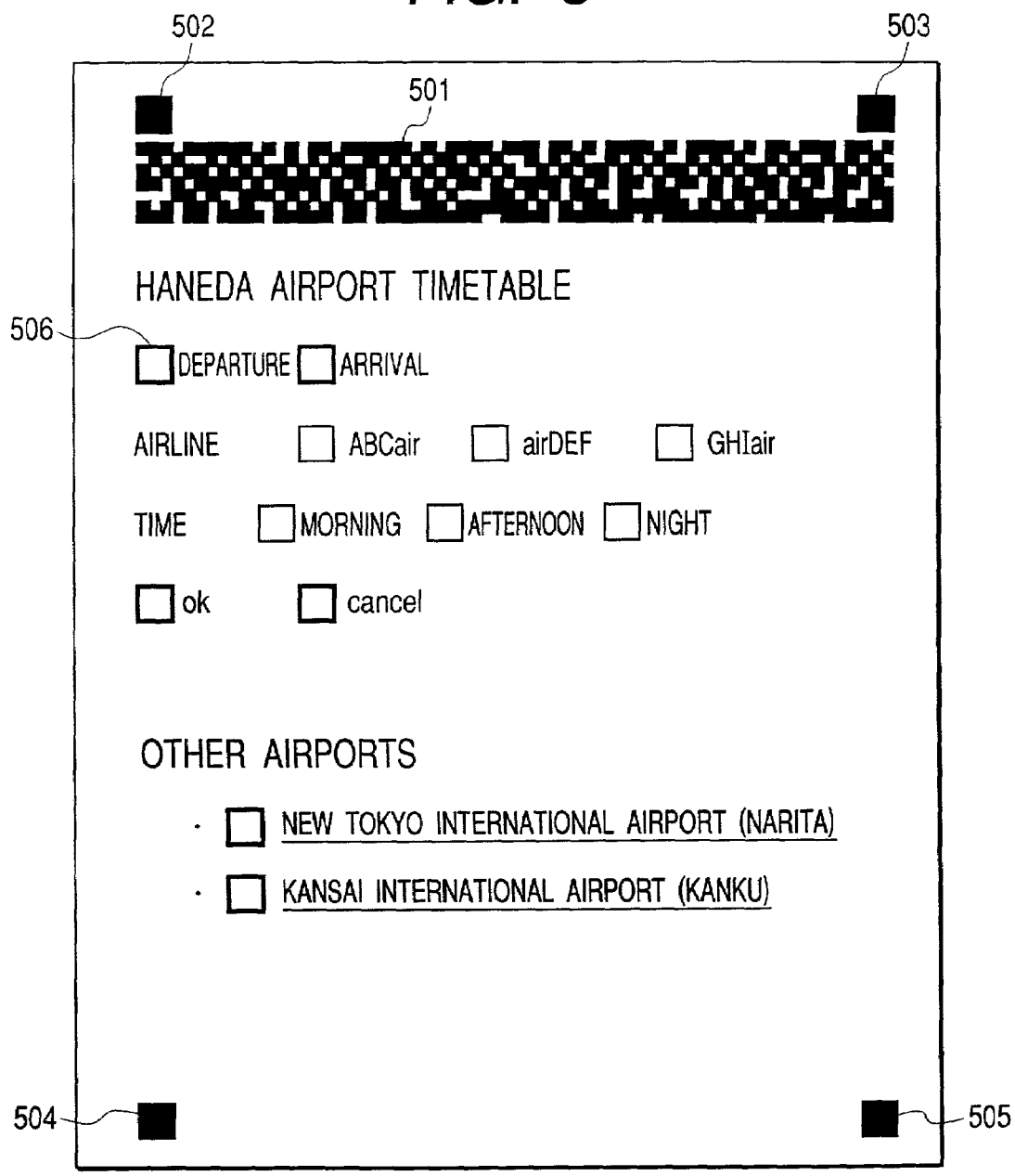
FIG. 5 illustrates an example of a paper medium on which an action identification code is printed in the embodiment of the present invention.
FIG. 6 illustrates an example of action identification data in the embodiment.
Figure 11:
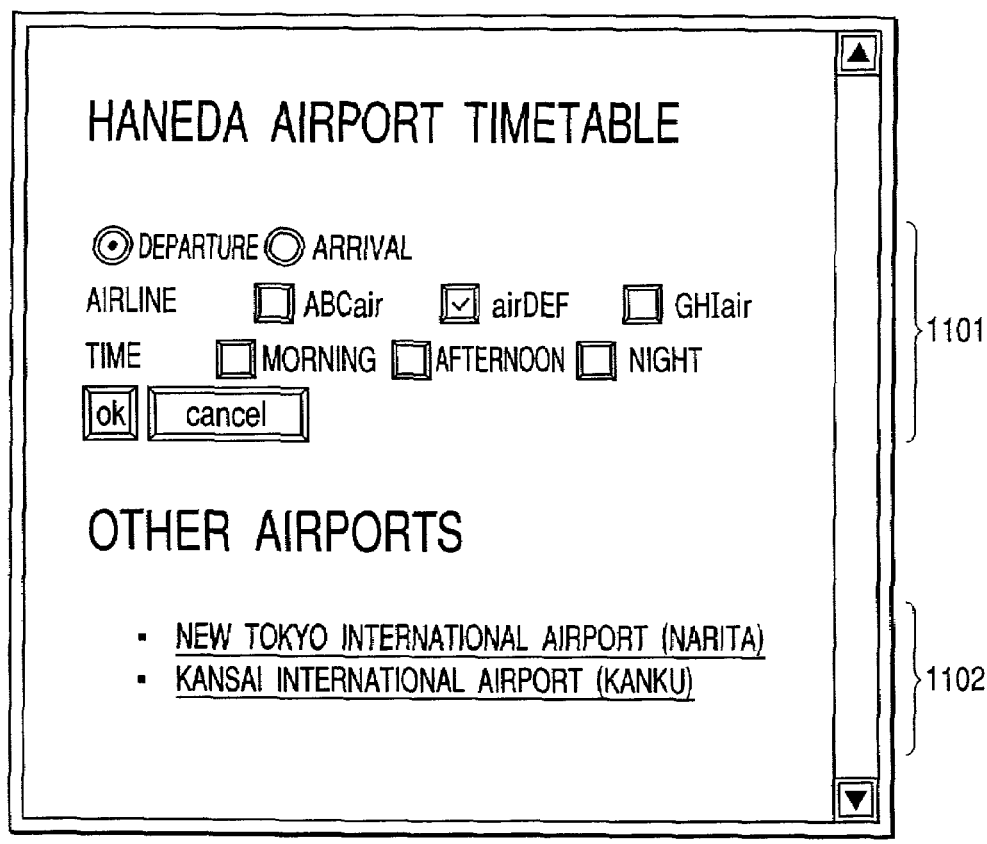
FIG. 11 illustrates a display example in the conventional example.
Figure 12:
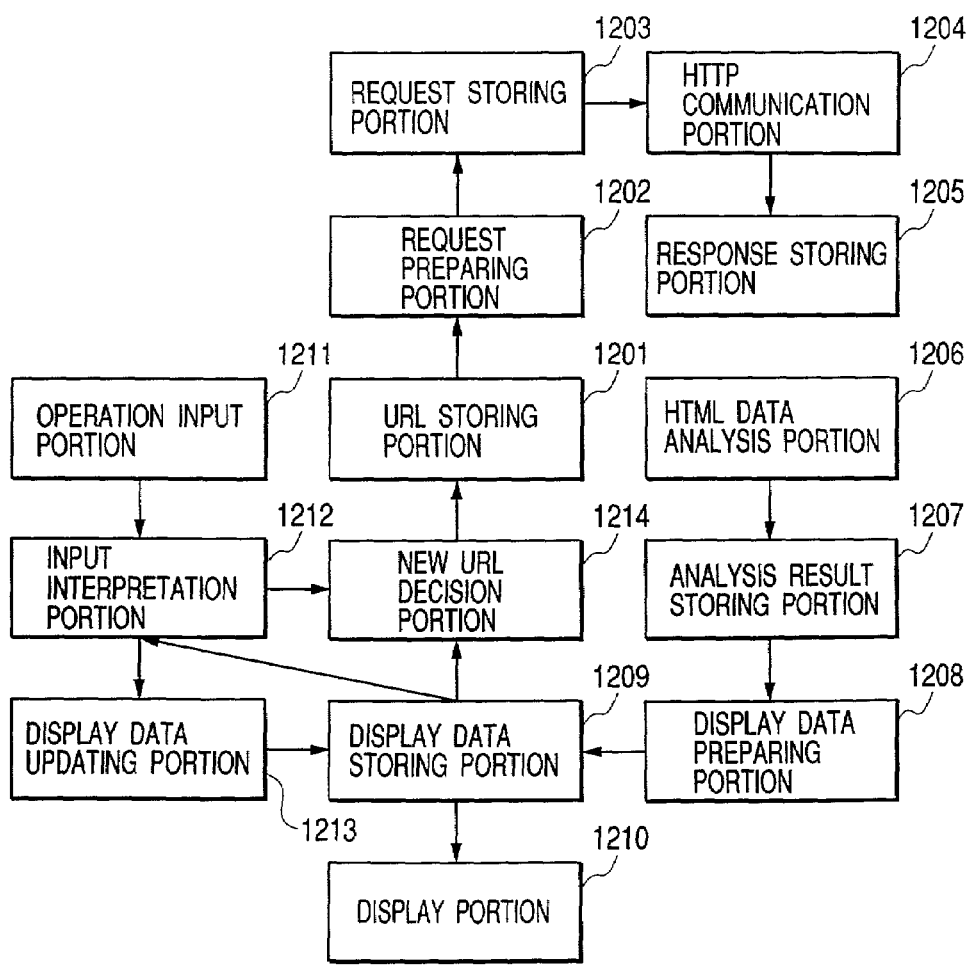
FIG. 12 illustrates a configuration of function blocks in the conventional example.
Figure 13:
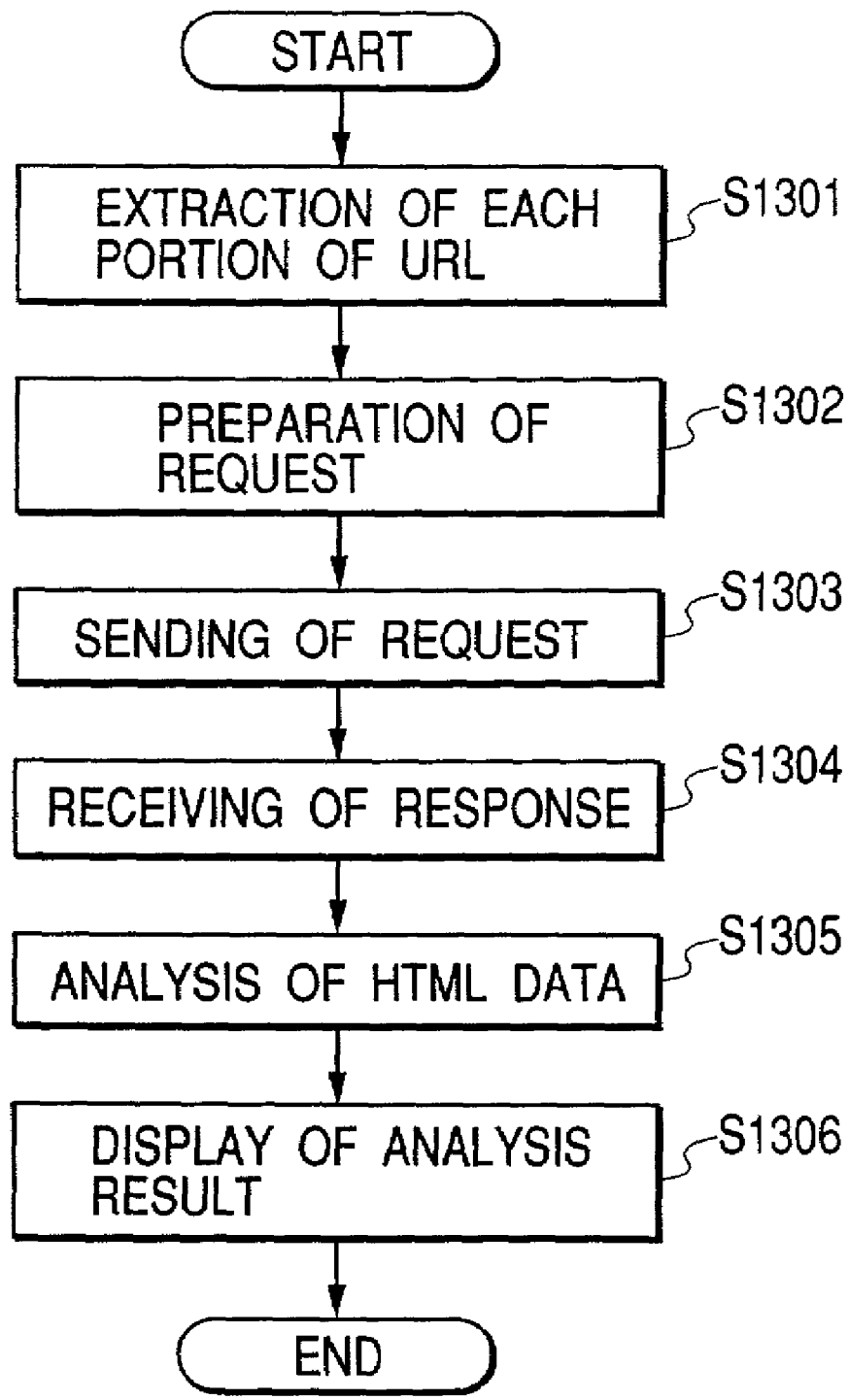
FIG. 13 is a flow chart showing processing procedures in the conventional example.
Figure 14:
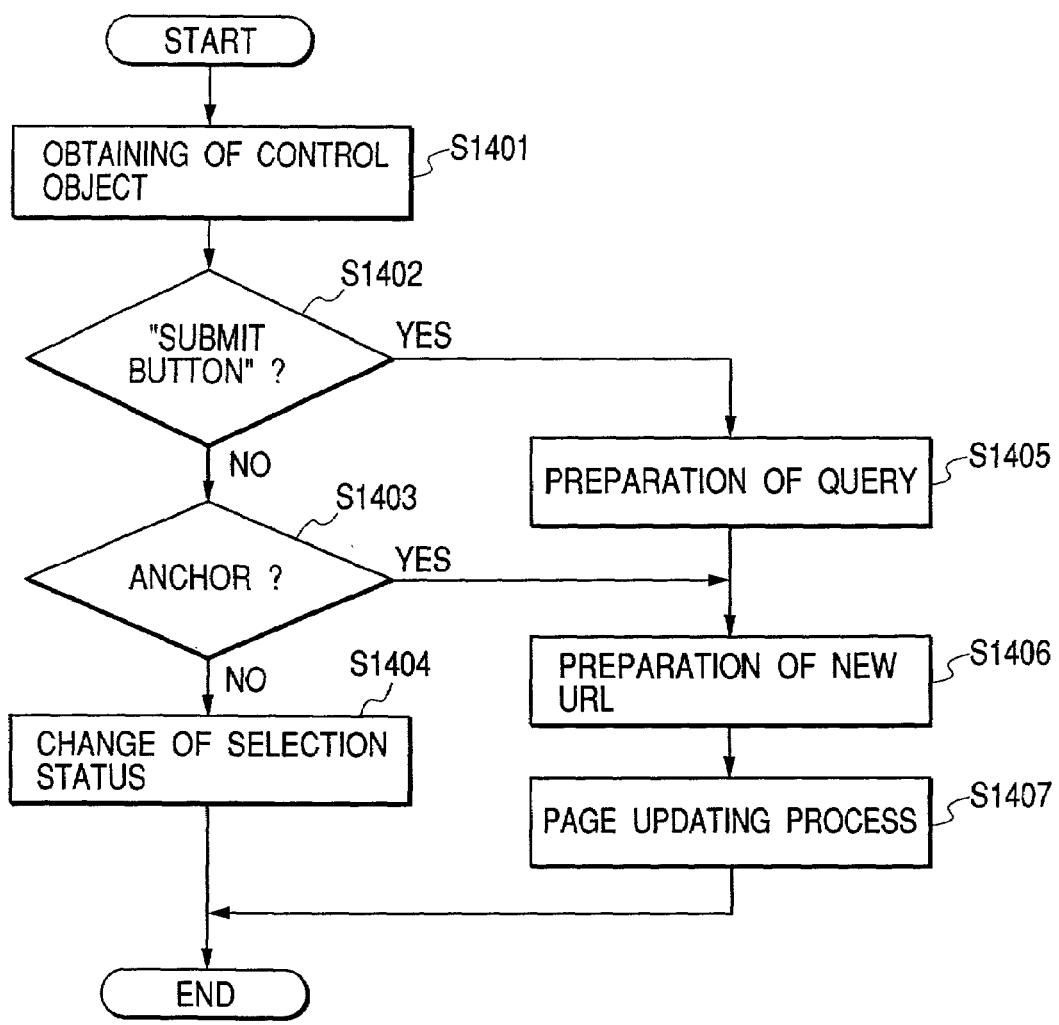
FIG. 14 is a flow chart showing processing procedures in the conventional example.
Figure 18:
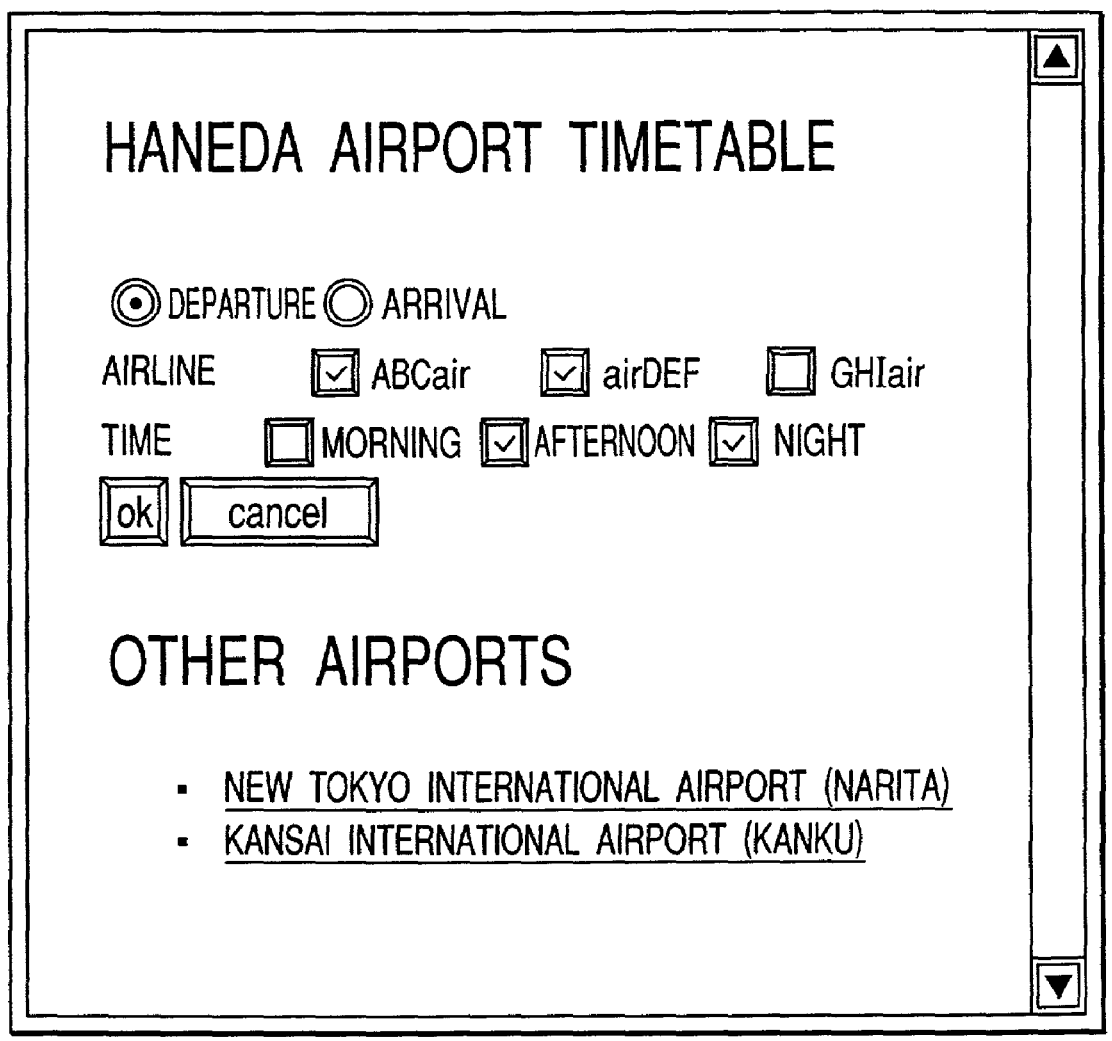
FIG. 18 illustrates a display example after operation by a user in the conventional example.

FIG. 5 shows an example of a paper medium on which an action identification code is added to the HTML data shown in FIG. 15 and outputted in this embodiment. In the figure, reference numeral 501 denotes an action identification code main body, 502 to 505 denote position identification markers. The other parts are a control area 506 and data that has the layout of the HTML data arranged and outputted. The HTML data is outputted with substantially the same form and the same layout as the display in the conventional example shown in FIG. 11.

In this embodiment, in order to identify an area on a paper medium, a printable area is divided in a mesh shape consisting of X meshes in the horizontal direction and Y meshes in the vertical direction. Then, a rectangular area in the upper left corner is referred to by a dimensional coordinate (0, 0), an area moved one mesh in the right direction is referred to by a coordinate with the x component increased by one and an area moved one mesh in the down direction is referred to by a coordinate with the y component increased by one. That is, a rectangular area in the upper right corner is referred to by (X−1, 0), a rectangular area in the lower left corner is referred to by (0, Y−1) and a rectangular area in the lower right corner is referred to by (X−1, Y−1). Here, a rectangular area referred to by the coordinate (x, y) is written as m(x, y). Further, in this embodiment, description will be hereinafter made with the value of X as 80 and the value of Y as 120. However, these values may be arbitrary values.

The positional markers 502 to 505 are all the areas of the meshes in the following mesh sets M2, M3, M4 and M5 printed in black, respectively.

$$M2=\{m(x, y) \mid 0<=x<3, 0<=y<3\}$$
$$M3=\{m(x, y) \mid X-3<=x<X, 0<=y<3\}$$
$$M4=\{m(x, Y) \mid 0<=x<3, Y-3<=y<Y\}$$
$$M5=\{m(x, Y) \mid X-3<=x<X, Y-3<=y<Y\}$$

The positional markers are utilized for setting a position of each mesh in input image dte after reading an image printed on a paper medium by an image input portion.

The action indentification code main body 501 is a code that is found by encoding action identifaction data. In this embodiment, action identification data consists only of an ASCII code of seven bits and integers that can be represented by seven bits (i.e., integers from 0 to 127). The action identification code in this embodiment is a code for representing each byte of the action identification data by seven rectangular areas arranged vertically. The code is generated by associating the bits in meshes such that a more significant bit is below a less significant bit and the less significant bit is above the more significant bit, printing a corresponding mesh in black if a bit is 1 and printing nothing if a bit is 0. One vertical line of seven rectangular areas generated for each bit of the action identification data is arranged in the right direction in the order of data. If one vertical lines of seven rectangular areas in one vertical line are arranged to the right end, other vertical lines of seven rectangular areas are arranged from the left end in the postion seven rectangular areas below.

An action identification code will be hereinafter described in a formulated manner.

The length of the action identification data is assumed to be L bytes, and the least significant bit that is j-th byte from the top is represented by b(j, 0) and each bit is represented by b(j, 1), b(j, 2), . . . b(j, 6) toward the most significant bit. In addition, it is assumed that H=[(L−1)/X]+1. Here, [ ] is a notation for representing a maximum integer that does not exceed a value in [ ].

Then, if X*i+j<L with respect to each of i, j and k that is 0<=i<H, 0<=j<X and 0<=k<6, a rectangular area m(j, i*7+5+k) is printed in black when a bit b(X*i+j, k) is 1. Here, 5 is added to the Y coordinate of the mesh in order to print an action identification code main body from a position that is distant from the positional marker by two rectangular areas.

Figure 7:
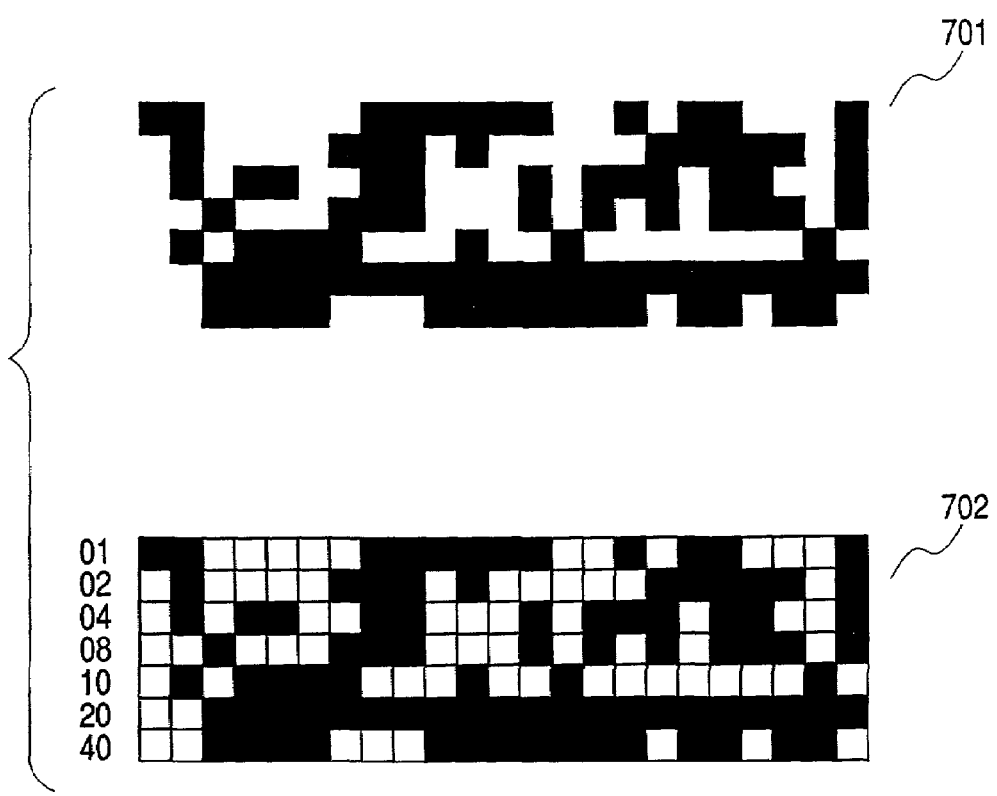
FIG. 7 illustrates an example of an action identification code main body in the embodiment of the present invention.
Figure 9:
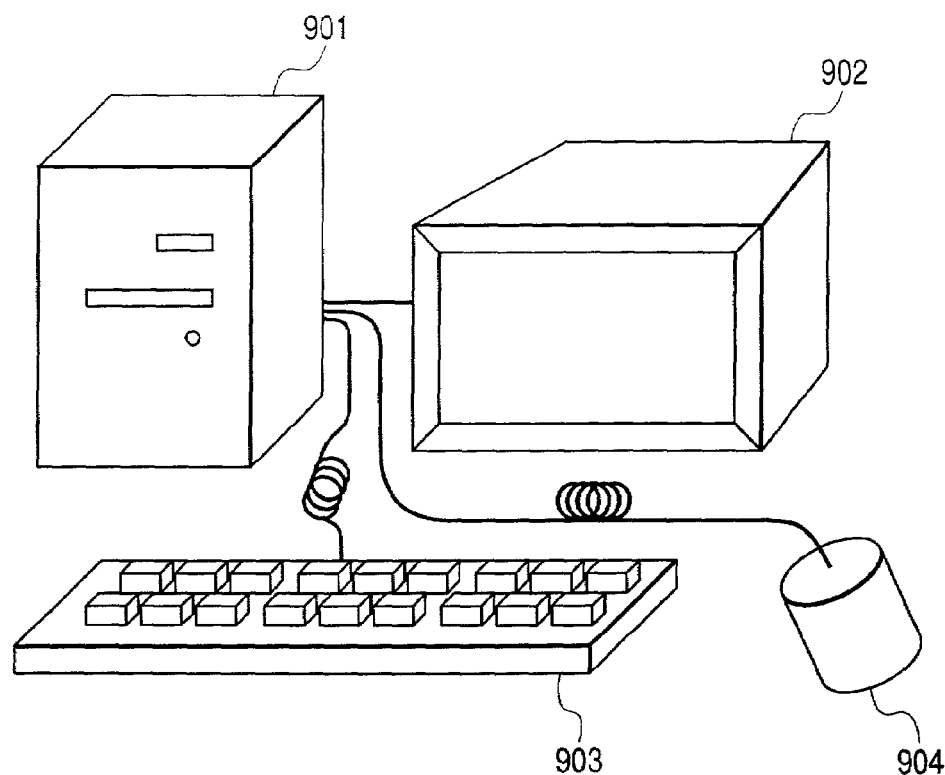
FIG. 9 illustrates a hardware configuration of a conventional example.
Figure 10:
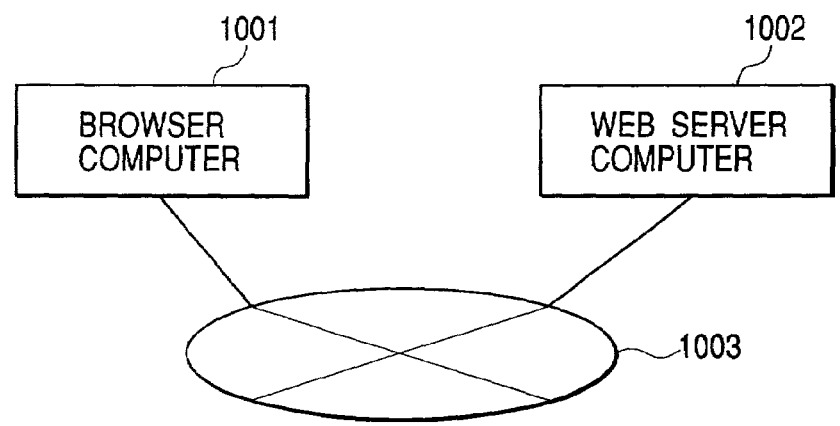
FIG. 10 illustrates a configuration of a web system using the conventional example.

As an example, an action identification code that is found by encoding the action identification data shown in FIG. 6 is shown in FIG. 7. Each box of FIG. 6 indicates data of one byte. In the figure, a numerical value in parentheses indicates that it is stored as an integer value. Other numerical values indicate that ASCII codes of characters in the figure are stored. In FIG. 7, reference numeral 701 denotes an actual action identification code. Reference numeral 702 shows border lines of meshes with solid lines such that an area of each mesh can be easily seen. In addition, it also shows which bit each line corresponds to. Contents of the action identification data will be described later.

In this embodiment, a user paints out a control area on an outputted paper medium, thereby selecting a radio button and a check button in a form. For example, a rectangular area of 506 in FIG. 5 is a control area. When a control area corresponding to a control object in the browser apparatus of the conventional example is painted to a certain degree, it is interpreted that the control area is selected and a new page is obtained by inserting it in a query of a name attribute and a value attribute of a corresponding tag. In order to distinguish a radio button from a check box, a control area with respect to a radio button is represented by bold lines. In addition, as to a submit button and a reset button, control areas are printed first and then labels are printed. Here, since only an alternative selection is allowed for these control areas as for a radio button, they are represented by bold lines.

In this embodiment, a control area is provided in front of an anchor and is printed. It is interpreted that selecting this control area is the selection of the anchor. Since only an alternative selection is allowed for this control area as for the radio button, it is represented by bold lines.

Except the difference of a control object and a control area, other parts are outputted in the same form as the display of the browser apparatus of the conventional example. Further, it is assumed that, in this embodiment, all control areas consists of 3*3 meshes (i.e., nine meshes). Since all the borders of the control areas are on the borders of the meshes, other letters and the like are arranged to be adapted to the control areas.

Action identification data in this embodiment is data in which the following records are listed.

1) Page URL Record

A URL of a page itself to be outputted is written. This record consists of the following fields.

Flag field (first byte)

This takes the integer value 1 that indicates a page URL record.

Record length field (second byte)

This takes an integer value indicating the length (number of bytes) of this record.

URL field (up to the last byte of a record from the third byte)

This takes a character string that is a URL of a page.

2) Base Record

Contents of a BASE tag of HTML on a page to be outputted, if any, are written. This field consists of the following fields.

Flag field (first byte)

This tates the integer value 2 indicating a base record.

Record length field (second byte)

This takes an integer value indicating the length (number of bytes) of this record.

Base field (up to the last byte of a record from the third byte)

This takes a character string that is a value of a BASE tag.

3) Anchor Record

Contents of an A tag of HTML indicating an origin anchor on a page to be outputted, if any, are written. This record consists of the following fields.

Flag field (first byte)

This takes the integer value 3 indicating an anchor record.

Record length field (second byte)

This takes an integer value indicating the length (number of bytes) of this record.

Control area field (third and fourth bytes)

This takes a coordinate of meshes indicating a position of a control area with respect to this anchor. This takes an X coordinate value of a mesh in the upper left among the meshes forming the control area in the third byte and a Y coordinate value in the fourth byte.

Href field (up to the last byte of a record from the fifth byte)

This takes a character string that is a value of an Href attribute of a corresponding A tag.

4) Form Record

Contents of a FORM tag of HTML indicating a form on a page to be outputted, if any, are written. This record consists of the following fields.

Flag field (first byte)

This takes the integer value 4 indicating a form record.

Record length field (second byte)

This takes an integer value indicating the length (number of bytes) of this record.

Element number field (third byte)

This takes an integer value indicating the number of form elements (radio buttons, check boxes and the like) included in this form. Records corresponding to the form elements follow this record by the number of this value.

Action designation field (up to the last byte of a record from the fourth byte)

This takes a character string that is a value of an action attribute of a corresponding FORM tag.

5) Submit Record

Contents of an INPUT tag designating a submit button that is a form element of a FORM tag corresponding to a form record are written. This record is listed after a form record with respect to a form to which a corresponding submit button belongs. This record consists of the following fields.

Flag field (first byte)

This takes the integer value 5 indicating a submit record.

Record length field (second byte)

This takes an integer value indicating the length (number of bytes) of this record.

Control area field (third and fourth bytes)

This takes a coordinate of meshes indicating a position of a control area with respect to this submit button. This takes an X coordinate value of a mesh in the upper left among the meshes forming the control area in the third byte and a Y coordinate value in the fourth byte.

6) Reset Record

Contents of an INPUT tag designating a reset button that is a form element of a FORM tag corresponding to a form record are written. This record is listed after a form record with respect to a form to which a corresponding reset button belongs. This record consists of the following records.

Flag field (first byte)

This takes the integer value 6 indicating a reset record.

Record length field (second byte)

This takes an integer value indicating the length (number of bytes) of this record.

Control area field (third and fourth bytes)

This takes a coordinate of meshes indicating a position of a control area with respect to this reset button. This takes an X coordinate value of a mesh in the upper left among the meshes forming the control area in the third byte and a Y coordinate value in the fourth byte.

7) Radio Button Record

Contents of an INPUT tag designating a radio button that is a form element of a FORM tag corresponding to a form record are written. This record is listed after a form record with respect to a form to which a corresponding radio button belongs. This record consists of the following records.

Flag field (first byte)

This takes the integer value 7 indicating a radio button record.

Record length field (second byte)

This takes an integer value indicating the length (number of bytes) of this record.

Control area field (third and fourth bytes)

This takes a coordinate of meshes indicating a position of a control area with respect to this radio button. This takes an X coordinate value of a mesh in the upper left among the meshes forming the control area in the third byte and a Y coordinate value in the fourth byte.

Group ID field (fifth byte)

This takes a group ID (integer number) to be given from 1 for each radio button with an identical value of a name attribute among form elements to which a corresponding radio button belongs.

Query data field (up to the last byte of a record from the sixth byte)

This takes a character string to be inserted in a query when a corresponding radio button is selected.

8) Check Box Record

Contents of an INPUT tag designating a check box that is a form element of a FORM tag corresponding to a form record are written. This record is listed after a form record with respect to a form to which a corresponding check box belongs. This record consists of the following records.

Flag field (first byte)

This takes the integer value 8 indicating a check box record.

Record length field (second byte)

This takes an integer value indicating the length (number of bytes) of this record.

Control area field (third and fourth bytes)

This takes a coordinate of meshes indicating a position of a control area with respect to this radio button. This takes an X coordinate value of a mesh in the upper left among the meshes forming the control area in the third byte and a Y coordinate value in the fourth byte.

Query data field (up to the last byte of a record from the fifth byte)

This takes a character string to be inserted in a query when a corresponding check box is selected.

FIG. 8 illustrates an example of action identification data in the case in which the HTML data of FIG. 15 is outputted.

It is assumed that a page URL record of the HTML data of FIG. 15 is http://asample.co.jp/haneda.html.

Such action identification data is added to an output image as an action identification code, whereby it becomes possible to determine a selection state to decide a URL for obtaining a new page and obtain and output the new page when a paper medium on which a user has filled in a control area is read.

Processing for preparing HTML output data (step 409), processing for generating an action identification code (step 410), processing for preparing output image data (step 411), processing for extracting an action identification code (step 401), processing for analyzing an action identification code (step 402) and processing for deciding an action (step 403) that realize the above function specifically in this embodiment will be hereinafter described.

The processing for preparing HTML output data (step 409) is substantially the same as generation of a layout in the processing for displaying an analysis result of the conventional example. The horizontal length of an output data image is set as a length for X meshes and a layout is generated to fit in this range. The preparation processing is different from the displaying processing of the conventional example in that a control area is set as described above to surround the control area by solid lines and lines in a layout of other characters and the like are arranged to fit the control area. In addition, a coordinate value of a mesh in the upper left for identifying the set control area is stored. This coordinate value is stored as a value assuming that the coordinate of the mesh in the upper left of the output data image is (0, 0).

In the processing for generating an action identification code (step 410), a page URL record is prepared first from a URL of HTML data. Next, a BASE tag, a FORM tag or an A tag that indicates an origin anchor is retrieved from the top of an analysis tree based on an analysis result of the HTML data. If there are these tags, a base record, a form record and an anchor record are prepared, respectively. When the form record is prepared, an INPUT tag is retrieved out of elements of the FORM tag and a submit record, a reset record, a radio button record and a check box record are prepared according to a type attribute of the INPUT tag. When the preparation of these records are finished, the number of form elements are substituted for an element number field of the form record.

Further, a method of generating a value of a query data field in the radio button record and the check box record is the same as the query preparation of the conventional example. In addition, as to the A tag in the FORM element, an anchor record is prepared after preparation of records for these form elements is finished. An arbitrary value is put in each control area field until the processing of all the tags is finished. When the processing of all the tags is finished and a data length L of an action identification data is fixed, the above-mentioned value H is found.

Thus, a coordinate of a control area corresponding to each record is taken out with reference to coordinate data of the control area prepared in the processing for preparing HTML output data. A value of the X coordinate is substituted for a value in a control area field of a corresponding record. A value of the Y coordinate is added with a value of h found by the following equation and then substituted for a value in a control area field of a corresponding record.

$$h = H*7 + 8$$

After preparing the action identification data in this way, image data and a positional marker of an action identification code main body are prepared in accordance with the above-mentioned encoding method. These are the procedures of the processing for generating an action identification code.

In the processing for preparing output image data (step 411), the image data prepared by the processing for preparing an action identification code and the image data prepared by the processing for preparing HTML output data are laid one on top of the other to prepare output image data. In this case, the two pieces of image data are laid one on the other such that the mesh m(0, 0) of the HTML output data coincides with the mesh m(0, h) of the image data of the action identification code.

In the processing for extracting an action identification code (step 401), a positional marker is extracted from input image data first. This is realized by a general method of dividing a black area and a white area. When the positional marker is extracted, a position in the upper left corner of a positional marker 502 is set as (X00, Y00), a position in the upper right corner of a positional marker 503 is set as (X10, Y10) and a position in the lower left corner of a positional marker 504 is set as (X01, Y01) in the coordinate system of the input image data. From these positions, the relation between the upper left corner of the mesh m(x, y) in the output image data and the coordinate system (the x coordinate value is represented by x' and the y coordinate value is represented by y') in the input image data is found as shown by the following equation.

$$x' = (X10 - X00)/X * x + (X01 - X00)/Y * y + X00 \quad y' =$$
$$(Y10 - Y00)/X * x + (Y01 - Y00)/Y * y + Y00$$

Here, the area m' (x, y) in the input image data of the mesh m(x, y) is an area surrounded by (x'1, y'1), (x'2, y'2), (x'3, y'3) and (x'4, y'4) that are found by substituting each point (x, y), (x+1, y), (x+1, y+1) and (x, y+1) for the above equation.

Here, b1(x, y) is defined as a function that becomes 1 when 80% or more of pixels included in m' (x, y) is black and becomes 0 in other cases. In addition, b2(x, y) is defined as a function that becomes 1 when 30% or more of pixels included in m' (x, y) is black and becomes 0 in other cases. In addition, d(x, y) is defined as $d(x, y) = \Sigma i=_0^6 b1(x, y+i)*2^i$. The above-mentioned calculation processing can be realized easily if a computer is used.

Then, d(x, y) is found by incrementing x by one until x reaches X with x=0, y=5 as a start point. This value is sequentially substituted for an action identification data array. When x reaches X, the value of y is increased by seven and the same processing is repeated. If the value of d(x, y) becomes 0 in the middle, the processing is finished.

In the processing for analyzing an action identification code (step 402), a top byte of an action identification data array is taken out. The type of a record is decided in view of this value. Then, the next byte is taken out and the length of the record is decided. For the inside of the record, a value of each field is taken out in accordance with a format according to the type of the record. Then, the next byte advanced by the length of the record is taken out and the type of the next record is decided. Subsequently, this processing is repeated until reaching the last of the action identification data array.

In the processing for deciding an action (step 403), the following processing is performed. First, with respect to a submit record, a reset record and an anchor record among the records of the analyzed action identification data, b2(x, y) is found using input image data for the value x, y of their control area fields. If there is no record in which this value is 1, this is an error because a user has not selected any record. In addition, if there are two or more records in which the value is 1, this is an error because selections are redundant. In case of an error, an output image describing the error is generated and outputted from an image output portion. The processing advances to the next when there is only one record in which the value is 1.

If the record in which the value is 1 is an anchor record, the value of the href field of the anchor record is set as a URL of a page to be obtained next. However, in the case in which this value is a relative path, it is the relative path from a value of a base field if there is the base record or from a value of a URL field of a page URL record if there isn't the base record. Thus, the value is combined with these values to be converted to a complete URL including a schemer portion and a host portion, which is set as a URL of a page to be obtained next.

If the record in which the value is 1 is a reset record, the same page is outputted again. That is, a URL of a page to be obtained next is set as a value of a URL field of a page URL record.

If the record in which the value is 1 is a submit record, a value of an action designation field in a form record of a form to which the submit record belongs is set as a value of portions other than a query portion in a URL of a page to be obtained next. However, in the case in which this value is a relative path, it is the relative path from a value of a base field if there is the base record or from a value of a URL field of a page URL record if there isn't the base record. Thus, the value is combined with these values to be converted to a complete URL including a schemer portion and a host portion, which is to be used.

Next, a selection state of a radio button record and a check box record corresponding to the form element of the form is checked to prepare a query portion. b2(x, y) is found with respect to the value x, y in a control area data of the record using input image data. If this value is 1, a value of a query data of the record is added to the query portion. If a plurality of values are added, the values are connected by "&" as in the conventional example. Further, if two or more records with the same value of a group ID field in the radio button record are in the selection state (the value of b2(x, y) is 1), this is an error. Then, output image data in which contents of the error is written is prepared and outputted from an image output portion.

Figure 22:
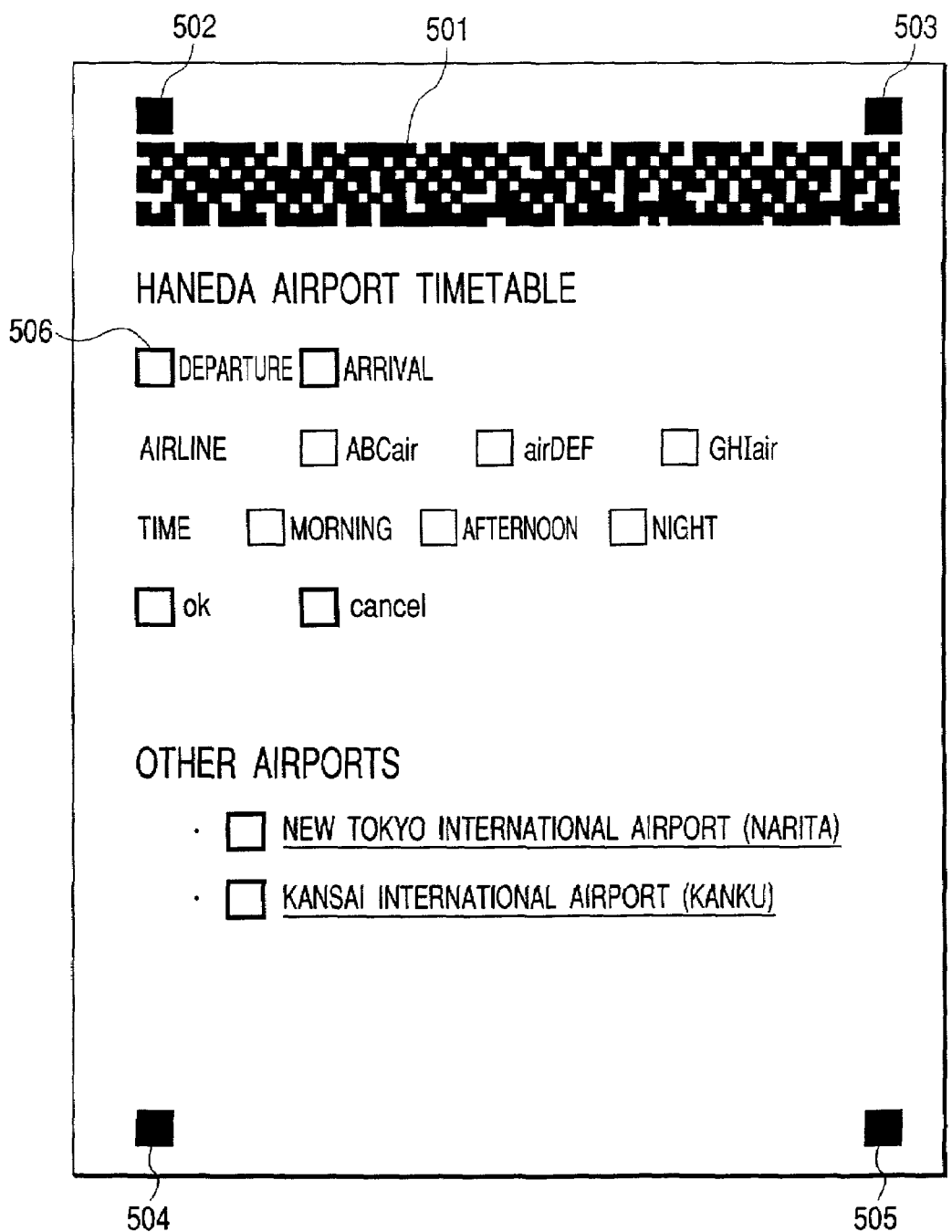
FIG. 22 illustrates an example of a paper medium that is inputted in the embodiment of the present invention.

FIG. 22 illustrates an example of a paper medium that is inputted in the paper browser apparatus of this embodiment. A user has painted a part of this paper medium in black. In this example, since a control area corresponding to an anchor code is painted, a page indicated by the URL http://asample.co.jp/kanky.html is outputted next.

Figure 23:
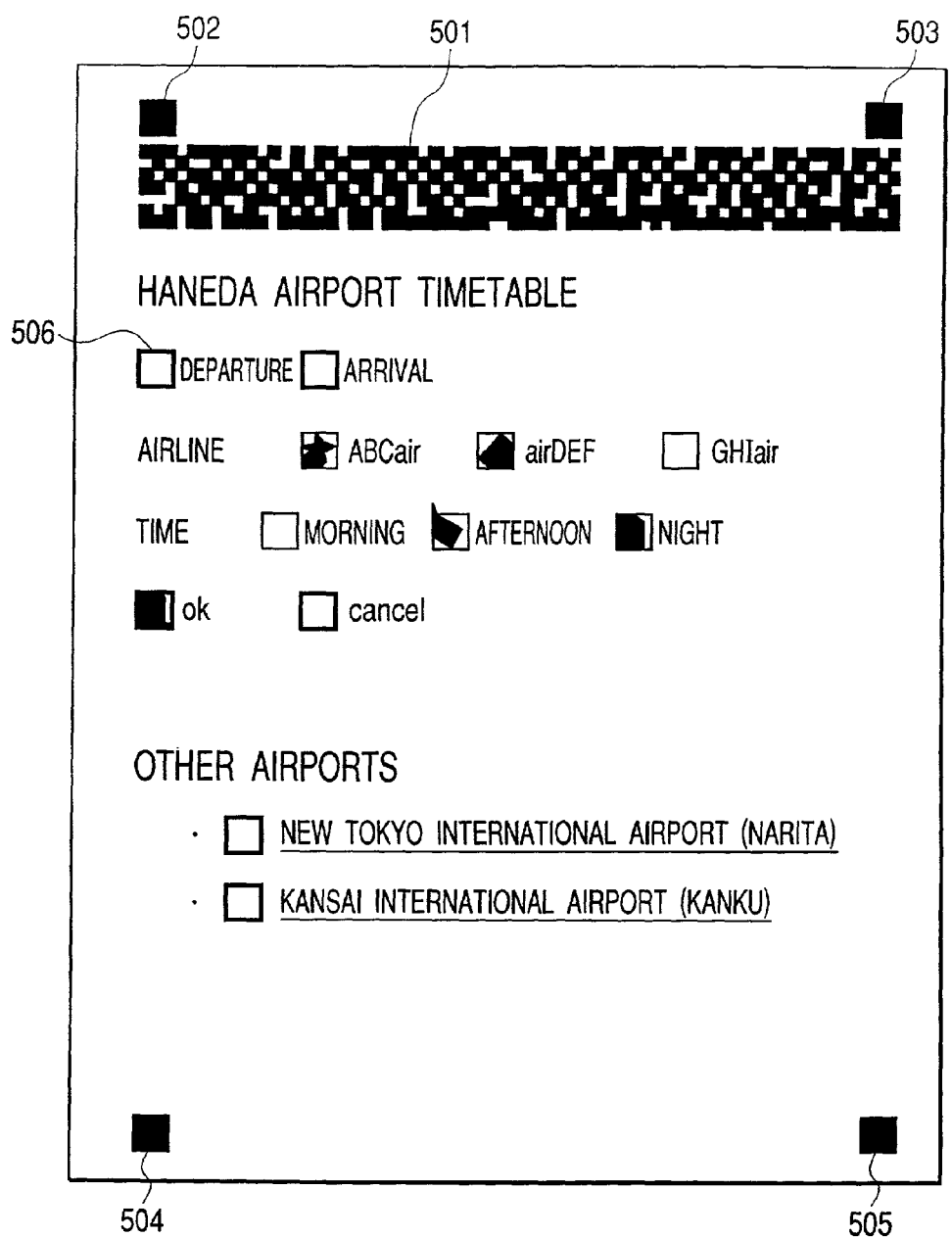
FIG. 23 illustrates another example of a paper medium that is inputted in the embodiment of the present invention.

FIG. 23 illustrates an example of a paper medium in which a user has filled in differently on a paper medium with the same page output. In this example, since a control area corresponding to a submit record is painted, when this paper medium is inputted in the paper browser apparatus of this embodiment, a page indicated by the URL "http://asample.co.jp/cgi/sample?direction=dep&airline=ABCair&airline=airDEF&afternoon=on&night=on" is outputted next after checking a selection state of each control area of the form.

Further, in this embodiment, when a paper medium on which an action identification code is printed is inputted, a paper medium on which another page is printed is obtained using a function intrinsic to a web such as tracking a link from there or inputting a form. A paper medium to be used first is the one that is printed by a browser apparatus or the like of other embodiments to be described later.

As described above, with the browser apparatus of this embodiment, a paper medium on which the next page according to selection is printed can be obtained simply by filling in of painting out a control area with respect to a paper medium that is printed in a form substantially equivalent to a display in the browser apparatus of the conventional example and putting the paper medium in the browser apparatus. That is, the same browsing as in the browsing apparatus of the conventional example can be performed only by extremely easy operation of filling in a paper medium and putting the paper medium in the browser apparatus.

OTHER EMBODIMENTS

Although the case in which an action identification code main body using codes simply associated with bits and meshes and positional markers are used as machine-readable action identification code is described in the above-mentioned embodiment, the present invention is not limited to this. The action identification code may be any code as long as it is a machine-readable code and includes data required for identifying a selection state of control by a user to decide the next action.

When an action identification code is prepared, an arbitrary coding method for performing compression and error correction may be used. For example, various kinds of coding methods called a two-dimensional code may be used.

In addition, even if the codes simply associated with bits and meshes, which are used in the above-mentioned embodiment, are used, an arbitrary association may be performed such as arranging the bits upside down or arranging them in the horizontal direction.

In addition, although an example for separating an area of HTML display data from an area of an action identification code is described in the above-mentioned embodiment, the present invention is not limited to this. The action identification code may be laid on top of the HTML display data in an extractable form. Alternatively, the action identification code may be coded and embedded in the HTML display data using the digital watermark technology.

In addition, although the case in which an action identification code main body is displayed on a paper medium is described in upper part of the above-mentioned embodiment, the present invention is not limited to this but it may be displayed at any position.

In addition, although the case in which a control area consists of 3*3 meshes is described in the above-mentioned embodiment, the present invention is not limited to this but the control area may be any size. If a size is variable for each control area, form data concerning a size is added to data for identifying an area. For example, an example for further storing data of the number of meshes in the vertical and the horizontal directions is possible.

In addition, although the case in which each element of a control area and an action identification code is by the unit of mesh is described in the above-mentioned embodiment, the present invention is not limited to this but the element may be any form. In this case, data for identifying an area is data according to a form. For example, if a form is circular, an example for representing it by data of a central coordinate and a radius is possible.

In addition, although the case in which input image data is two value image data of black and white is described in the above-mentioned embodiment, the present invention is not limited to this but the input image data may be gray scale data or color data. In this case, the functions of b1 and b2 can be found by setting a gray value or a threshold value of brightness in the color data.

In addition, although one action identification code is printed for one page in the above-mentioned embodiment, the present invention is not limited to this but one action identification code may be divided into a plurality of codes and printed.

In addition, although the case in which positional markers are arranged in the four corners of a printing area is described in the above-mentioned embodiment, the present invention is not limited to this but any number of positional markers may be arranged. Further, frames surrounding the entire printing area may be used as a positional marker.

In addition, although the case in which association of a coordinate system in an input image and an original coordinate system is found only by a minimum necessary number of positional markers is described in the above-mentioned embodiment, the present invention is not limited to this but positional markers of the number or more may be used. For example, there is a method of using a conversion parameter from a combination of a plurality of positional markers to take a value for minimizing their least square errors.

In addition, although the case in which a positional marker and an action identification code main body are separated is described in the above-mentioned embodiment, the present invention is not limited to this but these may be integrated. For example, if an action identification code main body is divided into a plurality of codes, which are surrounded by frames and arranged in fixed positions, the action identification code main body also serves as positional markers.

In addition, although positional markers are provided to extract an action identification code and identify a control area using a position, the present invention is not limited to this but the extraction and the identification may be performed by a method other than using a position. For example, it is possible to give a characteristic to an image, thereby extracting an area using the characteristic amount.

Figure 19:
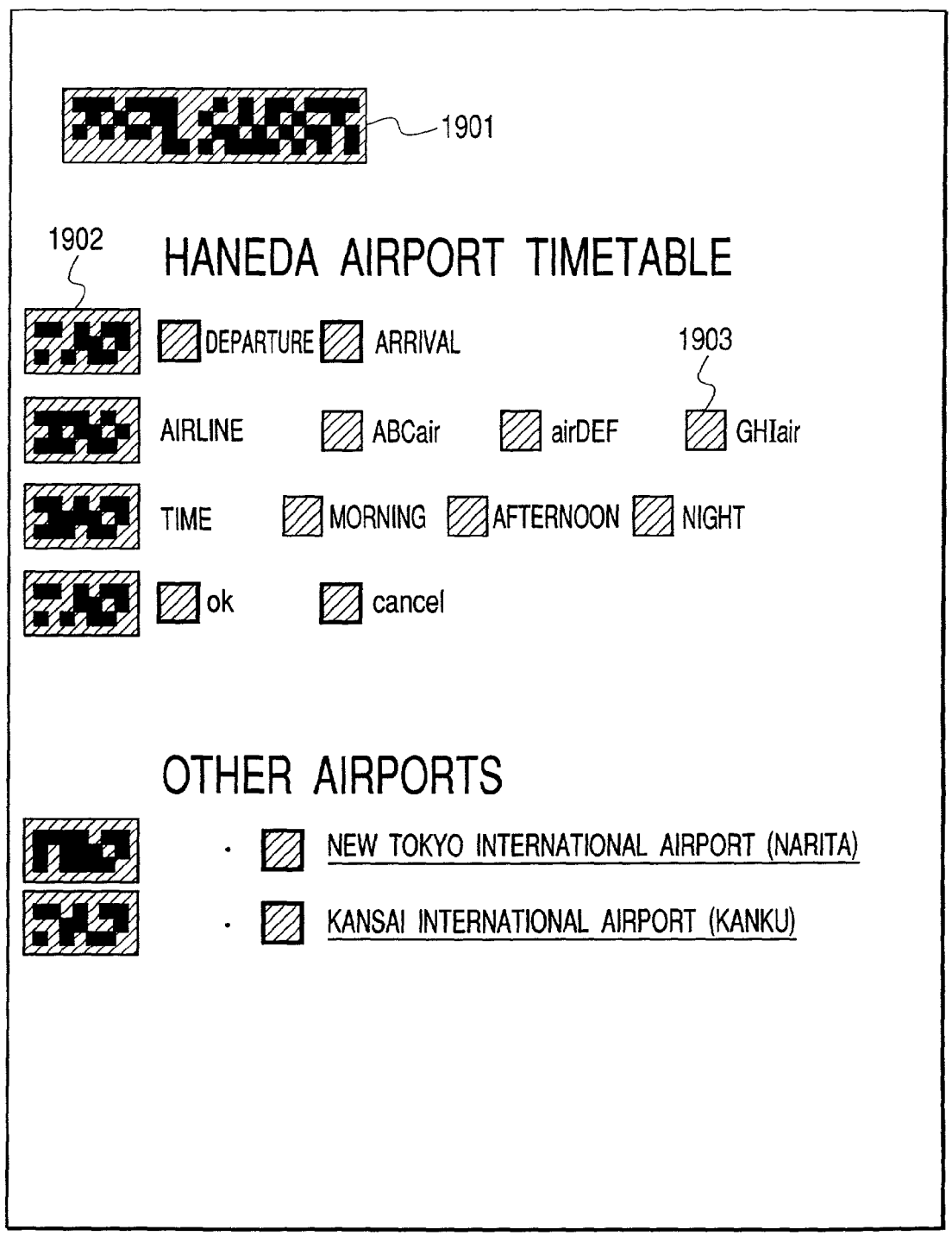
FIG. 19 illustrates an example of a paper medium on which action identification code is printed in another embodiment of the present invention.

FIG. 19 illustrates another embodiment of a paper medium to which a plurality of action identification codes are added. Reference numerals 1901 and 1902 denote action identification code. A code found by encoding data such as a page URL record and a form record is printed in the upper part of the paper medium. Codes found by encoding data of records having a control area such as an anchor record and a radio button record are printed in the left end that has the same Y coordinate as a corresponding control area. Moreover, these action identification codes take a specific color as a background color. It becomes possible to extract an action identification code by extracting an area of this specific color. In addition, the control area (e.g., 1903) also takes a specific color as a background color. It becomes possible to extract a control area by extracting an area of this specific color.

The embodiment of FIG. 19 is different from the embodiment of FIG. 5 in that a form number field taking a form number, which is a unique number given to each form, as a value is provided in order to associate a form record with a record of a form element. In addition, this embodiment is also different from the embodiment of FIG. 5 in that a control area field id identified by changing a color of a control area without providing the field in a record. If there are a plurality of control areas in the same Y coordinate that associates a control area in the same Y coordinate position as a code found by encoding a record and the record, the association is made in accordance with an order of appearance of records in the code and an order of appearance of control areas.

In addition, although the case in which control areas are arranged so as not to overlap with characters and images to be displayed based on HTML data is described in the above-mentioned embodiment, the present invention is not limited to this and the control areas may be arranged overlapping with characters and images. For example, a control area for an anchor can also be set in an area that overlaps with a character string or an image forming an anchor. If this embodiment is used, an anchor can be selected by painting out the character string or the image of the anchor in black.

In addition, although the case in which it is determined that a corresponding anchor or form element is selected if an area of a fix percentage or more of a control area is painted in black is described in the above-mentioned embodiment, the present invention is not limited to this but the selection may be determined according to other rules. For example, there is an example for determining that the selection is made if a black segment continuing from the upper part to the lower part of a control area is detected.

In addition, the case in which a query based on form input is included in a query portion of a URL to send a request by a GET method of HTTP is described in the above-mentioned embodiment, the present invention is not limited to this. For example, if a POST method is designated in a method attribute of a FORM tag, a request should be sent by the POST method. In this case, a query is included in a body of a request to be sent.

In addition, although only a radio button and a check box are handled as form elements other than a submit button and a reset button is described in the above-mentioned embodiment, the present invention is not limited to this but other elements should be handled. Embodiments for handling several elements will be hereinafter described.

First, an embodiment for handling an INPUT tag in which a type attribute is hidden will be described. If there is this tag in a form element, a pair of a name attribute value and a value attribute value of this tag is unconditionally added to a query. Then, in this embodiment, a hidden tag record consisting of the following fields is provided anew and is also included in an action identification code.

Flag field (first byte)

This takes the integer value 9 that indicates a hidden tag record.

Record length field (second byte)

This takes an integer value indicating the length (number of bytes) of this record.

Query data field (up to the last byte of a record from the third byte)

This takes a character string to be included in a query.

In action decision processing, if there is a hidden tag record as an element of a form in processing of the form, a value of its query data field is unconditionally added to a query.

In addition, an embodiment for handling a SELECT tag as a form element will be described next as another embodiment. The SELECT tag is displayed by a pop-up list or the like in the browser apparatus of the conventional example. The pop-up list can be realized by a graphical user interface of a computer but cannot be realized by operation for displaying it on a paper medium and filling it in. Thus, it is developed into an equivalent radio button and outputted. That is, an OPTION tag that is an element of the SELECT tag is processed regarding its value attribute value and a name attribute value of the SELECT tag as each attribute value of an INPUT tag whose type attribute is radio. Consequently, each OPTION element of the SELECT tag is listed with a control area for a radio button and outputted.

Figure 20:
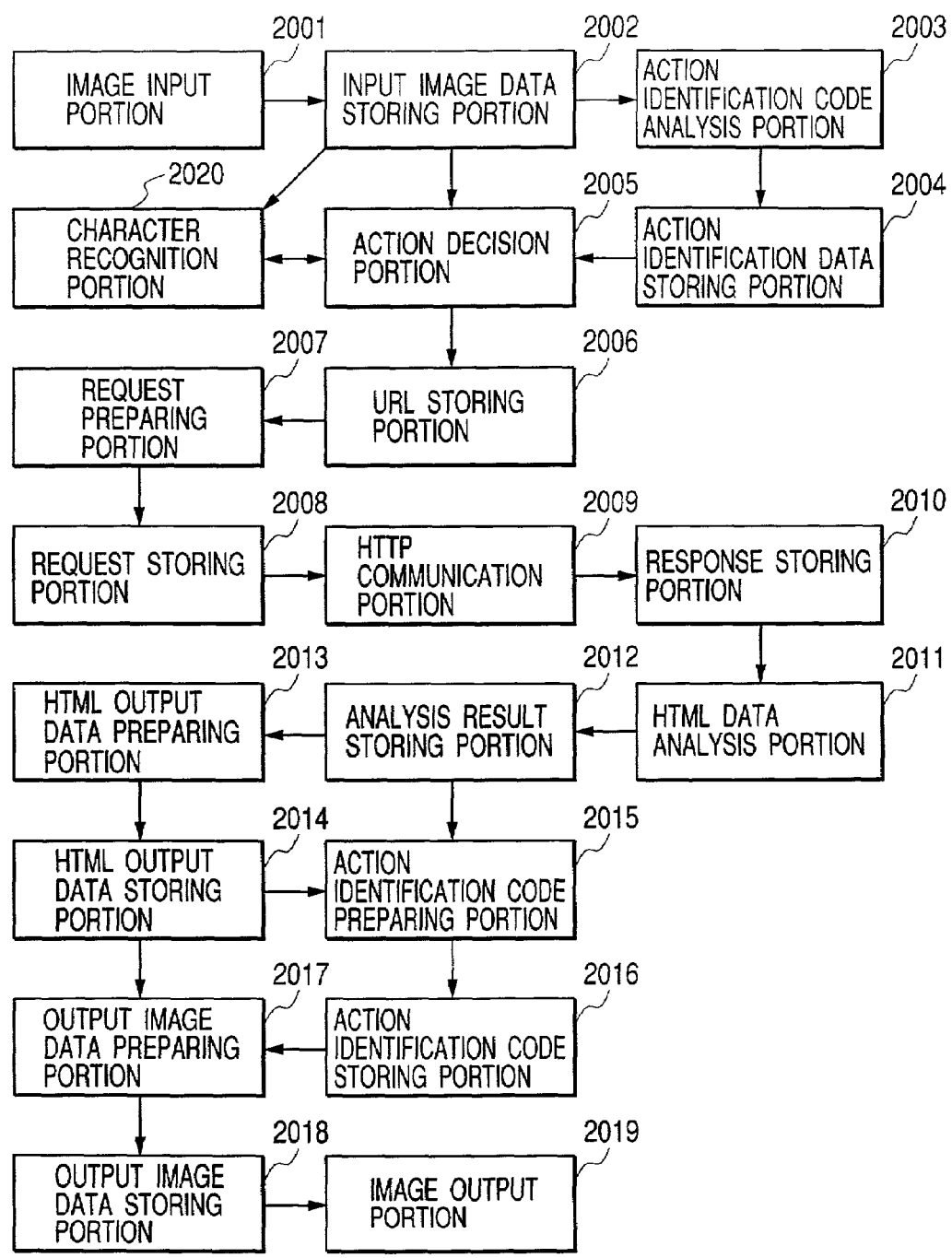
FIG. 20 illustrates a configuration of function blocks in another embodiment of the present invention.

In addition, an embodiment for handling an INPUT tag whose type attribute is text will be described as another embodiment. FIG. 20 illustrates a configuration of function blocks in this embodiment. Since reference numerals 2001 to 2019 denotes function blocks that are substantially the same as the function blocks 301 to 319 in FIG. 3, only differences will be described.

An action identification code storing portion 2004 and an action identification code preparation portion 2015 are different from the above-mentioned embodiment in that the portions also handle a text record. The portions performs interpretation and generation of this record, respectively. The text record consists of the following fields.

Flag field (first byte)

This takes the integer value 10 that indicates a text record.

Record length field (second byte)

This takes an integer value indicating the length (number of bytes) of this record.

Control area field (third, fourth, fifth and sixth bytes)

This takes a coordinate and a size of meshes indicating a position of a control area with respect to this radio button. This takes an X coordinate value of a mesh in the upper left among the meshes forming the control area in the third byte and a Y coordinate value in the fourth byte. In addition, this takes the number of meshes in the horizontal direction of the control area in the fifth byte and the number of meshes in the vertical direction in the sixth byte.

Name attribute field (up to the last byte of a record from the seventh byte)

This takes a character string that is a name attribute value of the INPUT tag.

An HTML output data preparation portion 2013 generates rectangular areas such that a text field object is drawn with respect to an INPUT tag whose type attribute is text in the conventional example. However, the layout of the rectangular areas is arranged such that the borders of the rectangular area overlaps with the borders of the meshes.

An action decision portion 2005 request character recognition of a control area portion corresponding to a character recognition portion 2020 if there is a text record in a form element in form processing. The character recognition portion 2020 extracts image data of the requested area from input image data stored in the input image data storing portion 2002 and performs character recognition using this data. Then, the character recognition portion 2020 returns a character string that is a recognition result to the action decision portion 2005. The action decision portion 2005 prepares a character string in which a value of a name attribute field of the text record and the character string that is a recognition result are connected by "=" and adds this character string in a query.

In addition, although the case in which the same processing is performed if a checked attribute is designated in an INPUT tag whose type attribute is radio or checkbox or if it is not designated is described in the above-mentioned embodiment, the present invention is not limited to this but some other processing may be performed. In the conventional example, when the checked attribute is designated, a control object corresponding to the time when a page is displayed is set in a selection state in advance. However, with the browser apparatus of the present invention, if a control object is set in a selection state in advance and printed and outputted, a user cannot release the selection state. For example, if a control area is painted out in black and printed, a user cannot erase this.

Figure 21:
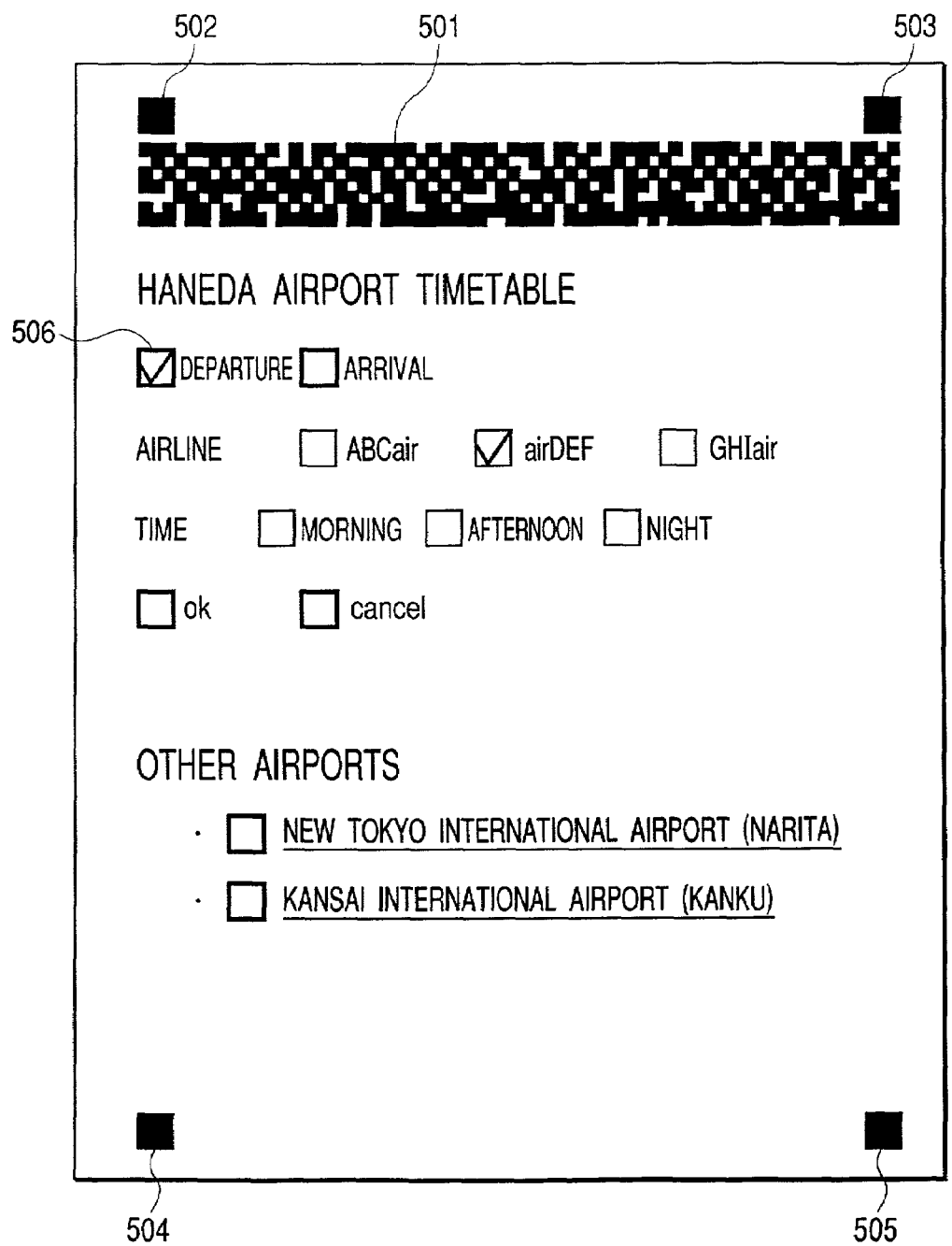
FIG. 21 illustrates an example of a paper medium on which an action identification code is printed in another embodiment of the present invention.

Thus, in this embodiment, a mark (check mark) of a certain color (e.g., gray) is outputted in a control area for an INPUT tag in which the checked attribute is designated. FIG. 21 shows an output example of HTML data shown in FIG. 15 in this embodiment. Then, if a user painted out this control area in action decision processing, it is determined that the user has selected a pertinent radio button or check box. If the control area is not painted out, determination varies according to a selection state of other radio buttons or check boxes. If another radio button or check box with the same name attribute value is selected, it is determined that the radio button or the check box in which the checked attribute was designated is not selected. If no other radio buttons or check boxes are selected, it is determined that the radio button or the check box in which the checked attribute was designated is selected.

If there is no other check boxes having the same name attribute value among the check boxes, it is always determined that the check box is selected. Thus, processing for determining non-selection if a user filled in the box with a specific mark (e.g. x) may be added.

In addition, the embodiment in the form of including all pieces of data required for deciding a URL of a page to be obtained next in an action identification code is described in the above-mentioned embodiment. This embodiment has advantages in that the next URL can be immediately decided by a paper browser apparatus, processing is possible even if an entity of a page printed on a paper medium is lost or an entity cannot be accessed and operation is not hindered even if a layout is changed by the browser apparatus with respect to identical HTML data.

However, since the data length of the action identification code tends to be too large, it is likely that the size becomes too large and the code cannot be printed depending on a coding method of an action identification code. Thus, an embodiment with different data to be included in an action identification code will be described. First, an embodiment in a form of including only a URL of a page printed on a paper medium in an action identification code will be described first.

Figure 24:
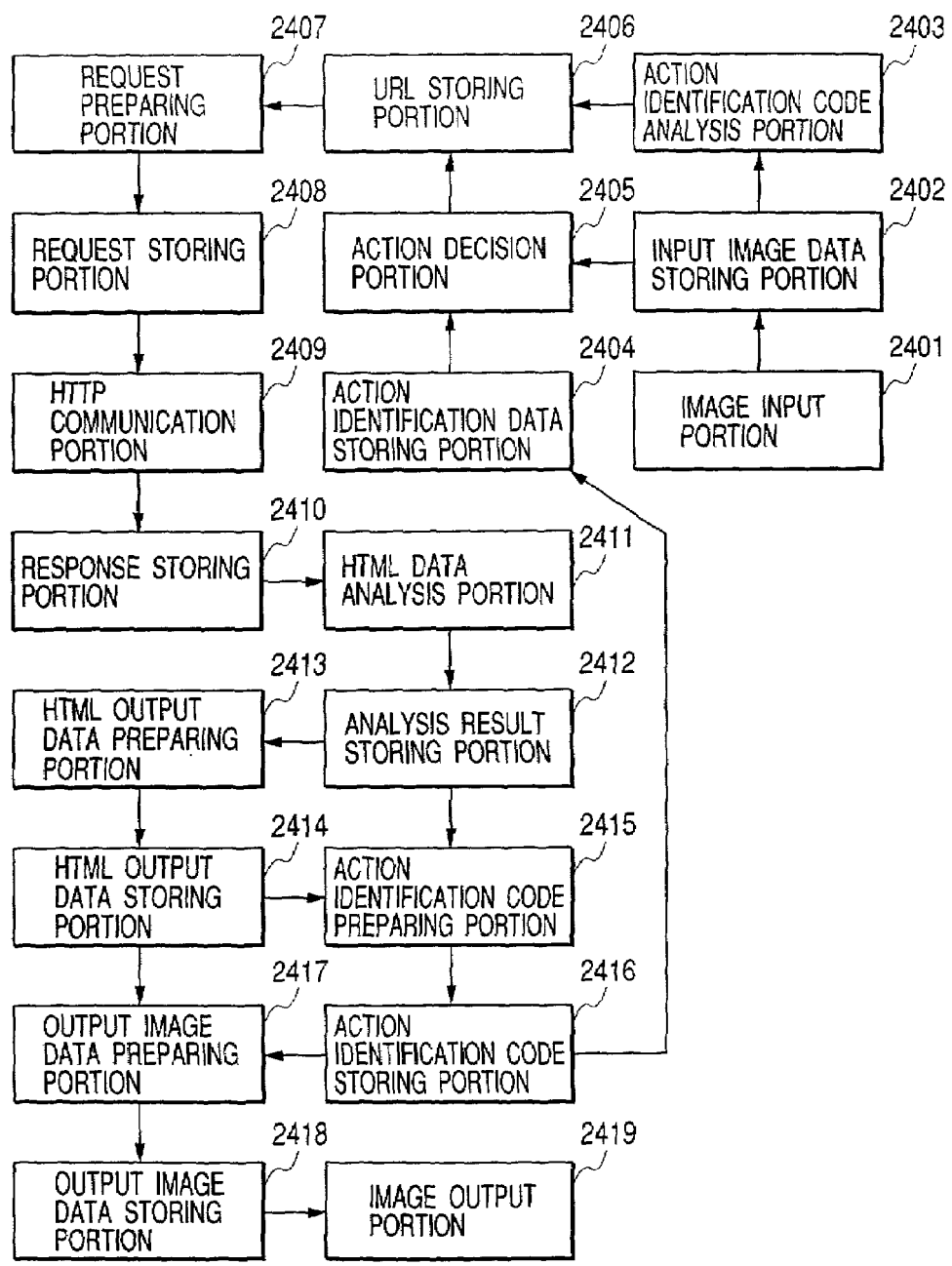
FIG. 24 illustrates a configuration of function blocks in another embodiment of the present invention.

FIG. 24 illustrates a configuration of function blocks in this embodiment. Since reference numerals 2401 to 2419 denotes function blocks that are substantially the same as the function blocks 301 to 319 shown in FIG. 3, only differences will be described.

An action identification code analysis portion 2403 does not interpret a multiplicity of records but interprets that all pieces of data decoded from an action identification code are character strings of a URL of an original page. Then, this URL is stored in a URL storing portion and HTML data of the original page is obtained (2407 to 2410). Then, the obtained HTML of the original page is analyzed and action identification data in an action identification code preparation portion 2415 is prepared and stored in an action identification data storing portion 2404. Thereafter, image data stored in an input image data storing portion 2402 and action identification data stored in the action identification data storing portion are compared in the action decision portion 2405 to identify a control area and the like, whereby an action is decided.

HTML data of the next page is obtained (2407 to 2410) based on the URL decided in the action decision portion 2405, the HTML data of the next page is analyzed and an action identification code is prepared in an action identification code preparing portion 2415. However, in the processing for preparing an action identification code, not all pieces of action identification data are encoded to an action identification code. Only URL data of the next page being processing is encoded.

In the embodiment of FIG. 24, a short action identification code suffices, but it is required to perform processing for obtaining an original page every time the above-mentioned processing is performed. In addition, if the layout of the original page is arranged by a different method (e.g., if resolution of an output image is different), it is likely that an actual position of a control area and a position of an area indicated by action identification data prepared by obtaining the original page are different. In addition, it is likely that correct processing cannot be performed due to mismatching if HTML data of the original page is different from HTML data at the time when it is outputted to a paper medium.

Therefore, an action identification code with a list of positional data of a control area added to the action identification code of the embodiment of FIG. 24 may be prepared as another embodiment.

In this embodiment, the processing for preparing an action identification code (step 410) is different compared with the embodiment of the above-mentioned FIG. 24 as follows. In this embodiment, not all pieces of action identification data are encoded to an action identification code. URL data of a page being processed and a list of each control area field are encoded. In the URL data, an integer value indicating the length of the URL data is encoded and then a character string of URL data itself is encoded. Control area fields are encoded next in accordance with an order of appearance in the action identification data.

In addition, the processing for analyzing an action identification code (step 402) is also different. An integer value of a top byte is interpreted as a URL data length with respect to an action identification data array found by decoding an action identification code and a character string is taken out by a data length from the second byte, which is set as URL data. Then, a group of integer values are taken out by the unit of two bytes, which is set as a list of control areas. The taken out URL data is interpreted as a URL of an original page and processing from step 404 to 410 is applied to the original page to obtain an action identification data of the original page. In this action identification data, corresponding values in the list of the control areas that were interpreted before are substituted for the control areas in the order of appearance of the control areas.

Consequently, even if the layout at the time when they are printed on a paper medium and the layout in the apparatus of this embodiment are different, it becomes possible to correctly identify the control areas.

In addition, an embodiment for storing all pieces of action identification data of a page outputted to a paper browser apparatus while encoding only a URL of an original page to an action identification code is possible as another embodiment.

Figure 25:
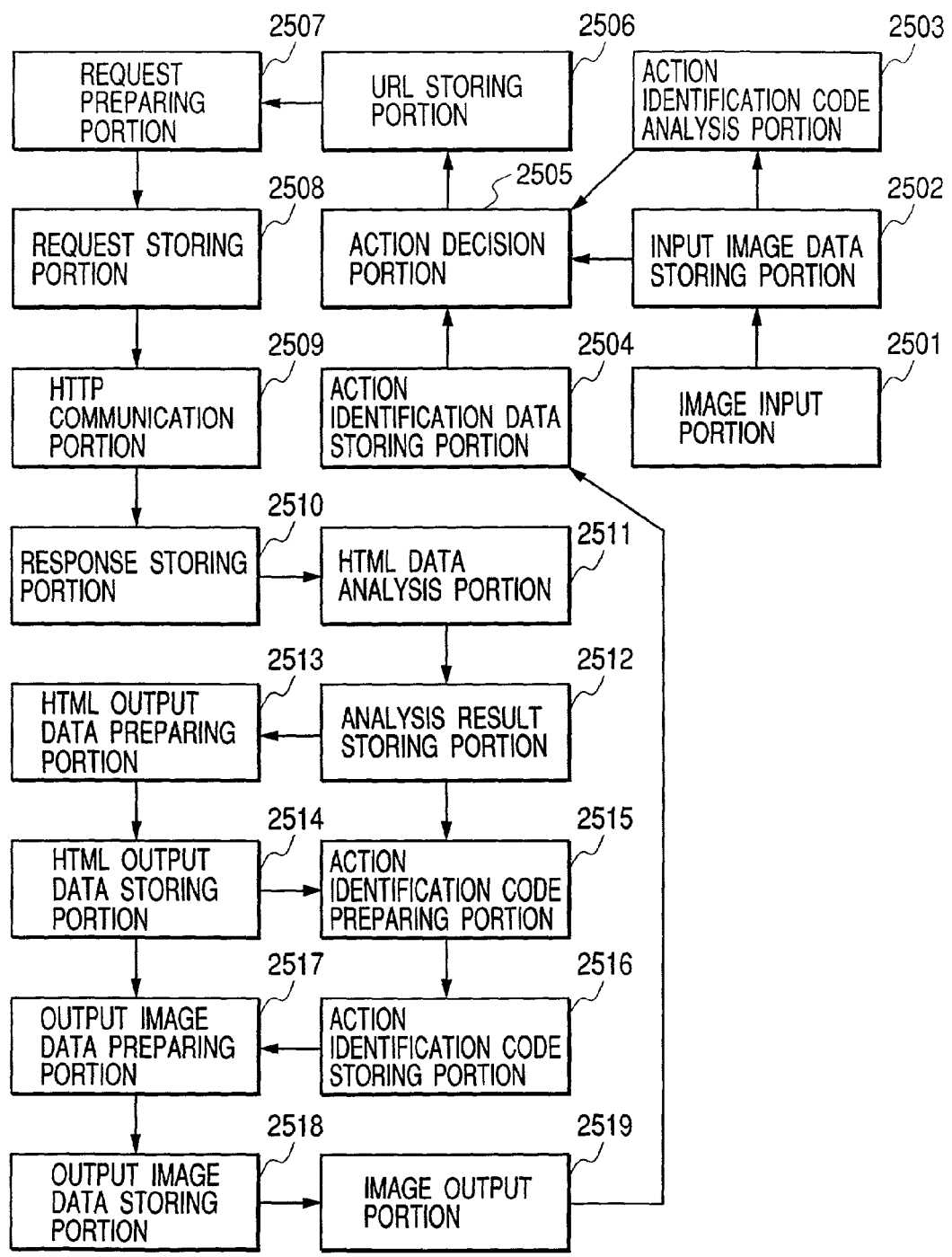
FIG. 25 illustrates a configuration of function blocks in another embodiment of the present invention.

FIG. 25 illustrates a configuration of function blocks in this embodiment. In the figure, function blocks denoted by reference numerals 2501 to 2519 are substantially the same as the function blocks 2401 to 2419 shown in FIG. 24. Thus, only differences from FIG. 24 will be described.

First, an action identification data storing portion 2504 is different in that it permanently stores action identification data. In addition, it has a function of retrieving an action identification data with its URL. With respect to a URL of an original page analyzed in an action identification code analysis portion 2503, an action decision portion 2505 retrieves its action identification data from the action identification data storing portion 2504. Then, the action decision portion 2505 decides an action using this action identification data. If an action identification data could not be retrieved, the action decision portion 2505 stores the URL of original data in a URL storing portion and obtains the original page to perform processing for preparing its action identification data.

In the embodiment of FIG. 25, since action identification data is not stored if an inputted paper medium is outputted by another paper browser apparatus, it is necessary to prepare action identification data again. In addition, if a layout method of HTML data is different from that of another paper browser apparatus, it is likely that a control area is not correctly identified. Thus, an embodiment for inserting an ID or a URL for identifying a paper browser apparatus that outputted the page in an action identification code is possible.

In such an embodiment, an ID and a URL of a paper browser apparatus which are obtained by interpreting an action identification code is used to request and obtain action identification data of the URL from a paper browser apparatus that outputted an inputted paper medium. These paper browser apparatuses are connected by the Internet. Processing after obtaining the action identification data is the same as that in the embodiment of FIG. 25.

In addition, in the embodiment as shown in FIG. 25, since action identification data is also different if HTML data is different when a paper medium is outputted even if a URL is identical, mismatching may arise if one piece of action identification data is simply stored for a URL. Thus, different versions in an identical URL may be distinguished and managed by giving a version management number for each URL or by giving time for preparing HTML data that can be obtained from a web server to the action identification data.

In addition, although the above-mentioned embodiment is an embodiment mode for configuring a browser apparatus by a computer, a scanner and a printer, the present invention is not limited to this but other modes may be used.

Figure 2:
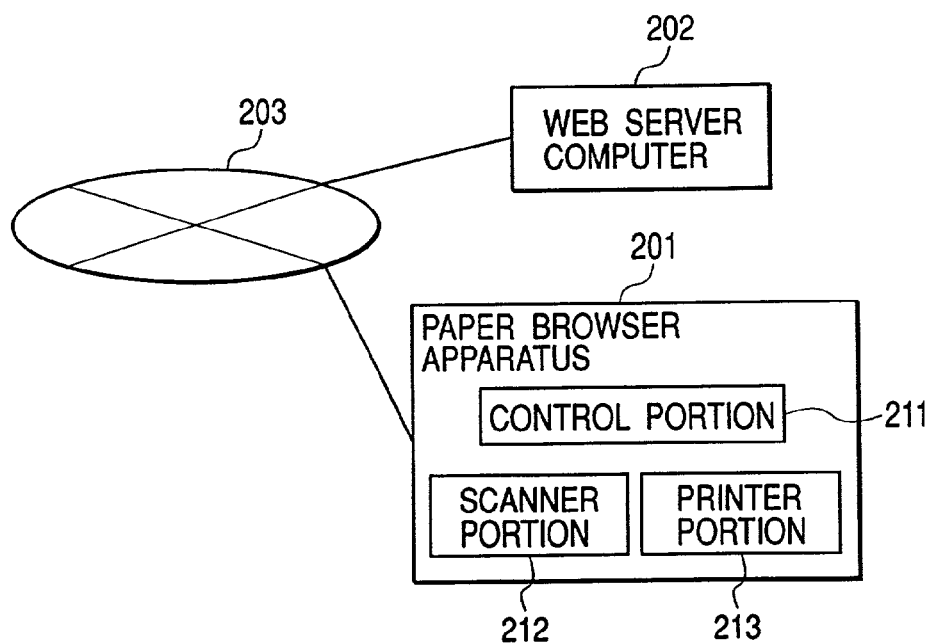
FIG. 2 illustrates a configuration of a web system using another embodiment of the present invention.

FIG. 2 shows an embodiment mode for realizing a paper browser apparatus by an apparatus provided with a scanner portion for inputting an image from a paper medium and a printer portion for outputting an image to a paper medium. In the figure, reference numeral 201 denotes a paper browser apparatus that is a form of a web browser using a physical medium making up the core of the present invention. Reference numeral 202 denotes a web server computer for passing information in response to a request from a paper apparatus. Reference numeral 203 denotes the Internet to be a communication path between the paper browser apparatus 201 and the web server computer 202. The paper browser apparatus 201 consists of a control portion 211, a scanner portion 212 and a printer portion 213. The control portion 211 performs control equivalent to the control in the paper browser computer 101 in the above-mentioned embodiment. The scanner portion 212 performs the image input processing as the scanner 104 in the above-mentioned embodiment does and passes inputted image data to the control portion 211. The printer portion 213 prints image data to be passed from the control portion 211 on paper. That is, the printer portion 213 performs the same image output processing as the printer 105 in the above-mentioned embodiment does.

Figure 26:
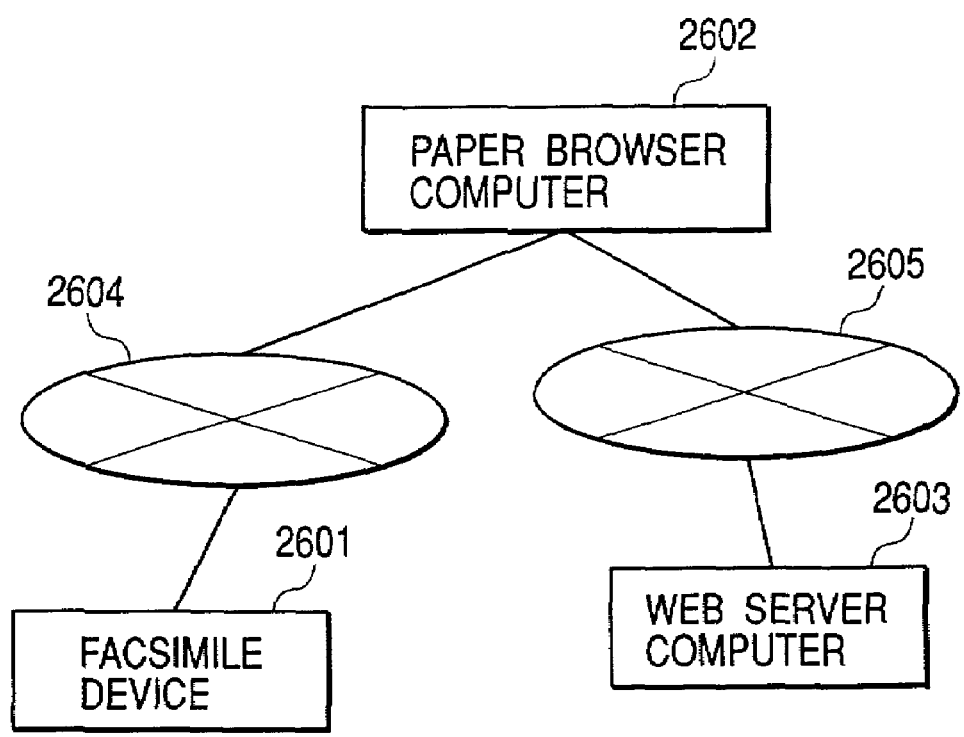
FIG. 26 illustrates a configuration of a web system in which another embodiment is used.

In addition, an embodiment of a form in which an input/output apparatus of an image and a paper browser apparatus are located in distant places and connected through a communication line will be described next as another embodiment. FIG. 26 illustrates a configuration of a web system using the paper browser apparatus of such an embodiment. In the figure, reference numeral 2601 denotes a facsimile device for inputting an image and sending inputted image data and, at the same time, receiving image data and outputting a received image. Reference numeral 2602 denotes a paper browser apparatus that is a form of a web browser using the physical medium according to the present invention. Although the paper browser apparatus 2602 has substantially the same function as the paper browser apparatus of the above-mentioned conventional example, it is different in that it receives image data from the facsimile device 2601 instead of image input and sends image data to the facsimile device 2601 instead of image output. Reference numeral 2603 denotes a web server computer for passing information in response to a request from the paper browser computer 2602. Reference numeral 2604 denotes a telephone network to be a communication path for image data communication between the facsimile device 2601 and the paper browser computer 2602. Reference numeral 2605 denotes the Internet to be a communication path between the paper browser apparatus 2602 and the web server computer 2603.

Figure 27:
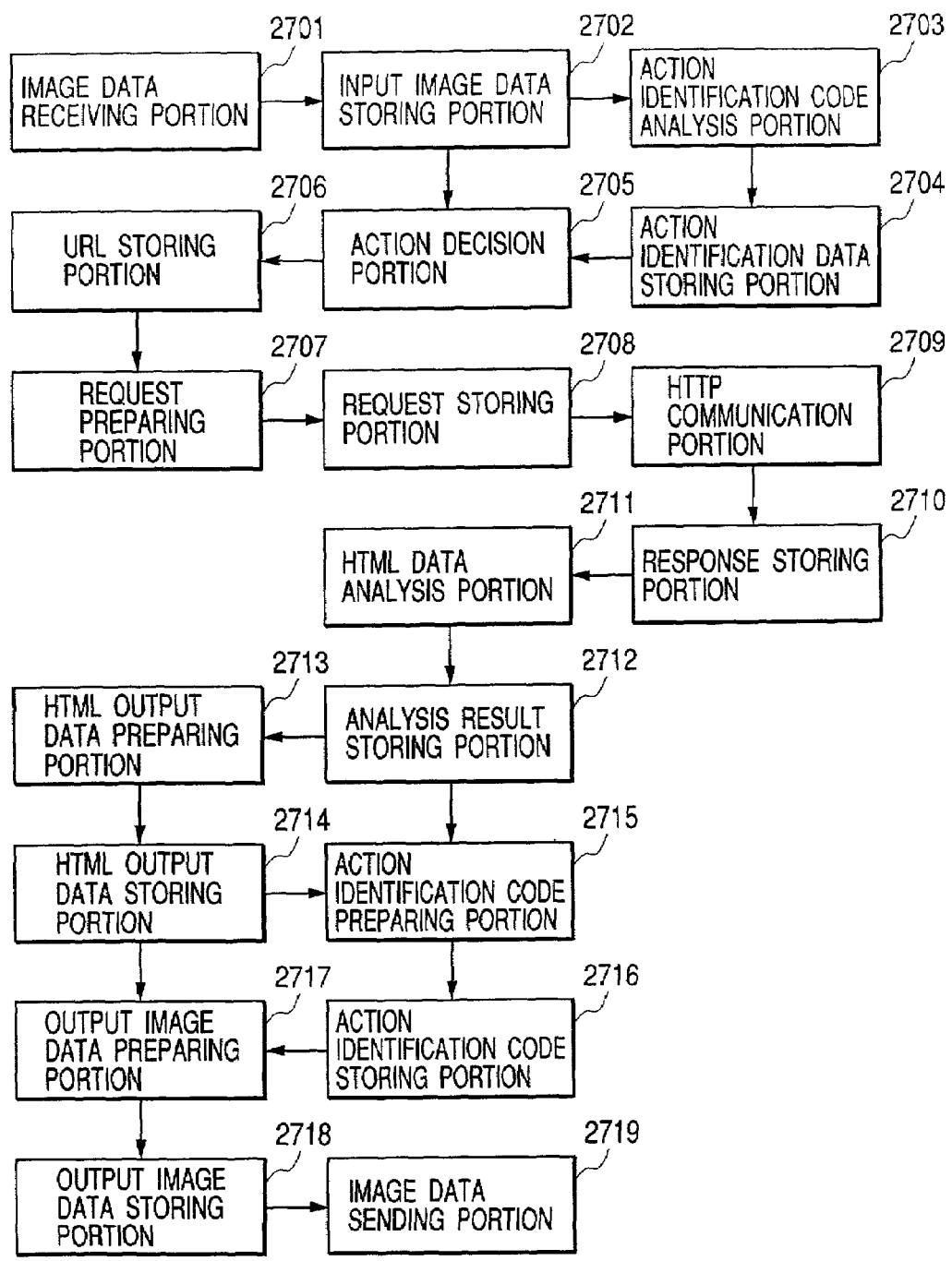
FIG. 27 illustrates a configuration of function blocks in another embodiment of the present invention.

FIG. 27 illustrates a configuration of function blocks in the embodiment of FIG. 26. In the figure, function blocks denoted by reference numerals 2702 to 2718 are substantially the same as the function blocks 302 to 318 shown in FIG. 3. Thus, only differences from FIG. 3 will be described.

Reference numeral 2701 denotes an image data receiving portion for receiving image data sent from a facsimile device. Image data received here is stored in an input image data storing portion 2702. Reference numeral 2719 denotes an image data sending portion for sending output image data stored in an output image data storing portion 2718 to a facsimile device. The image data receiving portion 2701 and the image data sending portion 2719 are realized as, for example, extended boards having a facsimile sending and receiving function.

In the embodiment of this mode, there is an advantage in that a web access service using a paper browser apparatus on the Internet can be provided and a user can utilize a web only by an existing facsimile device.

In addition, although the case in which a facsimile device is used as an apparatus having functions of inputting/outputting and sending/receiving an image is described in the embodiment of FIG. 26, the present invention is not limited to this but any image input and output apparatus may be used. For example, an apparatus for directly connecting to the Internet to transmit an input image and outputting a received image, or the like, may be utilized. In this case, a paper browser apparatus has a function of communicating with the image input and output apparatuses.

In addition, although the case in which both input and output are performed by a paper medium is described in the above-mentioned embodiment, the present invention is not limited to this but another browser apparatus such as the browser apparatus of the conventional example may be used as a part by exchanging URL data between them. A paper browser apparatus of this form will be hereinafter described.

Figure 28:
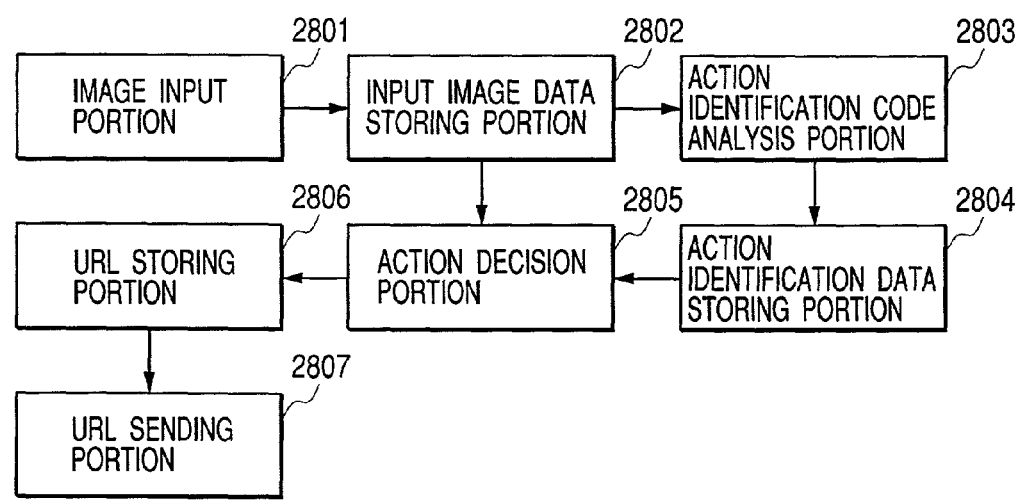
FIG. 28 illustrates a configuration of function blocks in another embodiment of the present invention.

FIG. 28 illustrates a configuration of function blocks in the embodiment of the form inputting a paper medium that a user filled in, determining a new URL in accordance with selection and transmitting the URL to another browser apparatus. In the figure, function blocks of reference numerals 2801 to 2806 are the same as the function blocks from 301 to 306 shown in FIG. 3. Reference numeral 2807 denotes a URL sending portion for sending URL data stored in a URL storing portion 2806 to another browser apparatus. For example, in the paper browser apparatus of the form in FIG. 1, the URL sending portion 2807 sends URL data to a browser program of the conventional example that operates as another application program. The browser apparatus of the conventional example obtains to display a page indicated by received URL data.

In the embodiment of FIG. 28, a user can fill in page information provided by a paper medium such as a magazine, thereby designating a page to be browsed and opening the page by another browser. For example, if a paper medium is inputted after selecting goods on a page on which a plurality of goods lists appear, a page relating to the goods can be opened by the browser of the conventional example. Thus, there is an effect in that cooperation between the paper medium and the browser of the conventional example is improved.

Figure 29:
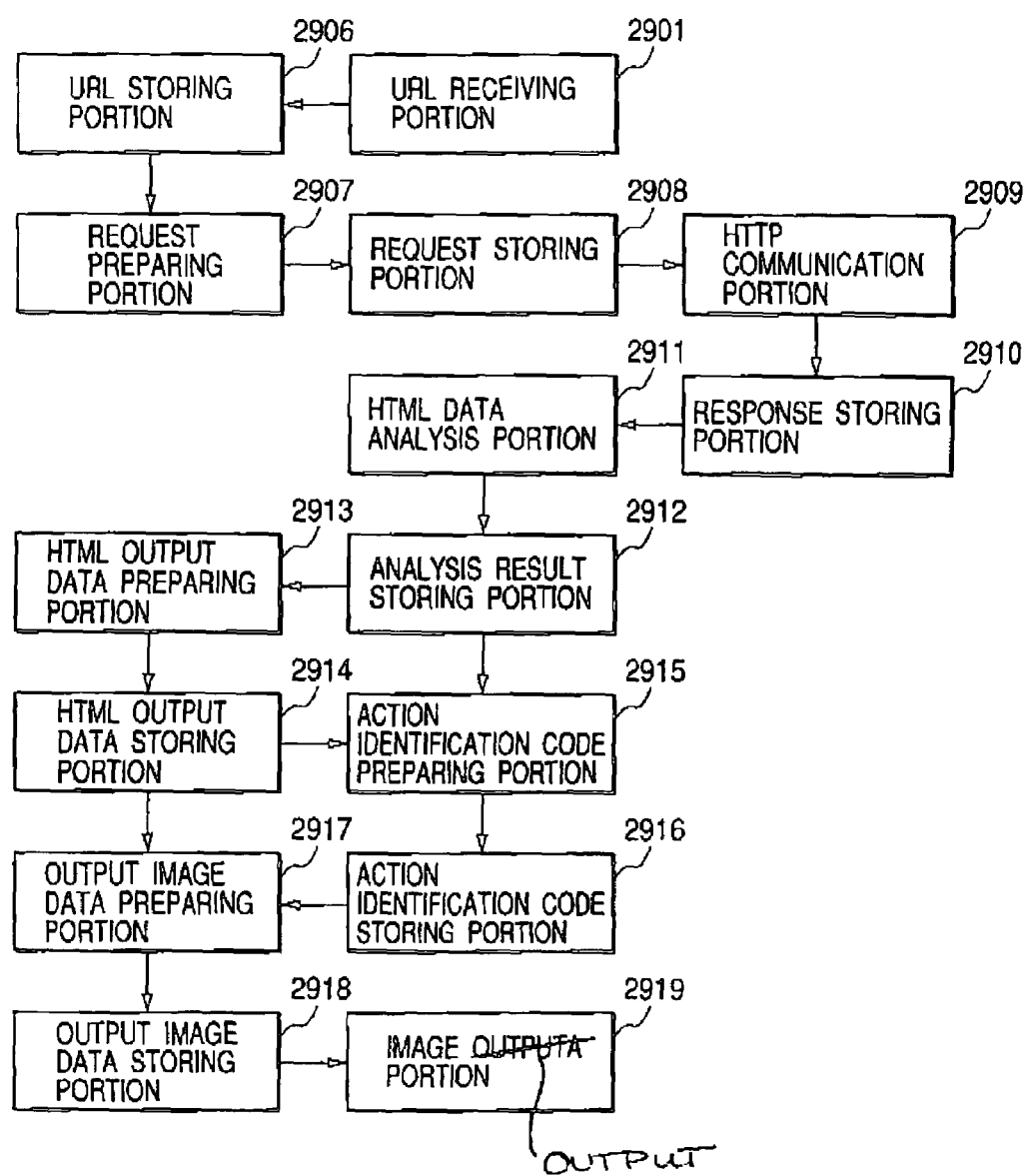
FIG. 29 illustrates a configuration of function blocks in another embodiment of the present invention.

In addition, FIG. 29 illustrates a configuration of function blocks in an embodiment of the form for obtaining and outputting a page indicated by a URL passed from another browser apparatus as another embodiment. In the figure, function blocks of reference numerals 2906 to 2919 are the same as the function blocks of 306 to 319 shown in FIG. 3. Reference numeral 2901 denotes a URL receiving portion for receiving URL data from another browser apparatus and storing the URL in a URL storing portion 2906. For example, the paper browser apparatus of the form of FIG. 1 receives URL data from a browser program of the conventional example that operates as another application program.

In the embodiment of FIG. 29, a page inspected by another browser can be outputted to a paper medium and the paper medium can be used for further browsing. For example, a page that is expected to be used among pages inspected by the browser apparatus of the conventional example is outputted and the outputted paper medium is filled in later when the browser apparatus of the conventional example does not operate, whereby the page can be browsed by the paper browser apparatus of the form of FIG. 3.

Figure 30:
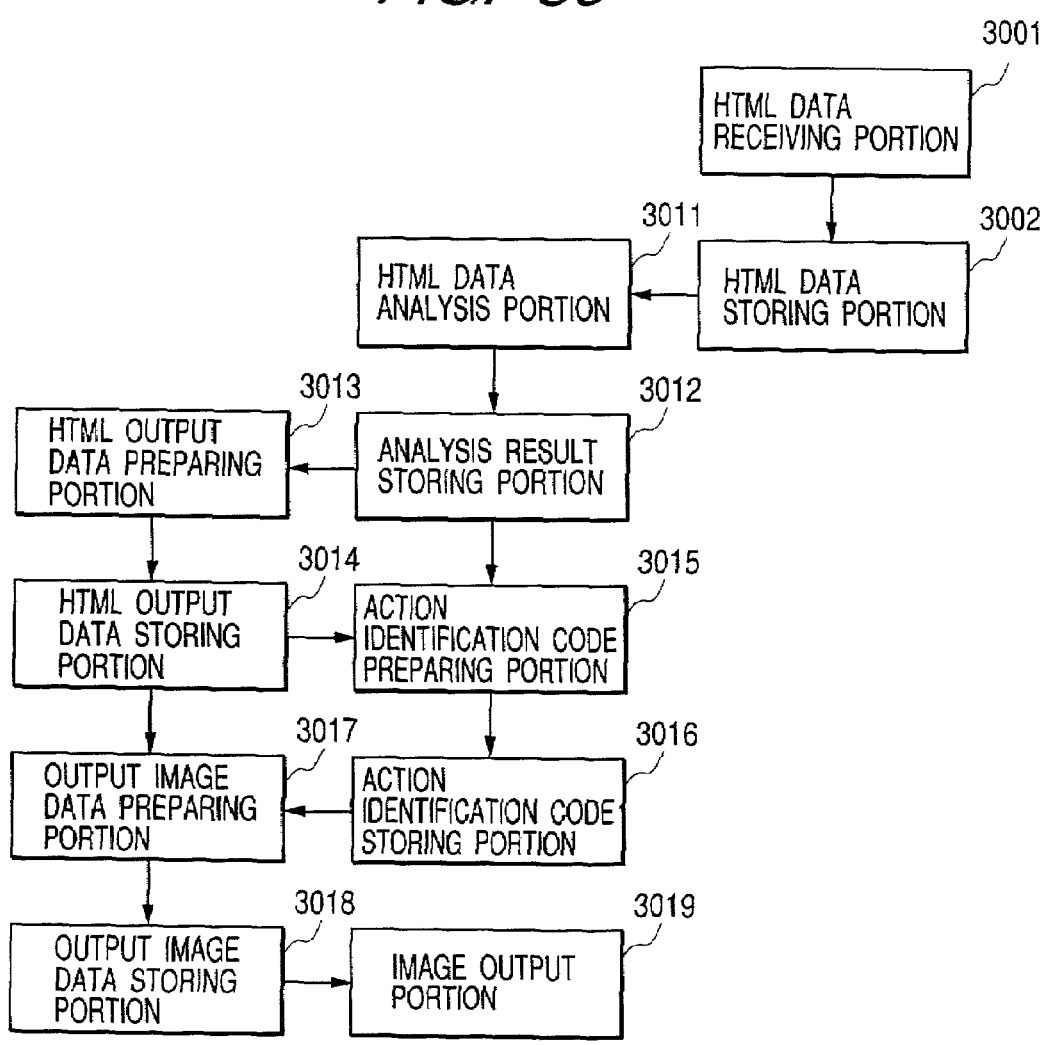
FIG. 30 illustrates a configuration of function blocks in another embodiment of the present invention.

In addition, FIG. 30 illustrates a configuration of function blocks in an embodiment of the form for outputting HTML data passed from another browser apparatus as another embodiment. In the figure, function blocks of reference numerals 3011 to 3019 are the same as the function blocks 311 to 319 shown in FIG. 3. Reference numeral 3001 is an HTML data receiving portion for receiving HTML data. Reference numeral 3002 denotes an HTML data storing portion for storing HTML data received by the HTML data receiving portion 3001.

The apparatus of the embodiment of FIG. 30 has only a function of outputting specific HTML data. For example, it can be utilized as an apparatus for printing a paper medium to be used in a paper browser. A paper medium that can be utilized in the paper browser apparatus has an effect in that web browsing can be performed easily in addition to an effect as an ordinary paper medium. The apparatus of this embodiment has an effect in that it can print such a highly effective paper medium.

An embodiment of another form that is common to each of the above-mentioned embodiments will be hereinafter described. First, although the case in which an action identification code of a single type is used is described in the above-mentioned embodiment, the present invention is not limited to this but a plurality of action identification codes of each form may be used. That is, a paper browser apparatus may determine a type of an action identification code included in an input image to perform processing according to the type. In addition, the paper browser apparatus may have a function of setting a type of an action identification code to be outputted and output an action identification code of a type according to the setting.

Moreover, although the case in which the paper browser apparatus accesses an arbitrary web server computer on the Internet is described in the above-mentioned embodiment, the present invention is not limited to this but the paper browser apparatus may only access a web server computer that is limited arbitrarily. For example, the paper browser apparatus may access only a web server computer connected to the Internet. Alternatively, the paper browser apparatus may access only a page that is not connected to a network such as the Internet and is stored in the paper browser apparatus.

Moreover, although the case in which a page written in HTML is handled is described in the above-mentioned embodiment, the present invention is not limited to this but any data in which information required for setting a URL of the next page by selection in a browser is written may be handled. For example, a page written in XML or XMLLink may be handled.

Moreover, although the case in which a paper medium is used as a physical medium is described in the above-mentioned embodiment, the present invention is not limited to this but any physical medium that can be printed and written in such as cloth and synthetic resin may be used.

Moreover, although an integer value is limited to 0 to 127 for simplicity in the above-mentioned embodiment, any value may be adopted. In this case, it will suffice if a field is 2 bytes or more rather than 1 byte.

Moreover, although the case in which a decision result of an action is stored as a URL character string is described in the above-mentioned embodiment, the present invention is not limited to this but a decision result may be stored as data for each part of URL, for example.

Moreover, although the case in which a storing portion of each data is provided is described in the above-mentioned embodiment, the data may not be expressly formed as programs. The data may be stored in a register of a CPU, a buffer provided by an OS, or the like.

Moreover, although an embodiment mode for causing a software program realizing the above-mentioned functions to operated using a computer, a CPU or an MPU is described in the above-mentioned embodiment, it is needless to mention that the present invention is attained by a logic circuit for realizing all or a part of the functions.

Moreover, the present invention may be applied to a system consisting of a plurality of devices or to an apparatus consisting of one device as another embodiment. It is needless to mention that a recording medium, which records a program code of software for realizing the functions of the above-mentioned embodiment modes, is supplied to the system or the apparatus and a computer (or a CPU or an MPU) of the system or the apparatus reads and executes a program code stored in the recording medium, whereby the present invention is attained. In this case, the program code itself read from the recording medium realizes the functions of the above-mentioned embodiment modes and the recording medium recording the program code constitutes the present invention.

Moreover, for example, a floppy disc, a hard disc, an optical disc, a magneto-optical disc, a CD-ROM, a CD-R, a magnetic tape, a nonvolatile memory card, a ROM and the like can be used as a recording medium for supplying a program code as another embodiment.

Moreover, it is needless to mention that the present invention includes not only the case in which the functions of the above-mentioned embodiment modes are realized by a computer executing a read out program code but also the case in which an OS or the like operating on the computer performs a part or all of the actual processing based on an instruction of the program code and the functions of the above-mentioned embodiment modes are realized by the processing as another embodiment.

Moreover, it is needless to mention that the present invention includes the case in which, after a program code read out from a recording medium is written in a memory provided in a function extended board inserted in a computer or a function extended unit connected to the computer, a CPU or the like provided in the function extended board or the function extended unit performs a part or all of the actual processing based on an instruction of the program code and the functions of the above-mentioned embodiment modes are realized by the processing.

SECOND EMBODIMENT MODE

Figure 32:
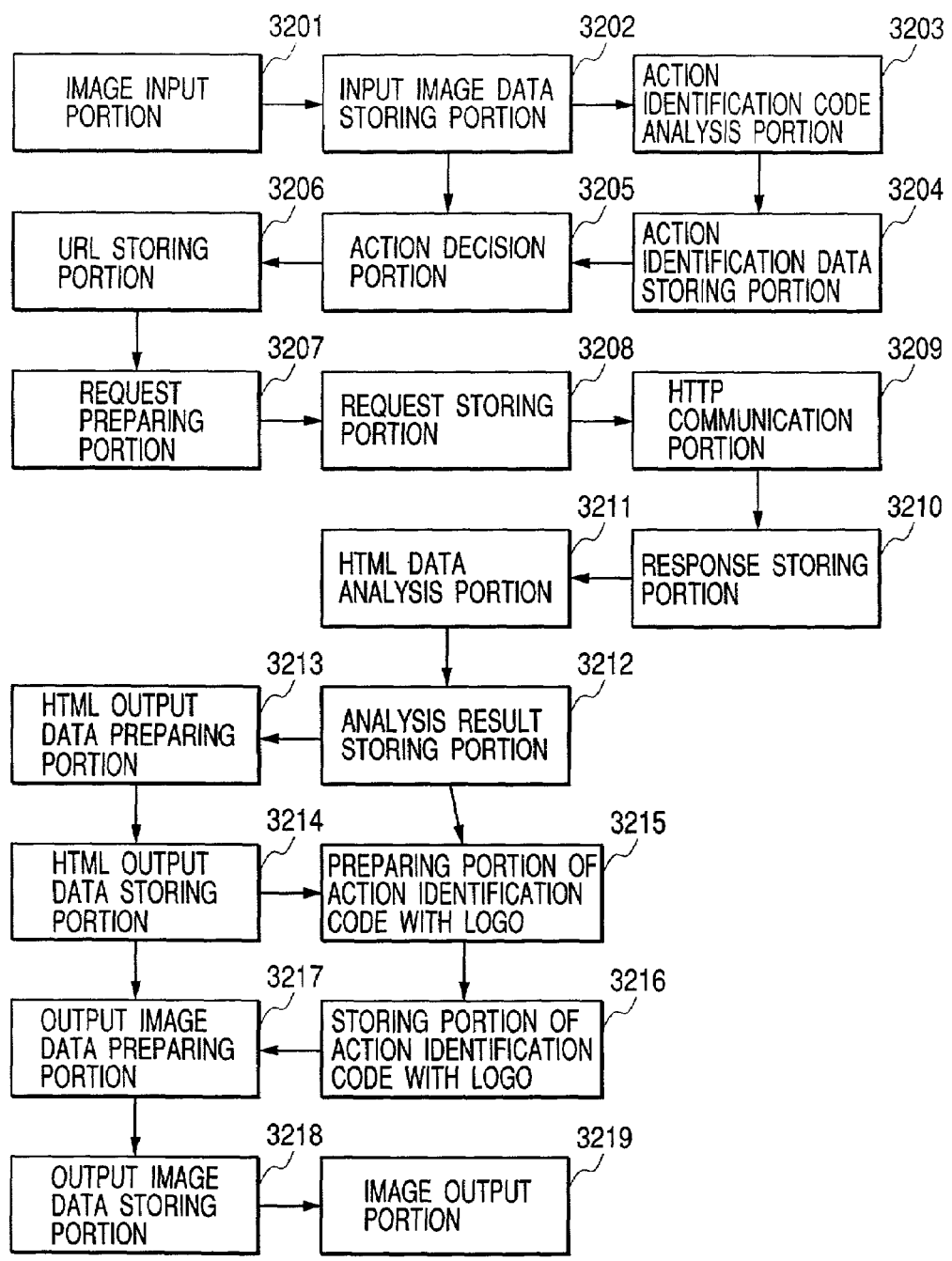
FIG. 32 illustrates a configuration of function blocks in the embodiment of the present invention.

FIG. 32 illustrates an example of a configuration of function modules in the paper browser apparatus of this embodiment. In the figure, reference numeral 3201 denotes an image input portion for reading image data from paper and inputting it. Reference numeral 3202 denotes an input image data storing portion for storing input image data inputted in the image input portion 3201.

Reference numeral 3203 denotes an action identification code analysis portion for extracting an action identification code, in which action identification data for identifying action data for instructing the next action as a browser is encoded, from the input image data stored in the input image data storing portion 3202 and analyzing the action identification code to take out action identification data.

Reference numeral 3204 denotes an action identification data storing portion for storing the action identification data analyzed by the action identification code analysis portion 3203. Reference numeral 3205 denotes an action decision portion for deciding the next action of the browser from a control area of the input image data stored in the input image data storing portion 3202 based on the action identification data stored in the action identification data storing portion 3204 and setting a URL for realizing the action.

Reference numeral 3206 is a URL storing portion for storing the URL decided by the action deciding portion 3205. Reference numeral 3207 denotes a request preparing portion for preparing HTTP request data for obtaining a page indicated by the URL stored in the URL storing portion 3206 and an address of a server being a transmission destination of the request data.

Reference numeral 3208 denotes a request storing portion for storing the request data and the server address prepared by the request preparing portion 3207. Reference numeral 3209 denotes an HTTP communication portion for sending the request data stored in the request storing portion 3208 to a server indicated by the server address stored in the same portion and receiving HTTP response data from the server.

Reference numeral 3201 denotes a response storing portion for storing the HTTP response data received by the HTTP communication portion 3209. Reference numeral 3211 denotes an HTML data analysis portion for taking out HTML data and analyzing it if the response data stored in the response storing portion 3210 includes the HTML data.

Reference numeral 3212 denotes an analysis result storing portion for storing an analysis result of the HTML data analyzed by the HTML data analysis portion 3211. Reference numeral 3213 denotes an HTML output data preparing portion for preparing HTML output data in which a display layout of each element is set from the analysis result of the HTML data stored in the analysis result storing portion 3212.

Reference numeral 3214 denotes an HTML output data storing portion for storing the HTML output data prepared by the HTML output data preparing portion 3212. Reference numeral 3215 denotes a preparing portion of action identification code with logo for preparing an action identification code by embedding action identification data for identifying an object (hyperlink, a radio button checkbox, a submit button or the like), which is included in HTML output data stored in the HTML output data storing portion 3214, in a logo when the output data is printed on paper. The action identification code is prepared by encoding type information of an action, positional information of a control area filled in by a user on printed paper or action indentification data indicating URL information or the like. The logo in which the action identification data is embedded is for allowing the user to determine that the action identification code is included in the printed paper.

Reference numeral 3216 denotes a storing portion of action identification code with logo for storing the action identification code prepared by the preparing portion of action identification code with logo 3215. Reference numeral 3217 denotes an output image data preparing portion for preparing output image data in which the HTML output data stored in the HTML output data storing portion 3214 and the action identification code stored in the storing portion of action identification code with logo 3216 are combined and outputted.

Reference numeral 3218 denotes an output image data storing portion for storing the output image data prepared by the output image data preparing portion 3217. Reference numeral 3219 denotes an image output portion for printing to output the output image data stored in the output image data storing portion 3218.

In this embodiment, the scanner 104 in FIG. 1 realizes the function of the image input portion 3201 and the printer 105 realizes the function of the image output portion 3219. All the other functions are realized as a computer program operating on the paper browser computer 101.

Figure 33:
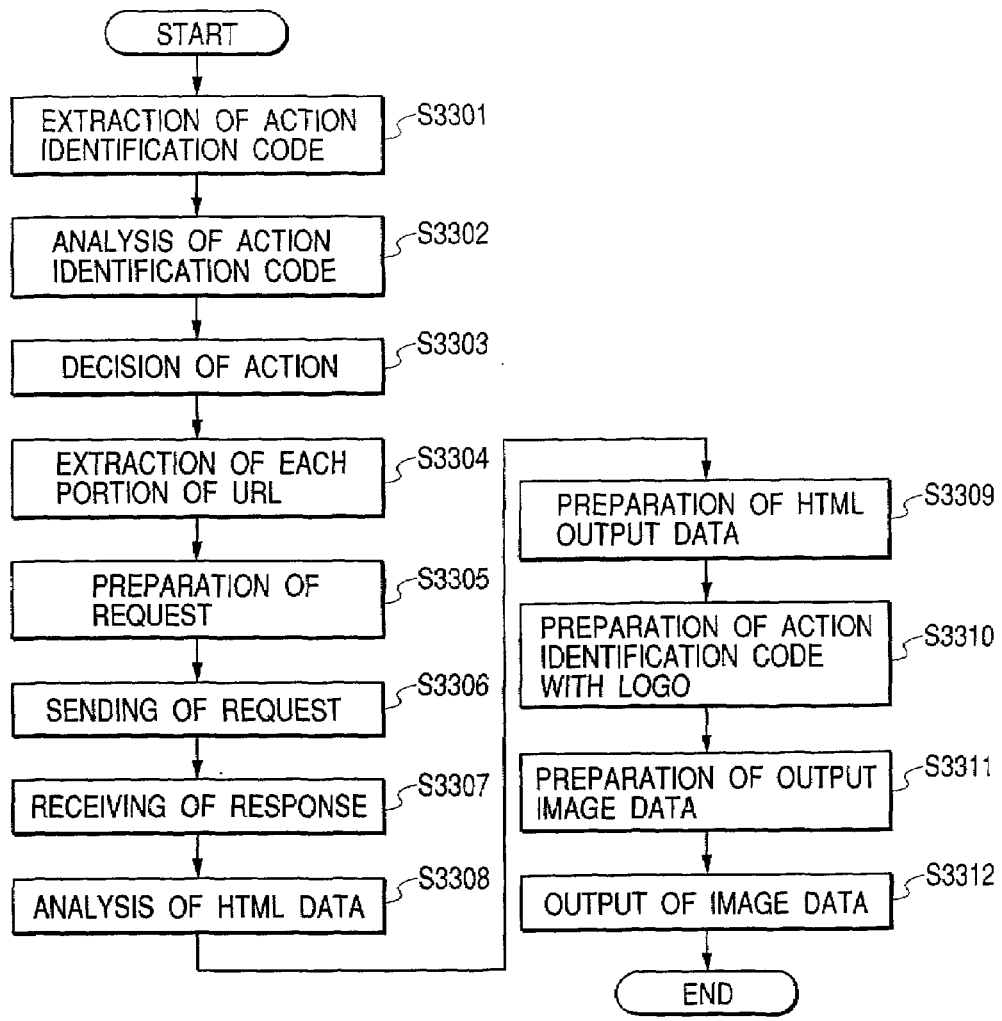
FIG. 33 is a flow chart showing processing procedures in the embodiment of the present invention.
Figure 34:
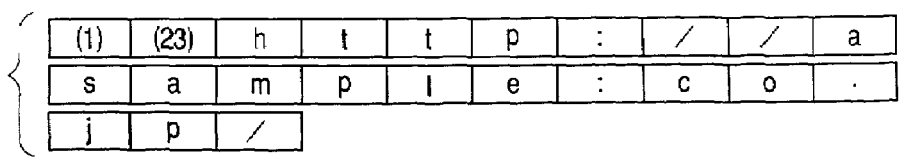
FIG. 34 illustrates an example of an action identification data in the embodiment of the present invention.

FIG. 33 is a flow chart showing processing procedures of software to be processed by the paper browser computer of this embodiment. This processing is executed when an image is read in the image input portion 3201 and an input image is stored in the input image data storing portion 3202. For example, this processing is executed by a method in which it is realized as a single application program and the application program is activated when an image is read by a scanner apparatus.

When an input image is stored in the input image data storing portion 3202, an action identification code is extracted from the input image in step 3301 first. Then, the processing shifts to step 3302. In step 3302, an action identification data is prepared by analyzing the action identification code extracted in step 3301. Then, the processing shifts to step 3303. In step 3303, a status of filling in a control area by a user is determined based on the action identification data prepared in step 3302 and an action is decided. The action is set as URL data that is requested next. Then, the processing shifts to step 3304.

In step 3304, each of the following portions is extracted from the URL data prepared in step 3303. The URL data consists of 1) a schemer portion indicating means for obtaining a page, 2) a host portion indicating a host name of a web server storing the page, 3) a port portion indicating a port of the web server storing the page, 4) a path portion indicating a position of the page in the web server and 5) a query portion indicating inquiry data in the case in which form input or the like is performed. For example, if a URL that is requested next is http://asample.co.jp/haneda.html, the schemer portion is http, the host portion is asample.co.jp, the port portion is 80 (since it is omitted in this URL, a default value is used), the path portion is haneda.html and the query portion is empty. When each portion is extracted, the processing shifts to step 3305. Further, although a schemer other than http may be processed, only http is handled here for simplicity of description.

In step 3305, HTTP request data is prepared using a value of each portion extracted in step 3304. Then, the processing shifts to step 3306. FIG. 16 illustrates HTTP request data with respect to the above-mentioned example. Although data indicating data for identifying a web browser, data indicating a receivable data type, or the like should be added to an HTTP request actually, only minimum required data is shown here for simplicity of description.

In step 3306, the HTTP request data prepared in step 3305 is sent. More specifically, TCP/IP connection is established for a port indicated by a value of the above-mentioned port portion of the server indicated by the value of the above-mentioned server portion and the above-mentioned HTTP request data is sent. Then, the processing shifts to step 3307.

In step 3307, an HTTP response is received from the server to which the HTTP request is sent in step 3306. The response is sent through the TCP/IP connected established in step 3306. This HTTP response data is stored in the response storing portion 3210. Then, the processing shifts to step 3308. FIG. 17 illustrates an example of the HTTP response data. The header of this response data indicates that the MIME type of the body portion (data in the empty line and the subsequent lines) is text/html and the length of the data is 924 bytes. Data such as identification data of a web server and data of time data for preparing data is often further included in the header portion actually, such data is omitted here for simplicity of description. In addition, although data whose MIME type is other than text/html may be handled, since it is the main purpose of the present invention to handle HTML data, a type of data to be handled is limited to text/html in this embodiment for simplicity of description.

In step 3308, HTML data that is the body of the HTTP response received in step 3307 is analyzed and tag elements in the HTML and a hierarchical relation among the tag elements are obtained. Then, the processing shifts to step 3309. In step 3309, HTML output data is prepared by arranging a layout of texts indicated by the tag elements and control objects using the result of analysis in step 3308. Then, the processing shifts to step 3310.

In step 3310, action identification data of a page to be outputted anew is prepared from the analysis result obtained in step 3308 and, if necessary, drawing position data of the control objects in the HTML output data prepared in step 3309, the action identification data is encoded and combined with logo image data to prepare drawing data of an action identification code with logo. Then, the processing shifts to step 3311.

In step 3311, the HTML output data prepared in step 3309 and the action identification code prepared in step 3310 are combined to prepare output image data. Then, the processing shifts to step 3312. In step 3312, the output image data prepared in step 3311 is printed and outputted by the image output portion 3219. Then, the entire processing is finished.

Specific processing procedures in the processing for extracting an action identification code in step 3301, the processing for analyzing an action identification code of step 3302, the processing for deciding an action of step 3303, the processing for preparing HTML output data of step 3309 and the processing for generating an action identification code in step 3310 also differ according to an embodiment mode of the action identification code.

The form of the action identification code and the above-mentioned each processing procedure will be hereinafter described.

Figure 31:
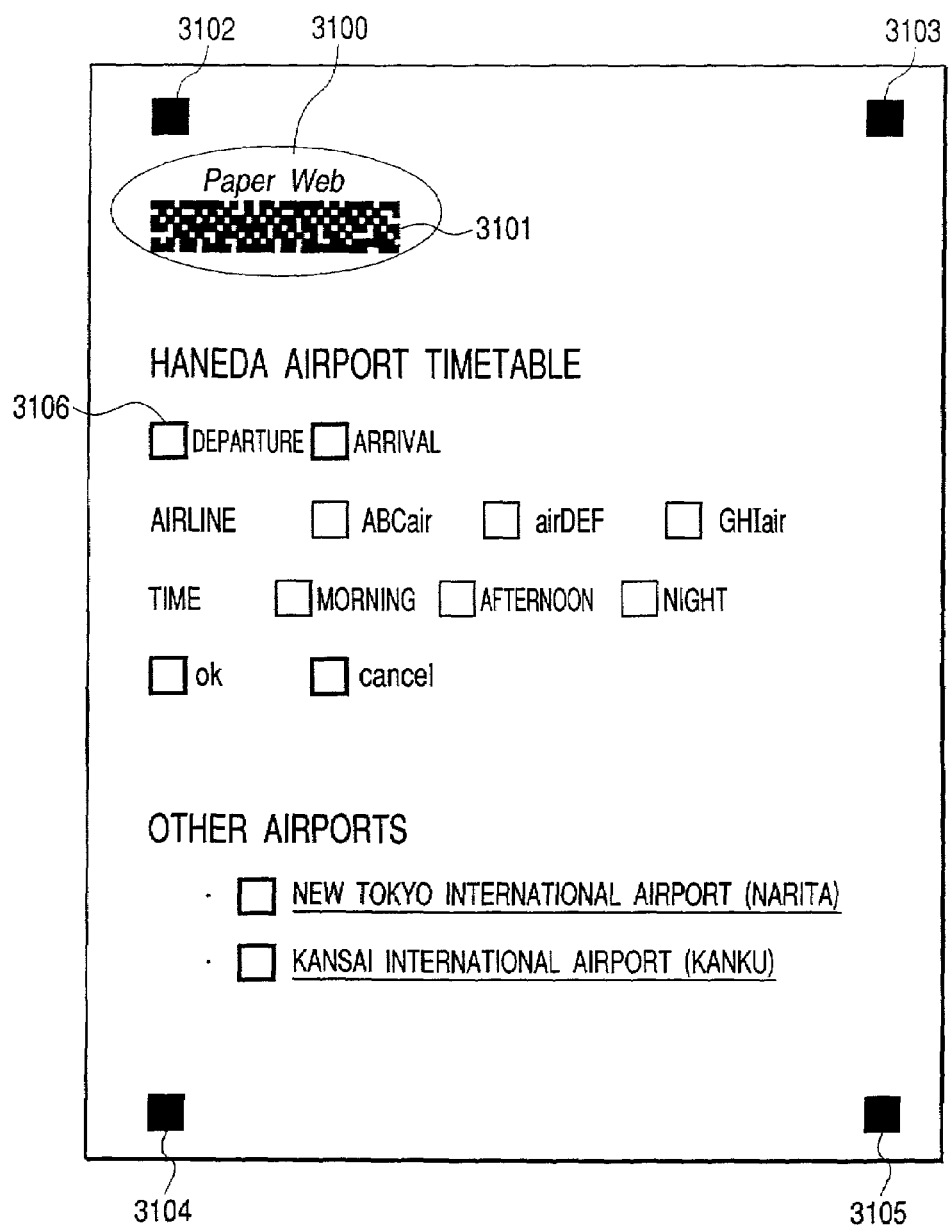
FIG. 31 illustrates an example of a paper medium on which an action identification code with a logo is printed in the embodiment of the present invention.

FIG. 31 illustrates an example of a paper medium that is outputted with an action identification code with logo added to the HTML data shown in FIG. 15 in this embodiment. In the figure, reference numeral 3100 denotes an action identification code with logo, 3101 denotes an action identification code main body and 3102 to 3105 denote position identification markers. The other parts are data that is outputted with the layout of control areas and the HTML data arranged.

The position markers 3102 to 3105 are utilized for setting a coordinate system in input image data. The action identification code main body 3101 is action identification data encoded to a machine-readable code. In this embodiment, the action identification data consists of only an ASCII code of seven bits and an integer that can be represented by seven bits (i.e., an integer from 0 to 127). The action identification code main body is found by encoding this data. The action identification code main body 3101 combined with a logo image is the action identification code with logo 3100.

In this embodiment, a user selects a radio button or a check button on a form by painting out a control area on an outputted paper medium. For example, a rectangular area denoted by reference numeral 3106 in FIG. 31 is a control area. When a control area is painted out to a certain extent, it is interpreted that the control area is selected a name attribute and a value attribute of a corresponding tag are put in a query to obtain a new page. In order to distinguish a radio button from a check box, a control area for a radio button is represented by bold lines. In addition, as to a submit button and a reset button, control areas are printed first and then labels are printed. Here, since these control areas are only allowed to be selected alternatively in the same manner as the radio button, they are represented by bold lines.

In this embodiment, an anchor is also printed with a control area provided in front of it. Selecting this control area is interpreted as selection of the anchor. Since this control area is only allowed to be selected alternatively in the same manner as the radio button, it is represented by bold lines.

The action identification data in this embodiment is the same as the above-mentioned data in which records are listed. FIG. 8 shows an example of an action identification code in the case in which the HTML data shown in FIG. 15 is outputted. The URL of the HTML data of FIG. 15 is assumed to be http://asample.co.jp/haneda.html.

The above-mentioned data is added to an output image as an action identification code, whereby it becomes possible to determine a selection state and decide a URL for obtaining a new page to obtain and output the new page when a paper medium on which control areas are filled in by a user is read.

Processing for analyzing an action identification code (step 3302) is the same as the processing for analyzing an action identification code (step 402) shown in the above-mentioned FIG. 4. The following processing is performed in processing for deciding an action (step 3303). First, it is determined using input image data if control areas are selected for a submit record, a reset record and an anchor record among records of analyzed action identification data. If there is no selected record, this is an error because a user has not selected any record. In addition, if there are two or more selected records, this is also an error because selections are redundant. In case of an error, an output image describing the error is generated and outputted from an image output portion. The processing advances to the next processing when there is only one selected record.

If a selected record is an anchor record, the value of the href field of the anchor record is set as a URL of a page to be obtained next. However, in the case in which this value is a relative path, it is the relative path from a value of a base field if there is the base record or from a value of a URL field of a page URL record if there isn't the base record. Thus, the value is combined with these values to be converted to a complete URL including a schemer portion and a host portion, which is set as a URL of a page to be obtained next.

If a selected record is a reset record, the same page is outputted again. That is, a URL of a page to be obtained next is set as a value of a URL field of a page URL record.

If a selected record is a submit record, a value of an action designation field in a form record of a form to which the submit record belongs is set as a value of portions other than a query portion in a URL of a page to be obtained next. However, in the case in which this value is a relative path, it is the relative path from a value of a base record if there is the base record or from a value of a URL field of a page URL field if there isn't the base record. Thus, the value is combined with these values to be converted to a complete URL including a schemer portion and a host portion, which is used as a URL of a page to be obtained next.

Next, a selection state of a radio button record and a check box record corresponding to the form element of the form is checked to prepare a query portion. It is determined using input image data whether the control area of each of the record is selected. If it is selected, a value of a query data record of the record is added to the query portion. If a plurality of values are added, the values are connected by "&". Further, if two or more records with the same value of a group ID field in the radio button record are selected, this is an error. Then, output image data in which contents of the error is written is prepared and outputted from an image output portion.

Further, in this embodiment, when a paper medium on which an action identification code is printed is inputted, a paper medium on which another page is printed is obtained using a function intrinsic to a web such as tracking a link from there or inputting a form.

As described above, with the browser apparatus of this embodiment, a user can easily determine whether a paper medium can be used in this apparatus by printing an action identification code with logo. In addition, a paper medium with less design incongruity can be prepared.

In addition, although the case in which an action identification code with logo is displayed in the upper part of a paper medium is described in the above-mentioned embodiment, the present invention is not limited to this but it may be displayed in any position.

In addition, although the case in which position markers are arranged at four corners of a printing area is described in the above-mentioned embodiment, the present invention is not limited to this but any number of position markers may be arranged. In addition, a undivided position marker may be used such as by printing a frame surrounding a printing area. Alternatively, a position marker may be incorporated in a logo.

In addition, although the case in which both of image input and image output are performed is described in the above-mentioned embodiment, the present invention is not limited to this but either input or output of an image may be performed. For example, the present invention may be an image output apparatus having only a function of outputting given HTML data. This image output apparatus can be utilized as an apparatus for printing a paper medium to be used in a paper browser. A paper medium that can be utilized in a paper browser apparatus has an effect in that web browsing can be performed easily in addition to an ordinary effect as a paper medium. The apparatus of this embodiment has an effect in that such a highly efficient paper medium can be printed.

THIRD EMBODIMENT MODE

Figure 36:
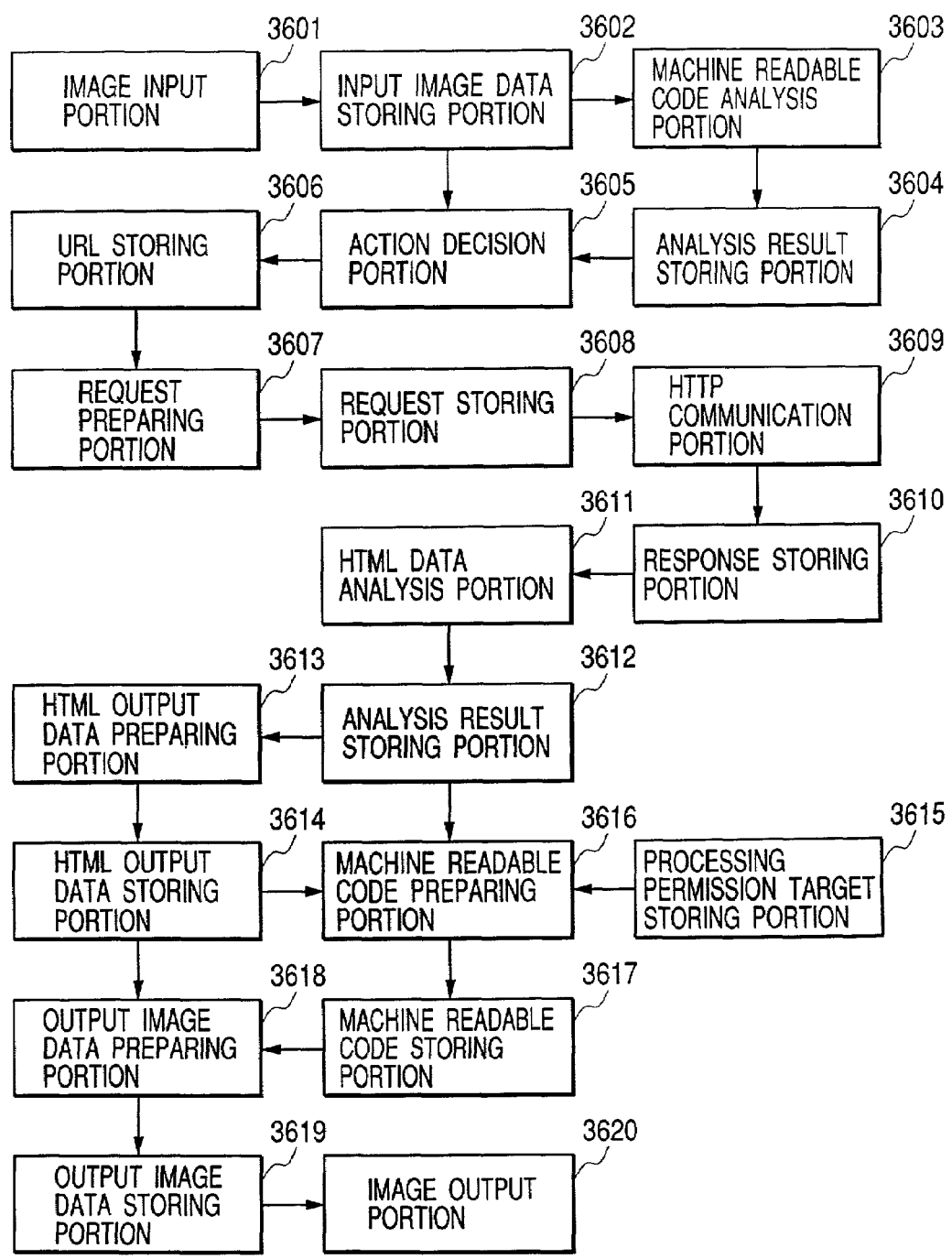
FIG. 36 illustrates a function block in the embodiment of the present invention.

FIG. 36 illustrates an example of a configuration of function modules in the paper browser apparatus of this embodiment. In the figure, reference numeral 3601 denotes an image input portion for reading image data from paper to input it. Reference numeral 3602 denotes an input image data storing portion for storing input image data inputted by the image input portion 3601.

Reference numeral 3603 denotes a machine-readable code analysis portion for extracting a machine-readable code, in which an action identification code to be used for identifying the next action and processing permission data for identifying a browser apparatus permitted to perform processing are encoded, from the input image data stored in the input image data storing portion 3602 and analyzing the machine-readable code to take out the action identification data and the processing permission data.

Reference numeral 3604 denotes an analysis result storing portion for storing the action identification data and the processing permission data that were analyzed by the machine-readable code analysis portion 3603. Reference numeral 3605 denotes an action decision portion for deciding the next action of a browser from the input image data stored in the input image data storing portion 3602 based on the processing permission data stored in the analysis result storing portion 3604 and based on the action identification data also stored in the analysis result storing portion 3604 if the apparatus in which the image is read is permitted to perform processing and setting a URL for realizing the action.

Reference numeral 3606 denotes a URL storing portion for storing the URL decided in the action decision portion 3605. Reference numeral 3607 denotes a request preparing portion for preparing HTTP request data for obtaining a page indicated by the URL stored in the URL storing portion 3606 and an address of a server that is a transmission destination of the request data.

Reference numeral 3608 denotes a request storing portion for storing the request data and the server address prepared in the request preparing portion 3707. Reference numeral 3609 denotes is an HTTP communication portion for transmitting the request data stored in the request storing portion 3608 to a server indicated by the server address stored in the same portion and receiving HTTP response data from the server.

Reference numeral 3610 denotes a response storing portion for storing the HTTP response data received by the HTTP communication portion 3609. Reference numeral 3611 denotes an HTML data analysis portion for taking out HTML data to analyze it if the response data stored in the response storing portion 3610 includes the HTML data.

Reference numeral 3612 denotes an analysis result storing portion for storing an analysis result of the HTML data analyzed by the HTML data analysis portion 3611. Reference numeral 3613 denotes an HTML output data preparing portion for preparing HTML output data in which a layout of each element is set from the analysis result of the HTML data stored in the analysis result storing portion 3612.

Reference numeral 3614 denotes an HTML output data storing portion for storing the HTML output data prepared in the HTML output data preparing portion 3613. Reference numeral 3615 denotes a processing permission target data storing portion for storing data of a browser apparatus that is permitted to process paper outputted from the browser apparatus.

Reference numeral 3616 denotes a machine-readable code preparing portion for referring to the analysis result stored in the analysis result storing portion 3612 and the HTML output data stored in the HTML output data storing portion 3614 to prepare action identification data and further preparing processing permission identification data for identifying a processing permission target apparatus stored in the processing permission target data storing portion 3615 to prepare an image of a machine-readable code by encoding these action identification data and processing permission identification data.

Reference numeral 3617 denotes a machine-readable code storing portion for storing the machine-readable code prepared by the machine-readable code preparing portion 3616. Reference numeral 3618 denotes an output image data preparing portion for preparing output image data in which the HTML output data stored in the HTML output data storing portion 3614 and the machine-readable code stored in the machine-readable code storing portion 3617 are combined and outputted.

Reference numeral 3619 denotes an output image data storing portion for storing the output image data prepared by the output image data preparing portion 3618. Reference numeral 3620 denotes an image output portion for printing to output the output image data stored in the output image data storing portion 3619.

In this embodiment, the scanner 104 in FIG. 1 realizes the function of the image input portion 3601 and the printer 105 realizes the function of the image output portion 3620. All the other functions are realized as a computer program operating on the paper browser computer 101.

Figure 37:
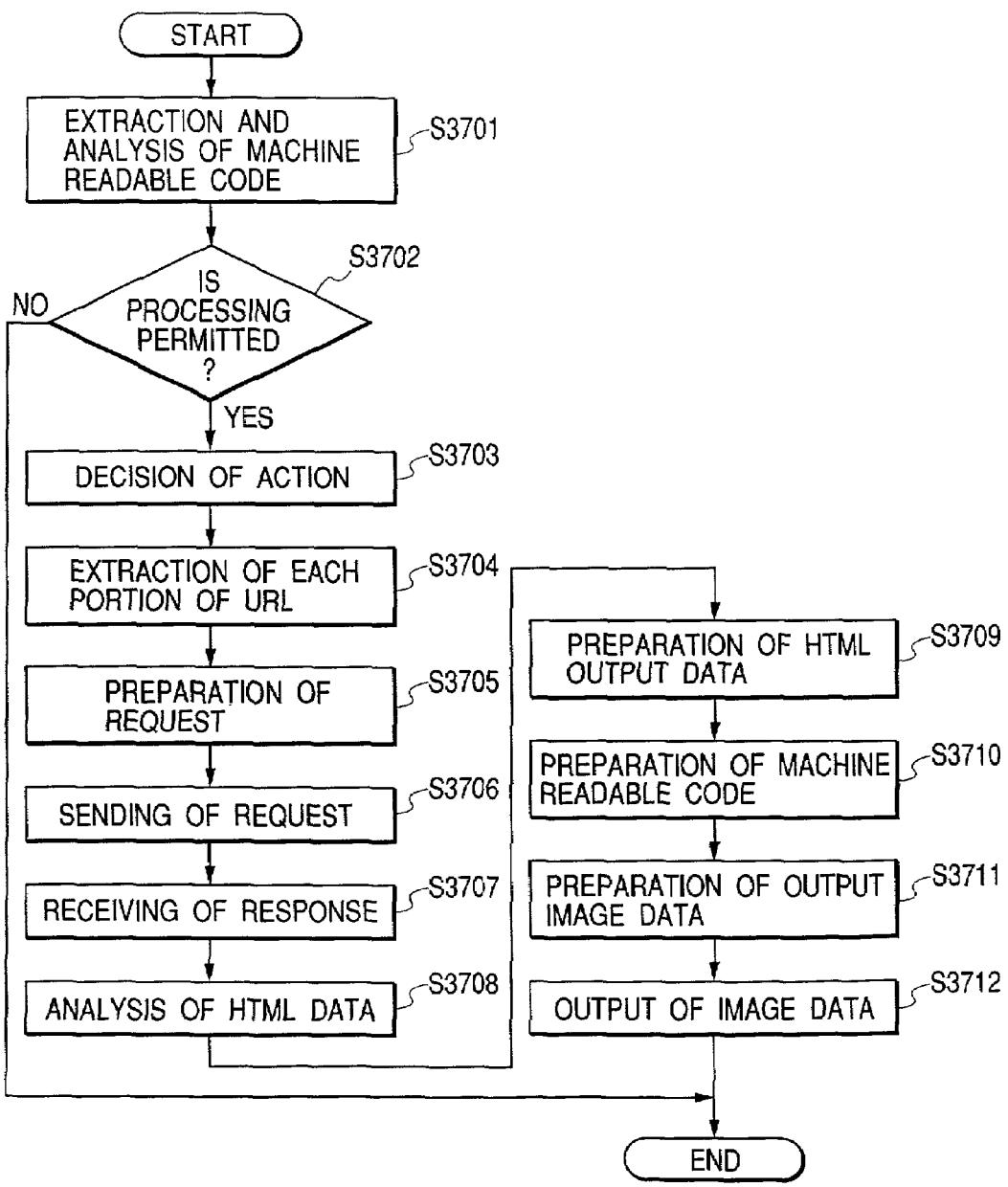
FIG. 37 is a flow chart showing processing procedures in the embodiment of the present invention.

FIG. 37 is a flow chart showing processing procedures of software to be processed by the paper browser computer of this embodiment. This processing is executed when an image is read in the image input portion 3601 and an input image is stored in the input image data storing portion 3602.

For example, this processing is executed by a method in which it is realized as a single application program and the application program is activated when an image is read by a scanner apparatus.

When an input image is stored in the input image data storing portion 3602, a machine-readable code is extracted from the input image in step 3701 first and action identification data and processing permission data are obtained by analyzing the extracted machine-readable code. Then, the processing shifts to step 3702. In step 3702, it is determined whether or not the browser apparatus is a processing permission target based on the processing permission data prepared in step 3701 and, if it is a processing permission target, the processing shifts to step 3703. If it is not a processing permission target, the processing is finished. Before the processing is finished, an error message may be displayed or outputted. In step 3703, a status of filling in a control area by a user is determined based on the action identification data obtained in step 3701 and an action is decided. The action is set as URL data that is requested next. Then, the processing shifts to step 3704.

In step 3704, each of the following portions is extracted from the URL data prepared in step 3703. The URL data consists of 1) a schemer portion indicating means for obtaining a page, 2) a host portion indicating a host name of a web server storing the page, 3) a port portion indicating a port of the web server storing the page, 4) a path portion indicating the position of the page in the web server and 5) a query portion indicating inquiry data in the case in which form input or the like is performed. For example, if a URL that is requested next is http://asample.co.jp/haneda.html, the schemer portion is http, the host portion is asample.co.jp, the port portion is 80 (since it is omitted in this URL, a default value is used), the path portion is haneda.html and the query portion is empty. When each portion is extracted, the processing shifts to step 3705. Further, although a schemer other than http may be processed, only http is handled here for simplicity of description.

In step 3705, HTTP request data is prepared using a value of each portion extracted in step 3704. Then, the processing shifts to step 3706. FIG. 16 illustrates HTTP request data with respect to the above-mentioned example. Although data indicating data for identifying a web browser, data indicating a receivable data type, or the like should be added to an HTTP request actually, only minimum required data is shown here for simplicity of description.

In step 3706, the HTTP request data prepared in step 3705 is sent. More specifically, TCP/IP connection is established for a port indicated by a value of the above-mentioned port portion of the server indicated by the value of the above-mentioned server portion and the above-mentioned HTTP request data is sent. Then, the processing shifts to step 3707.

In step 3707, an HTTP response is received from the server to which the HTTP request is sent in step 3706. The response is sent through the TCP/IP connection established in step 3706. This HTTP response data is stored in the response storing portion 310. Then, the processing shifts to step 3708. FIG. 17 illustrates an example of the HTTP response data. The header of this response data indicates that the MIME type of the body portion (data in the empty line and the subsequent lines) is text/html and the length of the data is 924 bytes. Data such as identification data of a web server and time data for preparing data is often further included in the header portion actually, such data is omitted here for simplicity of description. In addition, although data whose MIME type is other than text/html may be handled, since it is the main purpose of the present invention to handle HTML data, a type of data to be handled is limited to text/html in this embodiment for simplicity of description.

In step 3708, HTML data that is the body of the HTTP response received in step 3707 is analyzed and tag elements in the HTML and a hierarchical relation among the tag elements are obtained. Then, the processing shifts to step 3709. In step 3709, HTML output data is prepared by arranging a layout of texts indicated by the tag elements and control objects using the result of analysis in step 3708. Then, the processing shifts to step 3710.

In step 3710, action identification data of a page to be outputted anew is prepared from the analysis result obtained in step 3708 and, if necessary, drawing position data of the control objects in the HTML output data prepared in step 3709. In addition, processing permission data for identifying a browser apparatus that is a processing permission target indicated by processing permission target data is prepared. Then, the action identification data and the processing permission data are encoded to prepare drawing data of a machine-readable code. Then, the processing shifts to step 3711.

In step 3711, the HTML output data prepared in step 3709 and the machine-readable code prepared in step 3710 are combined to prepare output image data. Then, the processing shifts to step 3712. In step 3712, the output image data prepared in step 3711 is outputted by the image output portion 319. Then, the entire processing is finished.

Processing procedures in the processing for extracting and analyzing a machine-readable code in step 3701, the processing for determining processing permission of step 3702, the processing for deciding an action of step 3703, the processing for preparing HTML output data of step 3709 and the processing for generating a machine-readable code in step 3710 also differ according to an embodiment mode of the machine-readable code.

The form of the machine-readable code and the above-mentioned each processing procedure will be hereinafter described.

Figures 38, 39:
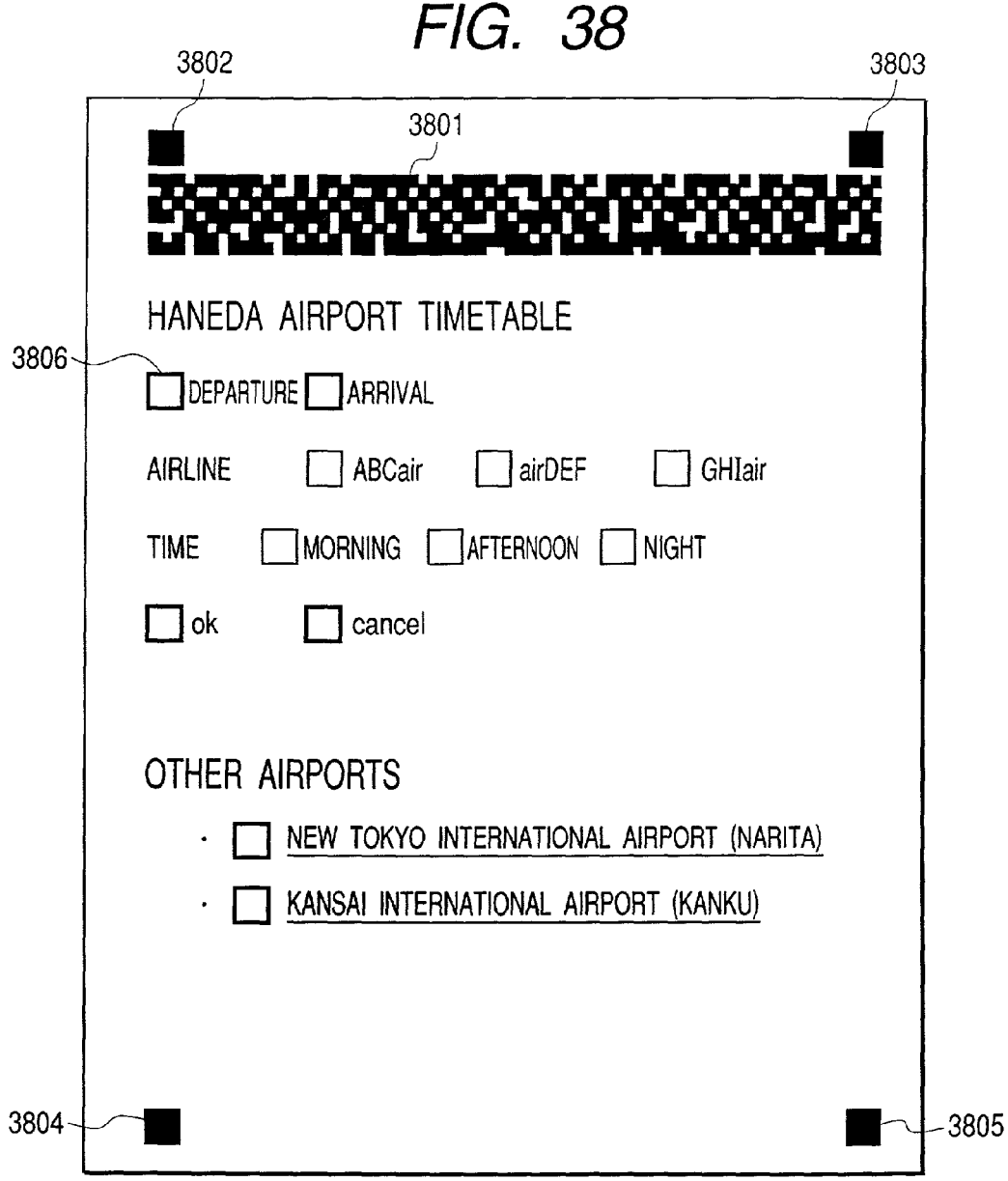
FIG. 38 illustrates an example of a paper medium on which a machine-readable code is printed in the embodiment of the present invention.
FIG. 39 illustrates an example of another piece of incorporated data in the embodiment of the present invention.

FIG. 38 illustrates an example of a paper medium that is outputted with a machine-readable code added to the HTML data shown in FIG. 15 in this embodiment. In the figure, reference numeral 3801 denotes a machine-readable code main body and 3802 to 3805 denote position identification markers. The other parts are data that is outputted with the layout of the HTML data arranged.

In this embodiment, in order to identify an area on a paper medium, a printable area is divided in a mesh shape consisting of X meshes in the horizontal direction and Y meshes in the vertical direction. Then, a mesh in the upper left corner is referred to by a two-dimensional coordinate (0, 0), an area moved one mesh in the right direction is referred to by a coordinate with the x component increased by one and an area moved one mesh in the down direction is referred to by a coordinate with the y component increased by one. That is, a mesh in the upper right corner is referred to by (X−1, 0), a mesh in the lower left corner is referred to by (0, Y−1) and a mesh in the lower right corner is referred to by (X−1, Y−1). Here, a mesh referred to by the coordinate (x, y) is written as m(x, y). Further, in this embodiment, description will be hereinafter made with the value of X as 80 and the value of Y as 120. However, these values may be arbitrary values.

The positional markers 3802 to 3805 are all the areas of the meshes in the following mesh sets M2, M3, M4 and M5 printed in black, respectively.

M2={m(x, y) | 0<=x<3, 0<y<3}
M3={m(x, y) | X-3<=x<X, 0<=y<3}
M4={m(x, Y) | 0<=x<3, Y-3<=y<Y}
M5={m(x, Y) | X-3<=x<X, Y-3<=y<Y}

The positional markers are utilized for setting a position of each mesh in input image data after reading an image printed on a paper medium by an image input portion.

The machine-readable code main body 3801 is a code that is found by encoding built-in data combining action identification data and processing permission data. In this embodiment, the built-in data consists only of an ASCII code of seven bits and integers that can be represented by seven bits (i.e., integers from 0 to 127). The machine-readable code in this embodiment is a code for representing each byte of the built-in data by seven meshes arranged vertically. The code is generated by associating the bits in meshes such that a more significant bit is below a less significant bit and the less significant bit is above the more significant bit, printing a corresponding mesh in black if a bit is 1 and printing nothing if a bit is 0. One vertical line of seven meshes generated for each byte of the built-in data is arranged in the right direction in the order of data. If vertical lines of seven meshes in one vertical line are arranged to the right end, other vertical lines of seven meshes are arranged from the left end in the position seven meshes below.

The built-in data will be hereinafter described in a formulated manner.

The length of the built-in data is assumed to be L bytes, and the least significant bit that is j-th byte from the top is represented by b(j, 0) and each bit is represented by b(j, 1), b(j, 2), . . . b(j, 6) toward the most significant bit. In addition, it is assumed that H=[(L−1)/X]+1. Here, [ ] is a notation for representing a maximum integer that does not exceed a value in [ ].

Then, if X*i+j<L with respect to each of i, j and k that is 0<=i<H, 0<=j<X and 0<=k<6, the entire area of a mesh m(j, i*7+5+k) is printed in black when a bit b(X*i+j, k) is 1. Here, 5 is added to the Y coordinate of the mesh in order to print a machine-readable code main body from a position that is distant from a position marker by two meshes.

Figure 40:
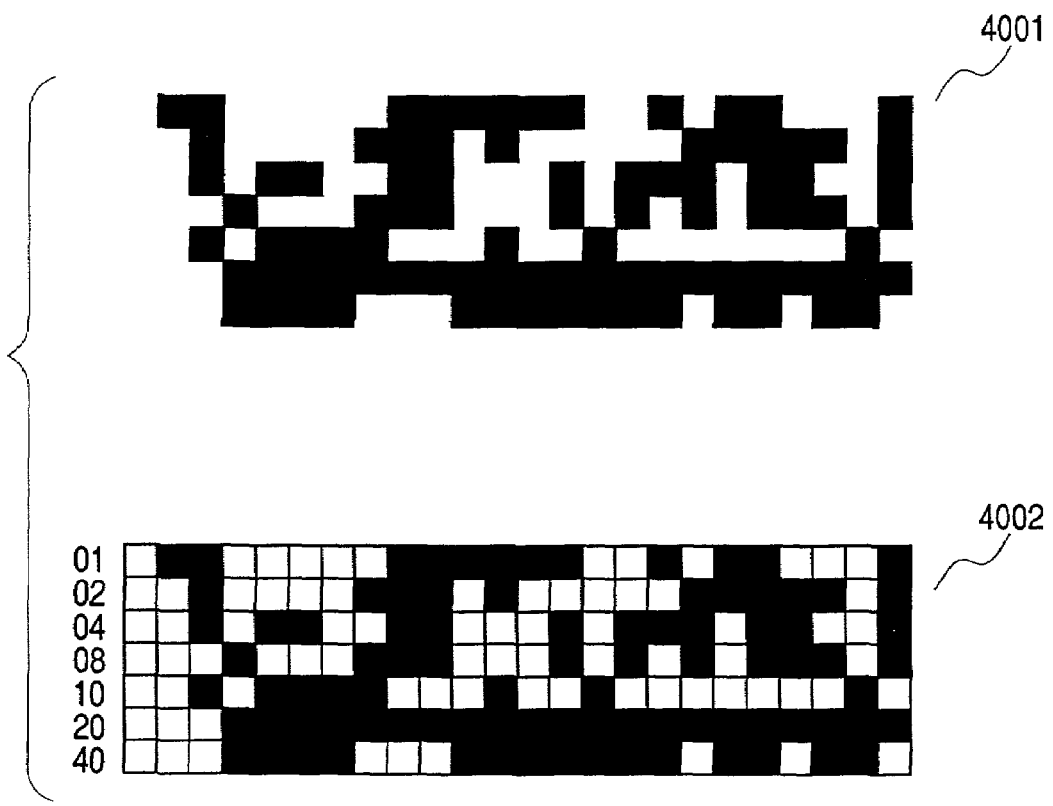
FIG. 40 illustrates an example of a machine-readable code main body in the embodiment of the present invention.

As an example, a machine-readable code that is found by encoding the built-in data shown in FIG. 39 is shown in FIG. 40. Each box of FIG. 39 indicates data of one byte. In the figure, a numerical value in parentheses indicates that it is stored as an integer value. Other numerical values indicate that ASCII codes of characters in the figure are stored. In FIG. 40, reference numeral 4001 denotes an actual machine-readable code. Reference numeral 4002 shows border lines of meshes with solid lines such that an area of each mesh can be easily seen. In addition, it also shows which bit each line corresponds to. Contents of the built-in data will be described later.

The built-in data in this embodiment is data arranged in the order of processing permission data and action identification data. The processing permission data in this embodiment is configured as described below.

Processing permitted browser number field

An integer number indicating the number of browser is permitted to perform processing is input. If this value is zero, it means that an arbitrary browser is permitted to perform processing.

Processing permitted browser ID field

This field continues by the number of values of the processing permitted browser number field. The processing permitted browser ID field is data of 6 bytes and is an ID for identifying a browser of this embodiment individually. Only browser apparatuses of this embodiment having IDs listed here are allowed to perform processing of a paper medium.

The action identification data in this embodiment is the same as data listing the above-mentioned records.

A machine-readable code is prepared from the above-mentioned action identification data and processing permission data to add it to an output image, whereby it becomes possible to determine if processing in the browser apparatus is permitted and further determine a selection state filled in paper to decide a URL for obtaining a new page and obtain and output the new page. Processing for preparing HTML output data (step 3709), processing for generating a machine-readable code (step 3710), processing for preparing output image data (step 3711), processing for extracting and analyzing a machine-readable code (step 3701) and processing for determining an action (step 3703), which specifically realize the above in this embodiment, will be hereinafter described.

In the processing for preparing HTML output data (step 3709), the horizontal length of an output data image is set as a length for X meshes and a layout is generated to fit in this range. In this case, a control area is set as described above to surround the control area by solid lines and lines in a layout of other characters and the like are arranged to fit the control area. In addition, a coordinate value of a mesh in the upper left for identifying the set control area is stored. This coordinate value is stored as a value assuming that the coordinate of the mesh in the upper left of the output data image is (0, 0).

In the processing for generating a machine-readable code (step 3710), processing permission data is prepared first. The processing permission data is prepared by listing the number of processing permission targets and their IDs stored in the processing permission target storing portion 315.

Next, action identification data is prepared. First, a page URL record is prepared from a URL of HTML data. Next, a BASE tag, a FORM tag or an A tag that indicates an origin anchor is retrieved from the top of an analysis tree based on an analysis result of the HTML data. If there are these tags, a base record, a form record and an anchor record are prepared, respectively. When the form record is prepared, an INPUT tag is retrieved out of elements of the FORM tag and a submit record, a reset record, a radio button record and a check box record are prepared according to a type attribute of the INPUT tag. When the preparation of these records is finished, the number of form elements is substituted for an element number field of the form record.

Further, a method of generating a value of a query data field in the radio button record and the check box record is the same as the above-mentioned preparation. In addition, as to the A tag in the FORM element, an anchor record is prepared after preparation of records for these form elements is finished. An arbitrary value is put in each control area field until the processing of all the tags is finished. When the processing of all the tags is finished and action identification data is fixed, a data length L of an action identification data is fixed and the above-mentioned value H is found.

Thus, a coordinate of a control area corresponding to each record is taken out with reference to coordinate data of the control area prepared in the processing for preparing HTML output data. A value of the X coordinate is substituted as it is for a value in a control area field of a corresponding record. A value of the Y coordinate is added with a value of h found by the following equation and then substituted for a value in a control area field of a corresponding record.

$$h=H*7+8$$

After preparing the built-in data in this way, image data and a positional marker of a machine-readable code main body are prepared in accordance with the above-mentioned encoding method. These are the procedures of the processing for generating an action identification code.

In the processing for preparing output image data (step 3711), the image data prepared by the above-mentioned processing for preparing a machine-readable code and the image data prepared by the processing for preparing HTML output data are laid one on top of the other to prepare output image data. In this case, the two pieces of image data are laid one on the other such that the mesh m(0, 0) of the HTML output data coincides with the mesh m(0, h) of the image data of the machine-readable code.

In the processing for extracting an action identification code (step 3701), a position marker is extracted from input image data first. This is realized by a general method of dividing a black area and a white area. When the position marker is extracted, a position in the upper left corner of a positional marker 3802 is set as (X00, Y00), a position in the upper right corner of a positional marker 3803 is set as (X10, Y10) and a position in the lower left corner of a positional marker 3804 is set as (X01, Y01) in the coordinate system of the input image data. From these positions, the relation between the upper left corner of the mesh m(x, y) in the output image data and the coordinate system (the x coordinate value is represented by x' and the y coordinate value is represented by y') in the input image data is found as shown by the following equation.

$$x'=(X10-X00)/X*x(X01-X00)/Y*y+X00 \quad y'=(Y10-Y00)/X*x(Y01-Y00)/Y*y+Y00$$

Here, the area m'(x, y) in the input image data of the mesh m(x, y) is an area surrounded by (x'1, y'1), (x'2, y'2), (x'3, y'3) and (x'4, y'4) that are found by substituting each point (x, y), (x+1, y), (x+1, y+1) and (x, y+1) for the above equation. Here, b1(x, y) is defined as a function that becomes 1 when 80% or more of pixels included in m'(x, y) is black and becomes 0 in other cases. In addition, b2(x, y) is defined as a function that becomes 1 when 30% or more of pixels included in m'(x, y) is black and becomes 0 in other cases. In addition, d(x, y) is defined as $d(x, y)=\Sigma i=_0^6 b1(x, y+1)*2^i$. The above-mentioned calculation processing can be realized easily if a computer is used.

Then, d(x, y) is found by incrementing x by one until x reaches X with x=0, y=5 as a start point. This value is sequentially substituted for a built-in data array. When x reaches X, the value of y is increased by seven and the same processing is repeated. If the value of d(x, y) becomes 0 in the middle, the processing is finished.

In the processing for analyzing a machine-readable code (step 3701), a top byte of a built-in data array is taken out. Subsequent processing permission browser ID fields are taken out by the number of this value.

Next, analysis of an action identification data portion is performed. The next byte is taken out and the type of a record is decided in view of this value. Then, the next byte is taken out and the type of the next record is decided. In the record, a value of each field is taken out in accordance with the type of the record. Then, the next byte advanced by the length of the record is taken out and the type of the next record is decided. Subsequently, this processing is repeated until reaching the last of the built-in data array. Processing for deciding an action (step 3703) is the same as the processing for deciding an action (step 403) shown in FIG. 4.

As described above, with the browser apparatus of this embodiment, a machine-readable code is prepared from action identification data and processing permission data, whereby a paper medium to be distributed without limiting a browser apparatus and a paper medium to be used limitedly can be distinguished. Since a usable browser apparatus can be limited, it becomes possible to charge a fee according to an apparatus.

In addition, although the case in which processing permission data is data listing IDs of browser apparatuses to be permitted to perform processing is described in the above-mentioned embodiment, the present invention is not limited to this but any data may be used as long as it can set a processing permission object. For example, data using an IP address or an identification name on a network of a browser apparatus may be used. In addition, data indicating a range rather than an apparatus such as a domain name may be used.

In addition, the above-mentioned embodiment is a browser apparatus that can limit a browser to be permitted to perform processing. The browser apparatus may be further provided with means for managing whether a fee should be charged or not according to a range of permission.

Figure 41:
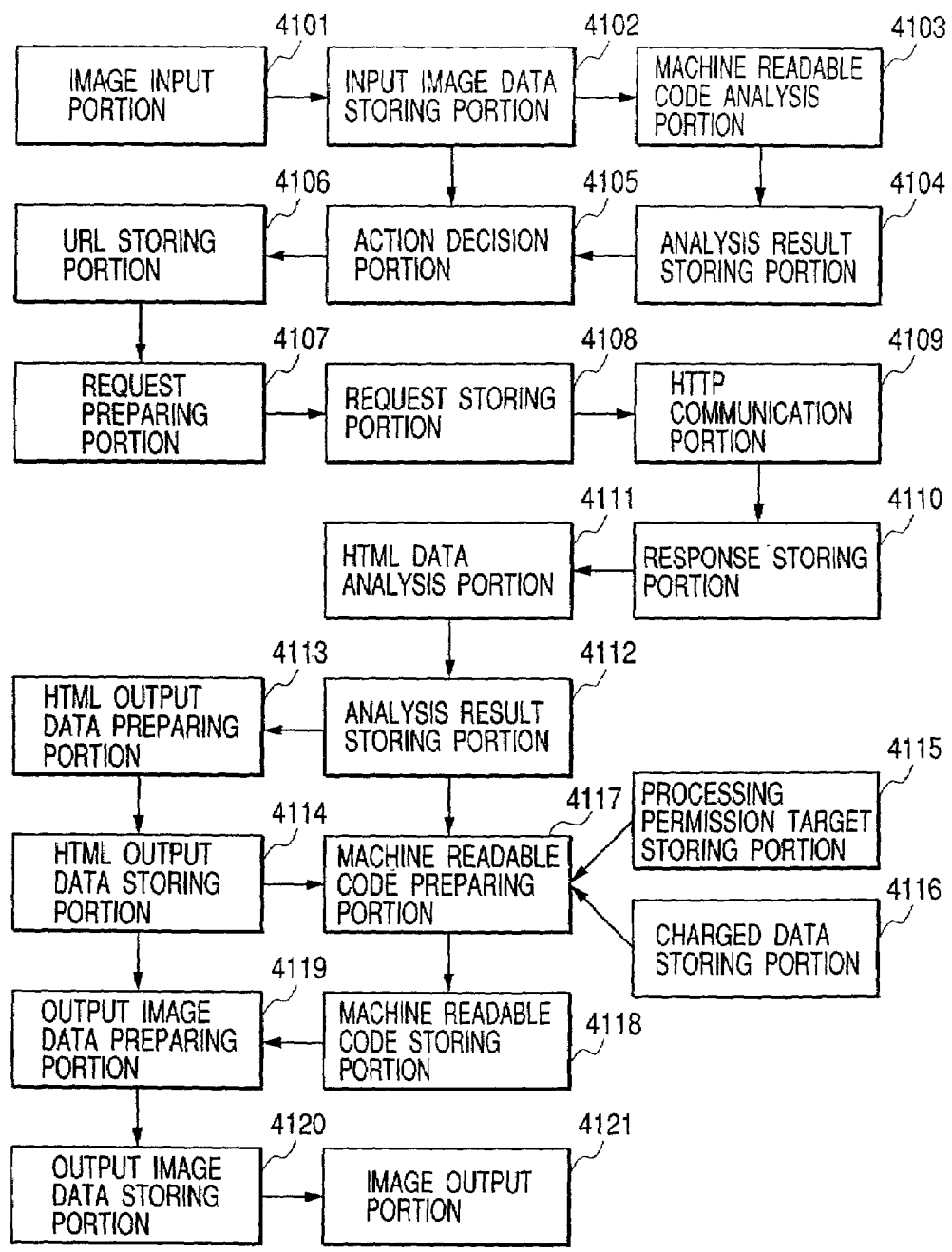
FIG. 41 illustrates a configuration of function blocks in another embodiment of the present invention.

FIG. 41 illustrates an example of a configuration of function modules in a paper browser apparatus of an embodiment which charges a fee for an output of image data when processing permission data for permitting processing with respect to an arbitrary browser apparatus is inputted to a machine-readable code. Reference numeral 4101 denotes an image input portion for reading image data from paper to input it. Reference numeral 4102 denotes an input image data storing portion for storing input image data inputted in the image input portion 4101.

Reference numeral 4103 denotes a machine-readable code analysis portion for extracting a machine-readable code from the input image data stored in the input image data storing portion 4102 and analyzing the machine-readable code to take out action identification data and processing permission data.

Reference numeral 4104 denotes an analysis result storing portion for storing the action identification data and the processing permission data that were analyzed by the machine-readable code analysis portion 4103. Reference numeral 4105 denotes an action decision portion for deciding the next action of a browser from the input image data stored in the input image data storing portion 4102 based on the processing permission data stored in the analysis result storing portion 4104 and based on the action identification data also stored in the analysis result storing portion 4104 if the apparatus in which the image is read is permitted to perform processing and setting a URL for realizing the action.

Reference numeral 4106 denotes a URL storing portion for storing the URL decided in the action decision portion 4105. Reference numeral 4107 denotes a request preparing portion for preparing HTTP request data for obtaining a page indicated by the URL stored in the URL storing portion 4106 and an address of a server that is a transmission destination of the request data.

Reference numeral 4108 denotes a request storing portion for storing the request data and the server address prepared in the request preparing portion 4107. Reference numeral 4109 denotes is an HTTP communication portion for transmitting the request data stored in the request storing portion 4108 to a server indicated by the server address stored in the same portion and receiving HTTP response data from the server.

Reference numeral 4110 denotes a response storing portion for storing the HTTP response data received by the HTTP communication portion 4109. Reference numeral 4111 denotes an HTML data analysis portion for taking out HTML data to analyze it if the response data stored in the response storing portion 4110 includes the HTML data.

Reference numeral 4112 denotes an analysis result storing portion for storing an analysis result of the HTML data analyzed by the HTML data analysis portion 4111. Reference numeral 4113 denotes an HTML output data preparing portion for preparing HTML output data in which a layout of each element is set from the analysis result of the HTML data stored in the analysis result storing portion 4112.

Reference numeral 4114 denotes an HTML output data storing portion for storing the HTML output data prepared in the HTML output data preparing portion 4113. Reference numeral 4115 denotes a processing permission target data storing portion for storing ID data of a browser apparatus that is permitted to process the input image.

Reference numeral 4116 denotes a charged data storing portion for storing data of an image data output fee paid in advance. Reference numeral 4117 denotes a machine-readable code preparing portion for referring to the analysis result stored in the analysis result storing portion 4112 to prepare action identification data and further preparing processing permission identification data for identifying a processing permission target apparatus stored in the processing permission target data storing portion 4115 to prepare a machine-readable code by encoding these action identification data and processing permission identification data and, at the same time, if the processing permission target data is permission with respect to a predetermined browser apparatus rather than all the browser apparatuses, subtracting a fee for outputting the data from charge data stored in the charged data storing portion 4116. Further, the machine-readable code preparing portion 4117 also has a function of stopping the processing of preparing a machine-readable code and the subsequent processing if the charge data turns out to be a negative value as a result of the subtraction processing.

Reference numeral 4118 denotes a machine-readable code storing portion for storing the machine-readable code prepared by the machine-readable code preparing portion 4117. Reference numeral 4119 denotes an output image data preparing portion for preparing output image data in which the HTML output data stored in the HTML output data storing portion 4114 and the machine-readable code stored in the machine-readable code storing portion 4118 are combined and outputted.

Reference numeral 4120 denotes an output image data storing portion for storing the output image data prepared by the output image data preparing portion 4119. Reference numeral 4121 denotes an image output portion for printing to output the output image data stored in the output image data storing portion 4120.

In addition, although the case in which a fee is paid in advance, charged data indicating the paid value is stored and charging is realized by subtracting a fee from the charged data is described in the above-mentioned embodiment, the present invention is not limited to this but any charging means may be used. For example, a method of sending charge data to a charging server each time necessity for charging arises and obtaining charged guarantee data may be used. Alternatively, a method of concluding an agreement for a fixed term or a fixed number of sheets, storing data indicating that an agreement is concluded and performing image output if the concluded agreement data is stored may be used.

In addition, although the case in which both input and output are performed by a paper medium is described in the above-mentioned embodiment, the present invention is not limited to this but input may be performed in the form of a URL or HTML data. For example, a printing device for printing a paper medium that can be processed by the browser apparatus of the above-mentioned embodiment after inputting HTML data has this configuration.

Figure 42:
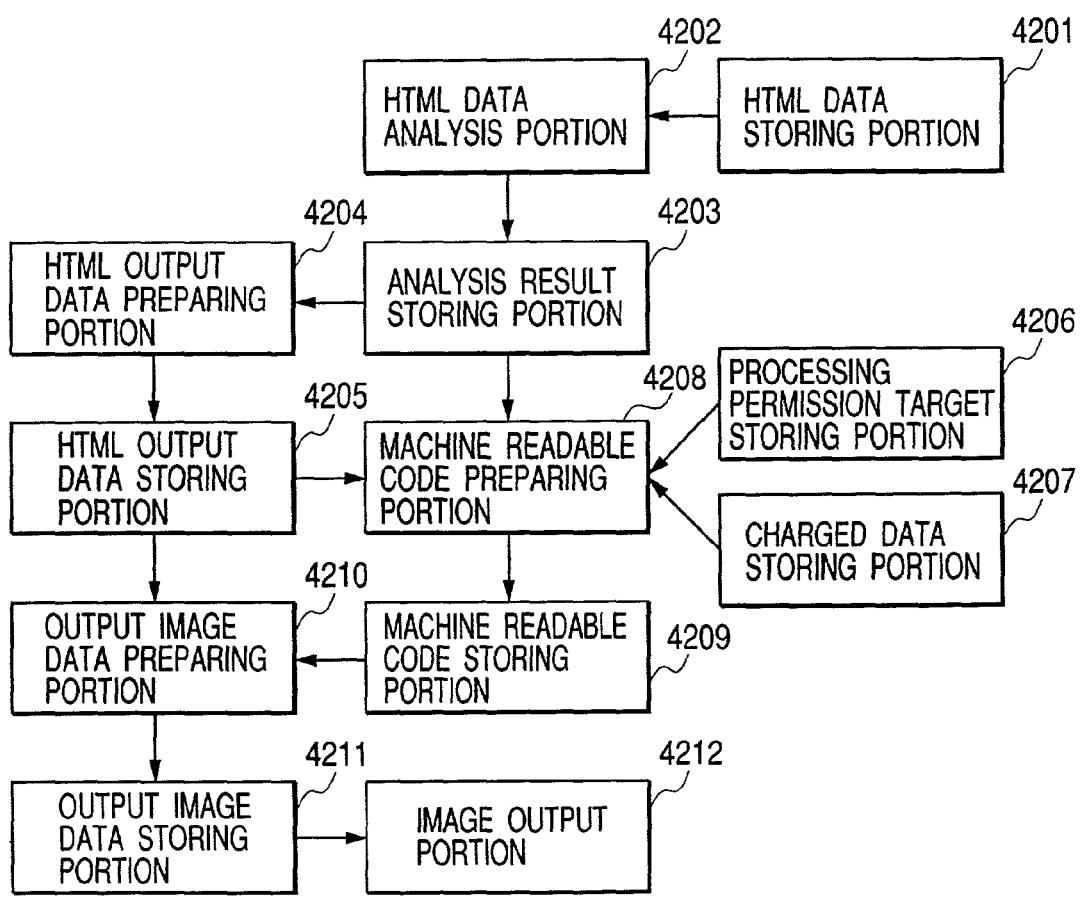
FIG. 42 illustrates a configuration of function blocks in another embodiment of the present invention.

FIG. 42 illustrates an example of a configuration of function modules in an printing device of an embodiment for printing image data in which a machine-readable code is embedded in response to inputted HTML data. In the figure, reference numeral 4201 denotes an HTML data storing portion for storing HTML data. Reference numeral 4202 denotes an HTML data analysis portion for analyzing the HTML data stored in the HTML data storing portion 4201.

Reference numeral 4203 denotes an analysis result storing portion for storing an analysis result of the HTML data analyzed by the HTML data analysis portion 4202. Reference numeral 4204 denotes an HTML output data preparing portion for preparing HTML output data in which a layout of each element is set from the analysis result of the HTML data stored in the analysis result storing portion 4203.

Reference numeral 4205 denotes an HTML output data storing portion for storing the HTML output data prepared by the HTML output data preparing portion 4204. Reference numeral 4206 denotes a processing permission target data storing portion for storing data of a browser apparatus that is permitted to process paper outputted by the printing device.

Reference numeral 4207 denotes a charged data storing portion for storing data of an image data output fee paid in advance. Reference numeral 4208 denotes a machine-readable data preparing portion for referring to the analysis result stored in the analysis result storing portion 4203 to prepare action identification data and further preparing processing permission identification data for identifying a processing permission target stored in the processing permission target data storing portion 4206 to prepare a machine-readable code by encoding these action identification data and processing permission identification data and, at the same time, if the processing permission target data stored in the processing permission target data storing portion is permission with respect to a predetermined browser apparatus rather than all the browser apparatuses, subtracting a fee for outputting the data from charge data stored in the charged data storing portion 4207. Further, the machine-readable data preparing portion 4208 also has a function of stopping the processing of preparing a machine-readable data and the subsequent processing if the charge data turns out to be a negative value as a result of the subtraction processing.

Reference numeral 4209 denotes an action identification code storing portion for storing the machine-readable data prepared by the machine-readable data preparing portion 4208. Reference numeral 4210 denotes an output image data preparing portion for preparing output image data in which the HTML output data stored in the HTML output data storing portion 4205 and the machine-readable code stored in the machine-readable data storing portion 4209 are combined and outputted.

Reference numeral 4211 denotes an output image data storing portion for storing the output image data prepared by the output image data preparing portion 4210. Reference numeral 4212 denotes an image output portion for printing to output the output image data stored in the output image data storing portion 4211.

Although the case in which processing up to output to a paper medium is described in the above-mentioned embodiment, the present invention is not limited to this but only output image data may be prepared. Image data prepared here is printed by separate printing processing. For example, a version data preparing apparatus for inputting HTML data to prepare image data for printing a paper medium that can be processed by the browser apparatus of the above-mentioned embodiment has this configuration. The function block diagram of this embodiment shows a configuration in which the image output portion 4212 is deleted from FIG. 42.

As described above, according to the present invention, there is an effect in that a user can realize perfect web browsing including form input and anchor selection by simple operations of writing in a physical medium such as a paper medium and inserting the physical medium in the apparatus and can perform web browsing easily. There is an effect in that even a user who is not familiar with complicated operations of a computer can perform web browsing.

In addition, there is an effect in that contents of a page can be distributed by an information distribution medium in the form of a paper medium such as a newspaper and a magazine and web browsing can be easily realized starting from such a medium. In addition, since cooperation with an ordinary browser is easy, there is an effect in that web browsing can be performed making use of a characteristic of each medium. Further, since the same contents can be shared by an ordinary browser and the browser according to the present invention, there is an effect in that it is unnecessary for an information provider to change contents according to a medium.

In addition, a paper medium conventionally has a value of simply carrying information readable by the human, there is an effect in that a value of becoming a starting point of web browsing is added by the present invention and a value as an information distribution medium is increased. Further, there is an effect in that highly valuable printed matter can be prepared by an apparatus for printing such a paper medium.

In addition, there is an effect in that a user can determine whether a paper medium can be utilized by the web browser apparatus simply by seeing a logo printed on the paper medium. Further, there is an effect in that design incongruity of an image to be outputted on a paper medium can be reduced.

Further, since processing permission data indicating whether processing may be performed for each web browser apparatus in which image data is read is incorporated in a paper medium, it can be distinguished whether the paper medium is a paper medium for the limited purpose of using it only in apparatuses in which it can be used or a physical medium for the unlimited purpose of distribution. Moreover, there is an effect in that charging according to whether or not a physical medium to be outputted is for the purpose of distribution.

The present invention is not limited to the above embodiments and various changes and modifications can be made within the spirit and scope of the present invention. Therefore, to appraise the public of the scope of the present invention the following claims are made.

What is claimed is:

1. A web browser apparatus comprising:
   image storing means for storing an input image of an inputted physical medium, the inputted image including an action identification code and a filled-in image, the filled-in image being filled in the physical medium by a user;
   action identification code analyzing means for analyzing the action identification code included in the input image stored in said image storing means, the action identification code being used for deciding a next action;
   action deciding means for deciding the next action based on the analyzed action identification code and the filled-in image included in the input image;
   obtaining means for obtaining web page data from a web server in accordance with the next action decided by said action deciding means;
   action identification code generating means for generating an action identification code based on the obtained web page data, the action identification code being used for deciding a next action;
   output image preparing means for preparing an output image including the generated action identification code based on the obtained web page data; and
   print controlling means for controlling such that the output image prepared by said output image preparing means is printed on a physical medium.

2. The web browser apparatus according to claim 1, further comprising:
   a scanner for reading a physical medium to prepare an input image and inputting the input image in said image storing means; and
   a printer for printing the output image on the physical medium based on the control of said print controlling means.

3. The web browser apparatus according to claim 1, wherein said action identification code includes data for identifying each action that can be taken and data for identifying the filled-in image for selecting said next action.

4. The web browser apparatus according to claim 1, wherein said action identification code includes data for obtaining data for identifying each action that can be taken.

5. The web browser apparatus according to claim 1, wherein said action identification code includes at least one of a URL record of web page data to be outputted, a base record indicating contents of a base tag, an anchor record indicating contents of an anchor tag, a form record indicating contents of a form tag, a submit record indicating submission of a form element, a reset record indicating reset of a form element, a radio button record of a form element and a check box record of a form element.

6. The web browser apparatus according to claim 1, wherein said output image preparing means prepares an output image by further adding a position marker for specifying a position of said output image.

7. The web browser apparatus according to claim 1, wherein said output image preparing means prepares the output image by laying said obtained web page data and said prepared action identification code in the form in which said action identification code can be extracted.

8. The web browser apparatus according to claim 1,
wherein one or a plurality of said action identification codes are included on said output image.

9. The web browser apparatus according to claim 1,
wherein said action identification code is outputted to said output image in a predetermined color.

10. The web browser apparatus according to claim 1,
wherein said action deciding means decides said next action based on whether the filled-in image is filled in a control area having a predetermined color.

11. The web browser apparatus according to claim 1,
wherein said action identification code is arranged and printed in a predetermined position with respect to a control area for determining whether a user has filled in.

12. The web browser apparatus according to claim 1,
wherein said outpat image preparing means has a control area that is selected and designated in advance with respect to a control area in which a user fills in and the selected and designated control area is prepared as an image that can be distinguished from filling-in by the user.

13. The web browser apparatus according to claim 1,
wherein said action identification code generating means generates said action identification code by combining it with a logo with which a user can identify if said action identification code is included in a printed physical medium.

14. The web browser apparatus according to claim 1,
wherein said action identification code is prepared using two-dimensional bar codes.

15. The web browser apparatus according to claim 1,
wherein said action identification code generating means generates an action identification code including action identification data that is used for deciding, if a user instructs by filling in a physical medium on which the obtained web page data is printed, an action corresponding to the instruction and permission data for permitting processing of a physical medium on which the obtained web page data is printed.

16. The web browser apparatus according to claim 15,
wherein said action identification code analyzing means stops processing if the browser apparatus does not match the permission data included in said analyzed action identification code.

17. A web browser apparatus according to claim 15,
wherein said action identification code generating means performs charging processing according to a permission target apparatus of said permission data.

18. A web browsing method comprising:
an action identification code analyzing step of analyzing the action identification code included in an input image, the input image being inputted from an inputted physical medium, the inputted image including an action identification code and a filled-in image, the filled-in image being filled in the physical medium by a user, the action identification code being used for deciding a next action;
an action deciding step of deciding the next action based on the analyzed action identification code and the filled-in image included in the input image;
an obtaining step of obtaining web page data from a web server in accordance with the next action decided by said action deciding step;
an action identification code generating step of generating an action identification code to based on the obtained web page data, the action identification code being used for deciding a next action;
an output image preparing step of preparing an output image including the generated action identification code based on the obtained web page data; and
a print controlling step of controlling such that the output image prepared during said output image preparing step is printed on a physical medium.

19. The web browsing method according to claim 18, further comprising:
an input step of reading a physical medium by a scanner to prepare and input said input image; and
a print step of printing the output image on the physical medium based on the control of said print control step.

20. The web browsing method according to claim 18,
wherein said action identification code includes data for identifying each action that can be taken and data for identifying the filled-in image for selecting said next action.

21. The web browsing method according to claim 18,
wherein said action identification code includes data for obtaining data for identifying each action that can be taken.

22. The web browsing method according to claim 18,
wherein said action identification code includes at least one of a URL record of web page data to be outputted, a base record indicating contents of a base tag, an anchor record indicating contents of an anchor tag, a form record indicating contents of a form tag, a submit record indicating submission of a form element, a reset record indicating reset of a form element, a radio button record of a form element and a check box record of a form element.

23. The web browsing method according to claim 18,
wherein, in said output image preparing step, an output image is prepared by further adding a position marker for specifying a position of said output image.

24. The web browsing method according to claim 18,
wherein, in said output image preparing step, the output image is prepared by laying said obtained web page data and said prepared action identification code in the form in which the action identification code can be extracted.

25. The web browsing method according to claim 18,
wherein one or a plurality of said action identification codes are included on said output image.

26. The web browsing method according to claim 18,
wherein said action identification code is outputted to said output image in a predetermined color.

27. The web browsing method according to claim 18,
wherein said action deciding step decides said next action based on whether the filled-in image is filled in a control area having a predetermined color.

28. The web browsing method according to claim 18,
wherein said action identification code is arranged and printed in a predetermined position with respect to a control area for determining whether a user has filled in.

29. The web browsing method according to claim 18,
wherein, in said output image preparing step, there is a control area that is selected and designated in advance with respect to a control area which a user fills in and the selected and designated control area is prepared as an image that can be distinguished from filling-in by the user.

30. The web browsing method according to claim 18, wherein, in said action identification code generating step, said action identification code is generated by combining it with a logo with which a user can identify if said action identification code is included in a printed physical medium.

31. The web browsing method according to claim 18, wherein said action identification code is prepared using two-dimensional bar codes.

32. The web browsing method according to claim 18, wherein, in said action identification code generating step, an action identification code is generated which includes action identification data that is used for deciding, if a user instructs by filling in a physical medium on which the obtained web page data is printed, an action corresponding to the instruction and permission data for permitting processing of a physical medium on which the obtained web page data is printed.

33. The web browsing method according to claim 33, wherein, in said action identification code analyzing step, processing is stopped if the browser apparatus does not match the permission data included in said analyzed action identification code.

34. The web browsing method according to claim 32, wherein in said action identification code generating step, charging processing according to a permission target apparatus of said permission data is performed.

35. A web browsing program executable by a computer, comprising:
   an action identification code analyzing step of analyzing the action identification code included in an input image, the input image being inputted from an inputted physical medium, the inputted image including an action identification code and a filled-in image, the filled-in image being filled in the physical medium by a user, the action identification code being used for deciding a next action;
   an action deciding step of deciding the next action based on the analyzed action identification code and the filled-in image included in the input image;
   an obtaining step of obtaining web page data from a web server in accordance with the next action decided by said action deciding step;
   an action identification code generating step of generating an action identification code based on the obtained web page data, the action identification code being used for deciding a next action;
   an output image preparing step of preparing an output image including the generated action identification code based on the obtained web page data; and
   a print controlling step of controlling such that the output image prepared during said output image preparing step is printed on a physical medium.

36. A storage medium having stored therein a computer readable web browsing program comprising:
   an obtaining step of obtaining web page data from a web server;
   an action identification code generating step of generating an action identification code based on the obtained web page data, the action identification code being used for deciding a next action;
   an output image preparing step of preparing an output image including the generated action identification code based on the obtained web page data; and
   a print controlling step of controlling such that the output image prepared by said output image preparing step is printed on a physical medium.

* * * * *